US012811753B2

(12) United States Patent
Rahman et al.

(10) Patent No.: US 12,811,753 B2
(45) Date of Patent: Nov. 24, 2026

(54) CSI REPORTING

(71) Applicant: Samsung Electronics Co., Ltd., Suwon-si (KR)

(72) Inventors: Md. Saifur Rahman, Plano, TX (US); Gilwon Lee, McKinney, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 18/439,410

(22) Filed: Feb. 12, 2024

(65) Prior Publication Data

US 2024/0305434 A1 Sep. 12, 2024

Related U.S. Application Data

(60) Provisional application No. 63/471,170, filed on Jun. 5, 2023, provisional application No. 63/447,294, filed on Feb. 21, 2023.

(51) Int. Cl.

| | |
|---|---|
| ***H04L 5/00*** | (2006.01) |
| ***H04B 7/0417*** | (2017.01) |
| ***H04B 7/06*** | (2006.01) |

(52) U.S. Cl.

CPC ......... *H04L 5/0057* (2013.01); *H04B 7/0417* (2013.01); *H04B 7/0617* (2013.01); *H04B 7/0626* (2013.01)

(58) Field of Classification Search

CPC ..... H04L 5/00; H04L 1/00; H04L 1/16; H04L 25/02; H04L 27/26; H04B 7/04;

(Continued)

(56) References Cited

U.S. PATENT DOCUMENTS 11,637,608 B2 * 4/2023 Hindy .................. H04B 7/0645 370/252
11,791,883 B2 * 10/2023 Mittal ..................... H04L 1/003 370/252

(Continued)

FOREIGN PATENT DOCUMENTS

WO 2022194822 A1 9/2022

OTHER PUBLICATIONS

International Search Report and Written Opinion issued May 31, 2024 regarding International Application No. PCT/KR2024/002233, 7 pages.

(Continued)

*Primary Examiner* — Man U Phan

(57) ABSTRACT

Apparatuses and methods for CSI reporting. A method performed by a user equipment (UE) includes receiving a configuration about a channel state information (CSI) report and determining, based on the configuration, the CSI report including a precoding matrix indicator (PMI) and X channel quality indicators (CQIs). The configuration includes a value of $N_4$ and a codebookType set to typeII-Doppler-r18. The PMI includes a first indicator indicating Q Doppler domain (DD) vectors, each of length $N_4$, where $X \in \{1, 2\}$. The method further includes partitioning the CSI report into CSI part 1 and CSI part 2; partitioning the CSI part 2 further into groups G0, G1, and G2; and transmitting the CSI part 1 and at least a portion of the CSI part 2. The portion of the CSI part 2 is determined based on a priority value and corresponds to G0, (G0, G1), or (G0, G1, G2).

12 Claims, 16 Drawing Sheets

(58) Field of Classification Search
CPC ........... H04B 7/06; H04B 7/02; H04B 17/30; H04W 24/10; H04W 24/01; H04W 24/08; H04W 72/04; H04W 72/08; H04W 72/11; H04W 72/21; H04W 72/23; H04W 84/04
USPC .......................................................... 370/329
See application file for complete search history.

(56) References Cited

U.S. PATENT DOCUMENTS

| | | | | |
|---|---|---|---|---|
| 11,799,613 | B2 * | 10/2023 | Hindy | H04B 7/024 |
| 12,095,705 | B2 * | 9/2024 | Hindy | H04B 7/0639 |
| 12,113,598 | B2 * | 10/2024 | Hindy | H04B 7/0478 |
| 12,375,149 | B2 * | 7/2025 | Rahman | H04B 7/0626 |
| 12,395,220 | B2 * | 8/2025 | Zou | H04B 7/0456 |
| 2024/0284220 | A1 * | 8/2024 | Lee | H04B 7/0456 |
| 2025/0300709 | A1 * | 9/2025 | Huang | H04B 7/0456 |
| 2025/0309950 | A1 * | 10/2025 | Ye | H04B 7/0456 |
| 2025/0337471 | A1 * | 10/2025 | Yuan | H04B 7/0456 |
| 2025/0365601 | A1 * | 11/2025 | Zou | H04L 5/0048 |
| 2025/0392362 | A1 * | 12/2025 | Gao | H04B 7/048 |

OTHER PUBLICATIONS

Fujitsu, “Views on CSI enhancement for coherent-JT and mobility”, 3GPP TSG RAN WG1 #112, R1-2300741, Feb. 2022, 10 pages.
Samsung, “Views on CSI enhancements”, 3GPP TSG RAN WG1#112, R1-2301249, Feb. 2023, 32 pages.
Huawei et al., “CSI enhancement for coherent JT and mobility”, 3GPP TSG-RAN WG1 Meeting #112, R1-2300095, Feb. 2023, 36 pages.
Intel Corporation, “On CSI enhancements”, 3GPP TSG RAN WG1 #112, R1-2300934, Feb. 2023, 15 pages.
“3rd Generation Partnership Project; Technical Specification Group Radio Access Network; Evolved Universal Terrestrial Radio Access (E-UTRA); Physical channels and modulation (Release 17),” 3GPP TS 36.211 V17.0.0, Dec. 2021, 250 pages.
“3rd Generation Partnership Project; Technical Specification Group Radio Access Network; Evolved Universal Terrestrial Radio Access (E-UTRA); Multiplexing and channel coding (Release 17),” 3GPP TS 36.212 V17.0.0, Dec. 2021, 258 pages.
“3rd Generation Partnership Project; Technical Specification Group Radio Access Network; Evolved Universal Terrestrial Radio Access (E-UTRA); Physical layer procedures (Release 17),” 3GPP TS 36.213 V17.0.0, Dec. 2021, 582 pages.
“3rd Generation Partnership Project; Technical Specification Group Radio Access Network; Evolved Universal Terrestrial Radio Access (E-UTRA); Medium Access Control (MAC) protocol specification (Release 17),” 3GPP TS 36.321 V17.0.0, Mar. 2022, 146 pages.
“3rd Generation Partnership Project; Technical Specification Group Radio Access Network; Evolved Universal Terrestrial Radio Access (E-UTRA); Radio Resource Control (RRC); Protocol specification (Release 17),” 3GPP TS 36.331 V17.0.0, Mar. 2022, 1119 pages.
“3rd Generation Partnership Project; Technical Specification Group Services and System Aspects; Feasibility Study on New Services and Markets Technology Enablers; Stage 1 (Release 14),” 3GPP TR 22.891 V1.2.0, Nov. 2015, 96 pages.
“3rd Generation Partnership Project; Technical Specification Group Radio Access Network; NR; Multiplexing and channel coding (Release 17),” 3GPP TS 38.212 V17.0.0, Dec. 2021, 190 pages.
“3rd Generation Partnership Project; Technical Specification Group Radio Access Network; NR; Physical layer procedures for data (Release 17),” 3GPP TS 38.214 V17.0.0, Dec. 2021, 217 pages.
Fraunhofer IIS et al., “Measurement results on Doppler spectrum for various UE mobility environments and related CSI enhancements”, 3GPP TSG RAN WG#86, RP-192978, Dec. 2019, 13 pages.
“3rd Generation Partnership Project; Technical Specification Group Radio Access Network; NR; Physical channels and modulation (Release 17),” 3GPP TS 38.211 V17.0.0, Dec. 2021, 134 pages.
Supplementary European Search Report dated Sep. 21, 2026, in connection with European Patent Application No. 24760557.9, 16 pages.
Lenovo, “CSI enhancements for high mobility and coherent JT,” 3GPP TSG RAN WG1 #111, R1-2211292, Nov. 2022, 21 pages.
European Telecommunications Standards Institute, “5G; NR; Physical layer procedures for data (3GPP TS 38.214 version 17.2.0 Release 17),” ETSI TS 138 214 V17.2.0, Jul. 2022, 235 pages.

* cited by examiner

CSI REPORTING

CROSS-REFERENCE TO RELATED APPLICATION AND CLAIM OF PRIORITY

This application claims priority under 35 U.S.C. § 119(e) to U.S. Provisional Patent Application No. 63/447,294 filed on Feb. 21, 2023, and U.S. Provisional Patent Application No. 63/471,170 filed on Jun. 5, 2023. The above-identified provisional patent applications are hereby incorporated by reference in their entirety.

TECHNICAL FIELD

The present disclosure relates generally to wireless communication systems and, more specifically, to channel state information (CSI) reporting.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for CSI reporting.

In one embodiment, a user equipment (UE) is provided. The UE includes a transceiver configured to receive a configuration about a channel state information (CSI) report. The configuration includes a value of $N_4$ and a codebookType set to typeII-Doppler-r18. The UE further includes a processor operably coupled to the transceiver. The processor is configured to determine, based on the configuration, the CSI report including a precoding matrix indicator (PMI) and X channel quality indicators (CQIs), partition the CSI report into CSI part 1 and CSI part 2, and partition the CSI part 2 further into groups G0, G1, and G2. The PMI includes a first indicator indicating Q Doppler domain (DD) vectors, each of length $N_4$, where $X \in \{1, 2\}$. The transceiver is further configured to transmit the CSI part 1 and at least a portion of the CSI part 2, where the portion of the CSI part 2 is determined based on a priority value and corresponds to G0, (G0, G1), or (G0, G1, G2).

In another embodiment, a base station (BS) is provided. The BS includes a processor and a transceiver operably coupled to the processor. The transceiver is configured to transmit a configuration about a CSI report and receive at least a portion of the CSI report including a CSI part 1 and at least a portion of a CSI part 2. The configuration including a value of $N_4$ and a codebookType set to typeII-Doppler-r18. The CSI part 2 includes three groups G0, G1, and G2 and the portion of the CSI part 2 is based on a priority value and corresponds to G0, (G0, G1), or (G0, G1, G2). The CSI report includes a PMI and X CQIs. The PMI includes a first indicator indicating Q DD vectors, each of length $N_4$, where $X \in \{1, 2\}$.

In yet another embodiment, a method performed by a UE is provided. The method includes receiving a configuration about a CSI report and determining, based on the configuration, the CSI report including a PMI and X CQIs. The configuration includes a value of $N_4$ and a codebookType set to typeII-Doppler-r18. The PMI includes a first indicator indicating Q DD vectors, each of length $N_4$, where $X \in \{1, 2\}$. The method further includes partitioning the CSI report into CSI part 1 and CSI part 2; partitioning the CSI part 2 further into groups G0, G1, and G2; and transmitting the CSI part 1 and at least a portion of the CSI part 2. The portion of the CSI part 2 is determined based on a priority value and corresponds to G0, (G0, G1), or (G0, G1, G2).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
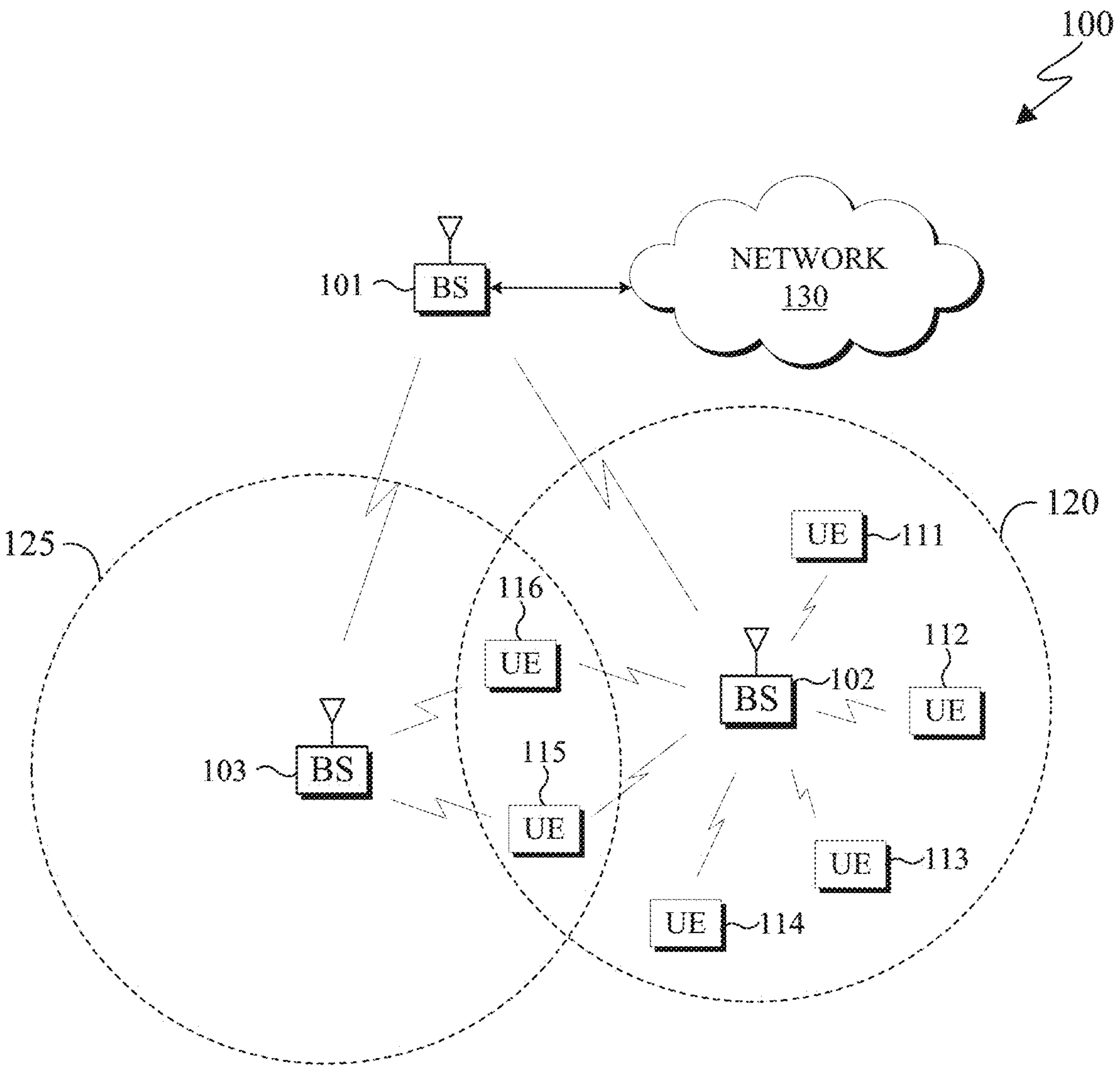
FIG. 1 illustrates an example wireless network according to embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TR 22.891 v1.2.0 (herein "REF 6"); 3GPP TS 38.212 v17.0.0, "E-UTRA, NR, Multiplexing and channel coding" (herein "REF 7"); 3GPP TS 38.214 v17.0.0; "NR, Physical Layer Procedures for Data" (herein "REF 8"); RP-192978, "Measurement results on Doppler spectrum for various UE mobility environments and related CSI enhancements," Fraunhofer IIS, Fraunhofer HHI, Deutsche Telekom (herein "REF 9"); and 3GPP TS 38.211 v17.0.0, "E-UTRA, NR, Physical channels and modulation" (herein "REF 10").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
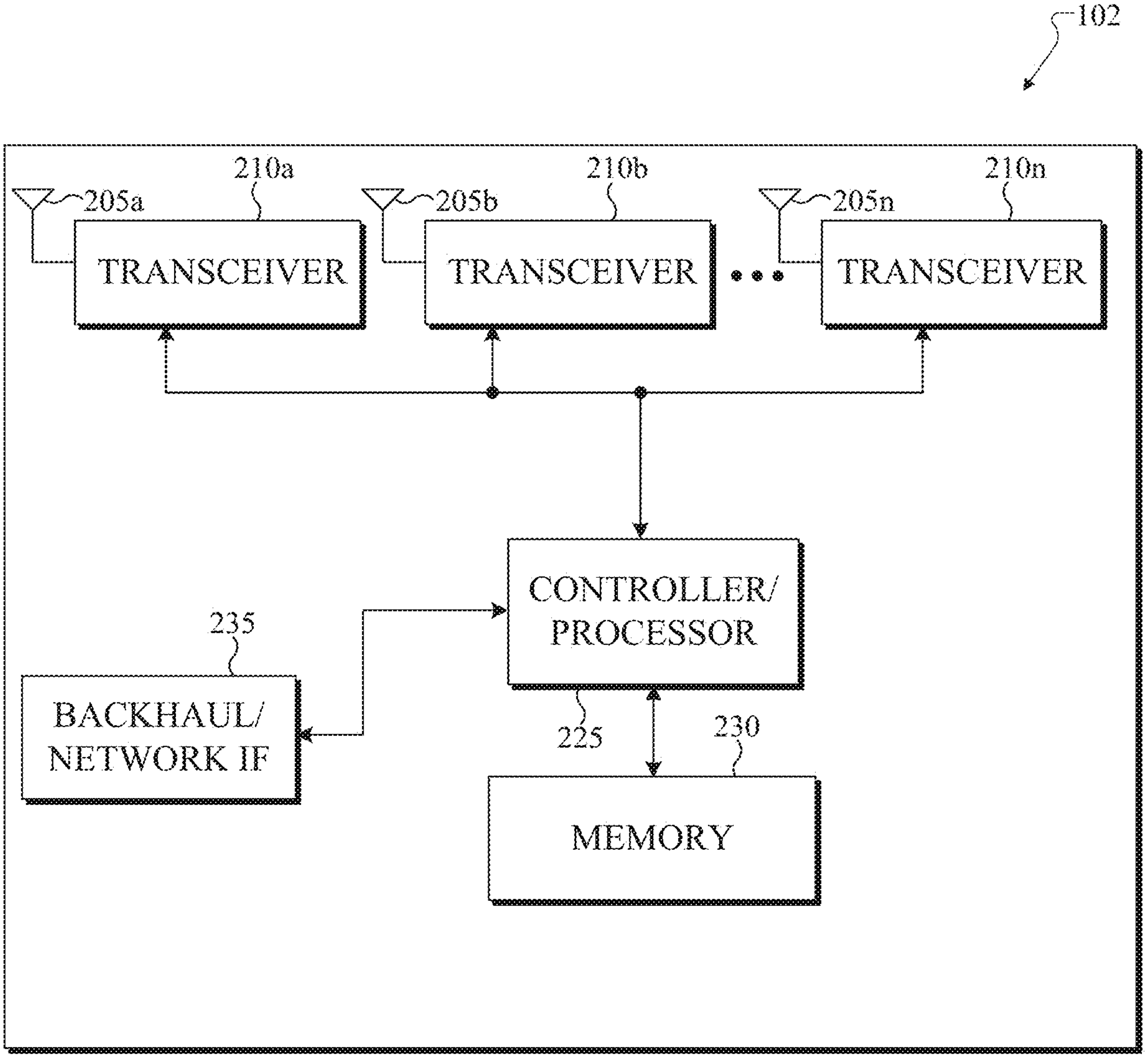
FIG. 2 illustrates an example gNodeB (gNB) according to embodiments of the present disclosure.
Figure 3:
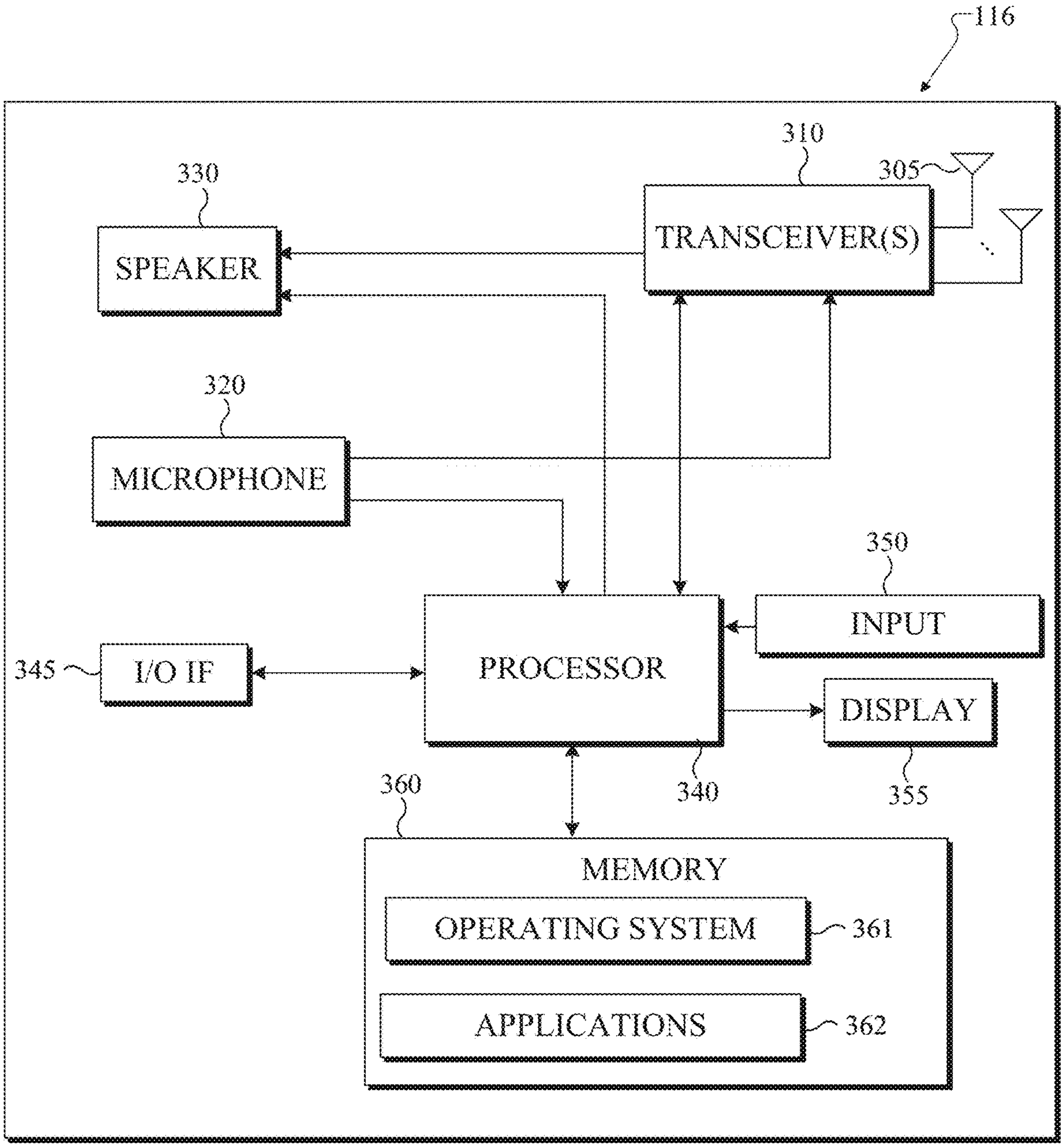
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for CSI reporting. In certain embodiments, one or more of the BSs 101-103 include circuitry, programing, or a combination thereof for supporting CSI reporting.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for supporting compression-based CSI reporting. Any of a wide variety of other functions could be supported in the gNB 102 by the controller/processor 225.

The controller/processor 225 is also capable of executing programs and other processes resident in the memory 230, such as processes for supporting CSI reporting. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for CSI reporting. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
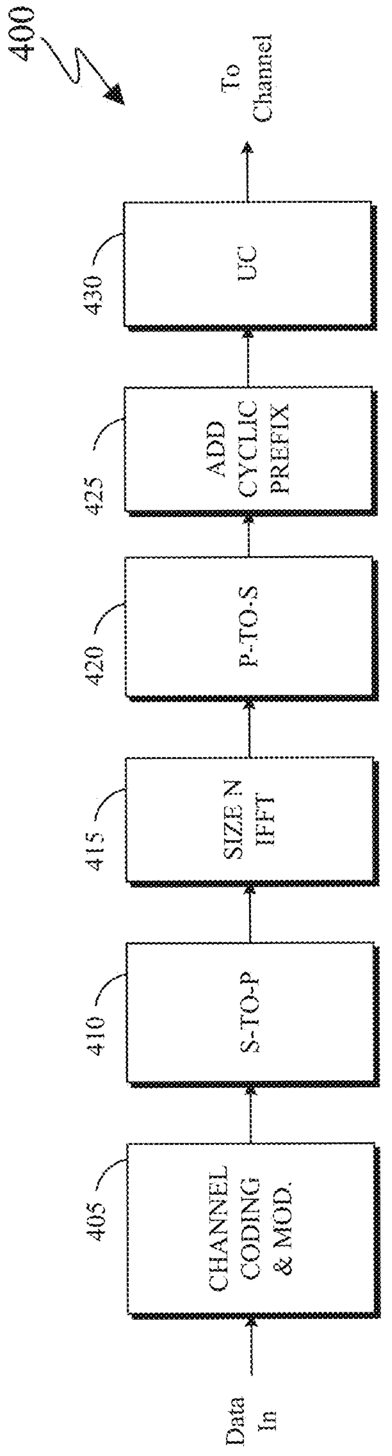
FIGS. 4 and 5 illustrate example wireless transmit and receive paths according to embodiments of the present disclosure.
Figure 5:
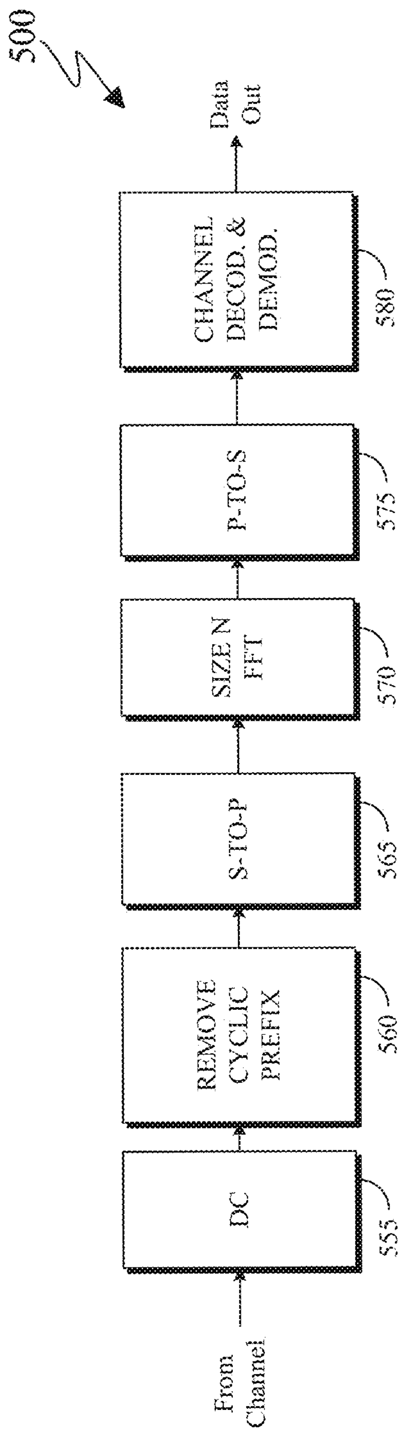

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the transmit path 400 is configured to support CSI reporting as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH)—see also REF 3. An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $$N_{sc}^{RB}$$

sub-carriers, or resource elements (REs), such as 12 REs. A unit of one RB over one subframe is referred to as a PRB. A UE can be allocated $M_{PDSCH}$ RBs for a total of $$N_{sc}^{RB} = M_{PDSCH} \cdot N_{sc}^{RB}$$

REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also REF 3).

A UL subframe (or slot) includes two slots. Each slot includes $$N_{symb}^{UL}$$

Symbols for transmitting data information, UCI, DMRS, or SRS. A frequency resource unit of an UL system BW is an RB. A UE is allocated $N_{RB}$ RBs for a total of $$N_{RB} \cdot N_{sc}^{RB}$$

REs for a transmission BW. For a PUCCH, $N_{RB}=1$. A last subframe (or slot) symbol can be used to multiplex SRS transmissions from one or more UEs. A number of subframe (or slot) symbols that are available for data/UCI/DMRS transmission is $$N_{symb} = 2 \cdot \left(N_{symb}^{UL} - 1\right) - N_{SRS},$$

where $N_{SRS}=1$ if a last subframe (or slot) symbol is used to transmit SRS and $N_{SRS}=0$ otherwise.

Figure 6:
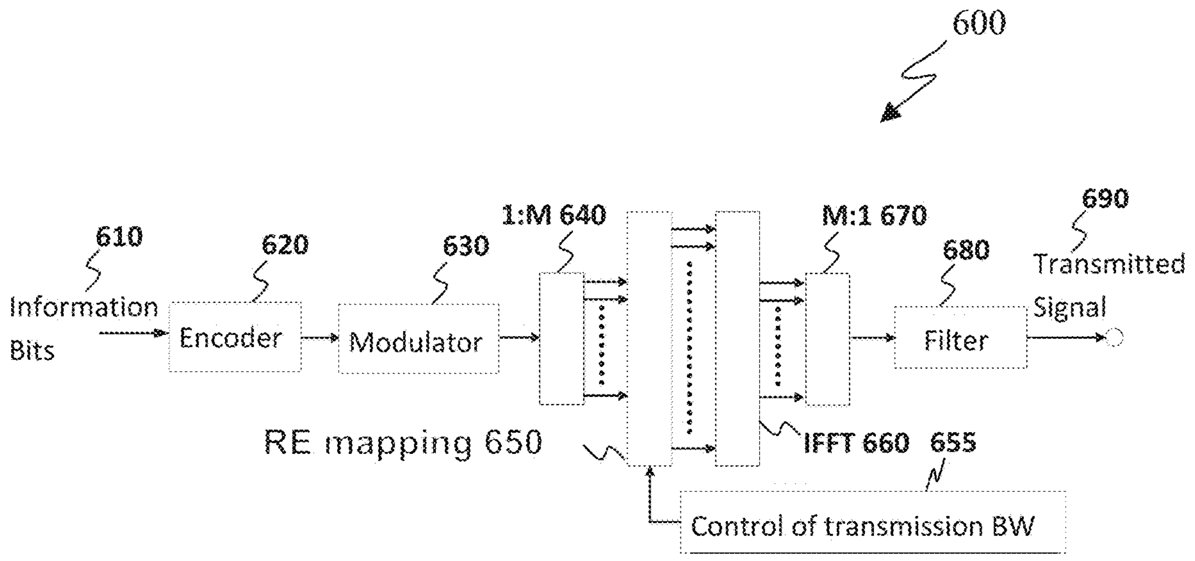
FIG. 6 illustrates a transmitter block diagram for a physical downlink shared channel (PDSCH) in a subframe according to embodiments of the present disclosure.

FIG. 6 illustrates a transmitter block diagram 600 for a PDSCH in a subframe according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
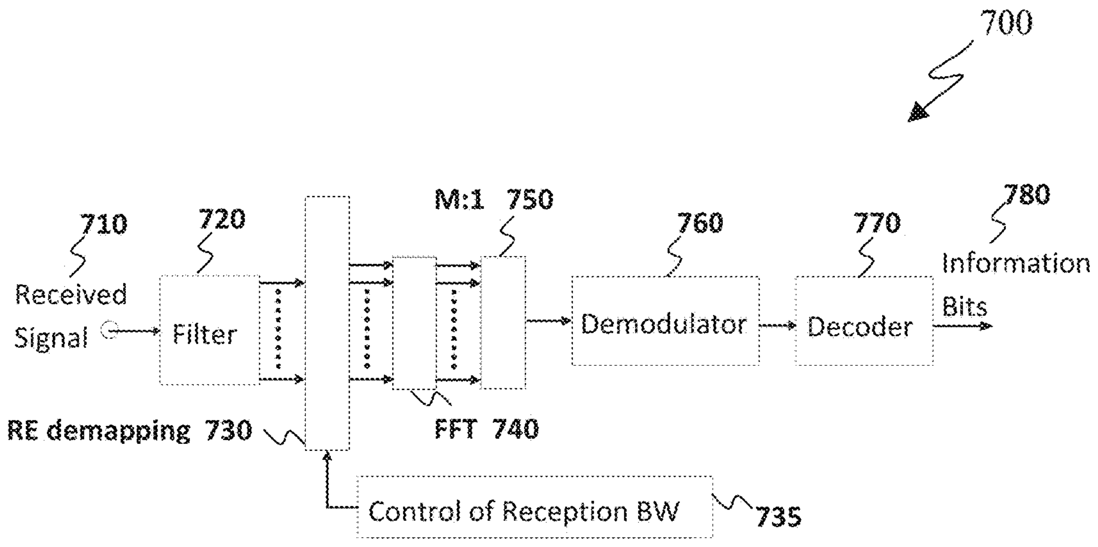
FIG. 7 illustrates a receiver block diagram for a PDSCH in a subframe according to embodiments of the present disclosure.

FIG. 7 illustrates a receiver block diagram 700 for a PDSCH in a subframe according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
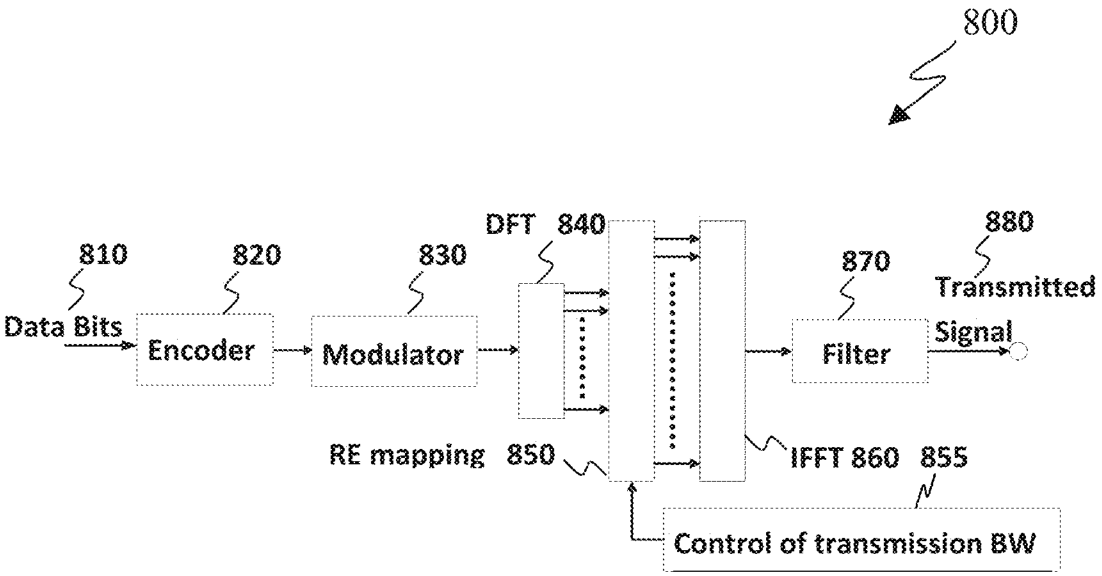
FIG. 8 illustrates a transmitter block diagram for a physical uplink shared channel (PUSCH) in a subframe according to embodiments of the present disclosure.

FIG. 8 illustrates a transmitter block diagram 800 for a PUSCH in a subframe according to embodiments of the present disclosure. One or more of the components illustrated in FIG. 7 can be implemented in specialized circuitry configured to perform the noted functions or one or more of the components can be implemented by one or more processors executing instructions to perform the noted functions. The embodiment of the block diagram 800 illustrated in FIG. 8 is for illustration only. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
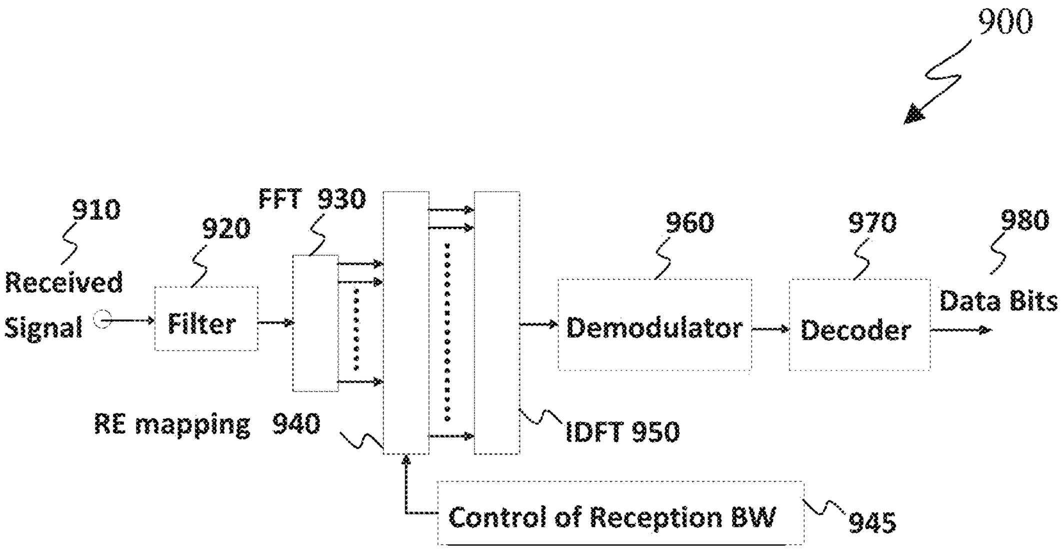
FIG. 9 illustrates a receiver block diagram for a PUSCH in a subframe according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
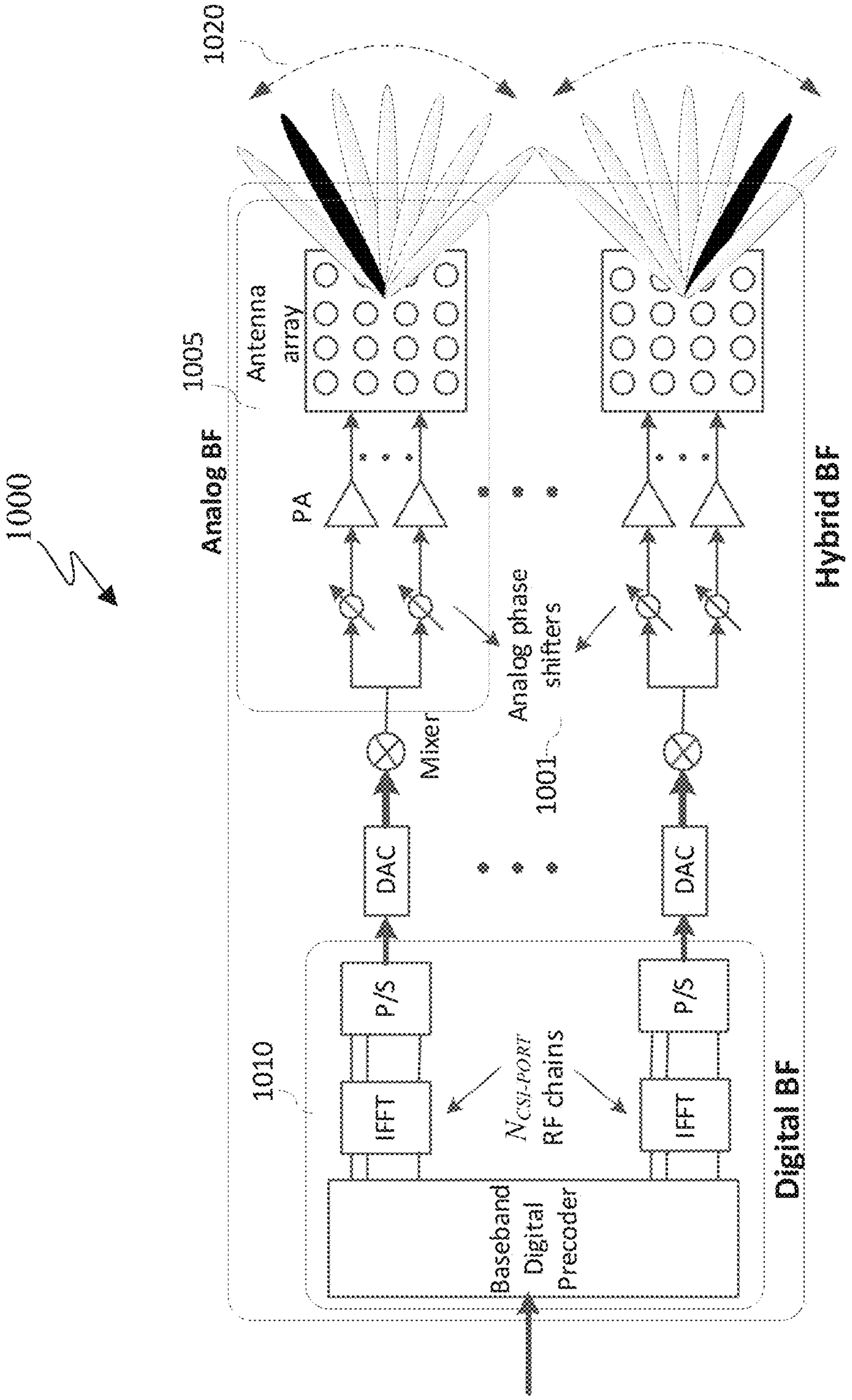
FIG. 10 illustrates an example antenna blocks or arrays forming beams according to embodiments of the present disclosure.

FIG. 10 illustrates an example antenna blocks or arrays 1000 according to embodiments of the present disclosure. The embodiment of the antenna blocks or arrays 1000 illustrated in FIG. 10 is for illustration only. FIG. 10 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports NCSI-PORT. A digital beamforming unit 1010 performs a linear combination across NCSI-PORT analog beams to further increase precoding gain. While analog beams are wideband (hence not frequency-selective), digital precoding can be varied across frequency sub-bands or resource blocks.

Embodiments of the present disclosure recognize that in a wireless communication system, MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is 'implicit' in the form of channel quality indicator (CQI)/precoding matrix indicator (PMI)/rank indicator (RI) (also CRI and LI) derived from a codebook assuming SU transmission from eNB (or gNB).

In 5G or NR systems [REF7, REF8], the above-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $W_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $$\frac{P_{CSI-RS}}{2},$$

CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

In Rel. 17 NR, CSI reporting has been enhanced to support the following.

Further enhanced Type II port selection codebook: it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. In Rel. 17, such a codebook is supported (which is referred to as Rel. 17 further enhanced Type II port selection codebook in REF8).

NCJT CSI reporting: When the UE can communicate with multiple TRPs that are distributed at different locations in space (e.g., within a cell), the CSI reporting can correspond to a single TRP hypothesis (i.e., CSI reporting for one of the multiple TRPs), or multi-TRP hypothesis (i.e., CSI reporting for at least two of the multiple TRPs). The CSI reporting for both single TRP and multi-TRP hypotheses are supported in Rel. 17. However, the multi-TRP CSI reporting considers a non-coherent joint transmission (NCJT), i.e., a layer (and precoder) of the transmission is restricted to be transmitted from only one TRP.

In Rel. 18 NR MIMO, the following CSI enhancements are further considered targeting two use cases (coherent joint transmission from multiple TRPs, and high/medium velocity UEs):

- Enhancements of CSI acquisition for Coherent-JT targeting FR1 and up to 4 TRPs, assuming ideal backhaul and synchronization as well as the same number of antenna ports across TRPs, as follows:
  - Rel-16/17 Type-II codebook refinement for CJT mTRP targeting FDD and its associated CSI reporting, taking into account throughput-overhead trade-off.
- CSI reporting enhancement for high/medium UE velocities by exploiting time-domain correlation/Doppler-domain information to assist DL precoding, targeting FR1, as follows:
  - Rel-16/17 Type-II codebook refinement, without modification to the spatial and frequency domain basis.
  - UE reporting of time-domain channel properties measured via CSI-RS for tracking.

The first use case targets extending the Rel. 17 NCJT CSI to coherent JT (CJT), and the second use case targets extending FD compression in the Rel.16/17 codebook to include time (Doppler) domain compression. Both extensions are based on the same legacy codebook, i.e., Rel. 16/17 codebook. In this disclosure, a unified codebook design considering both extensions has been provided.

Figure 11:
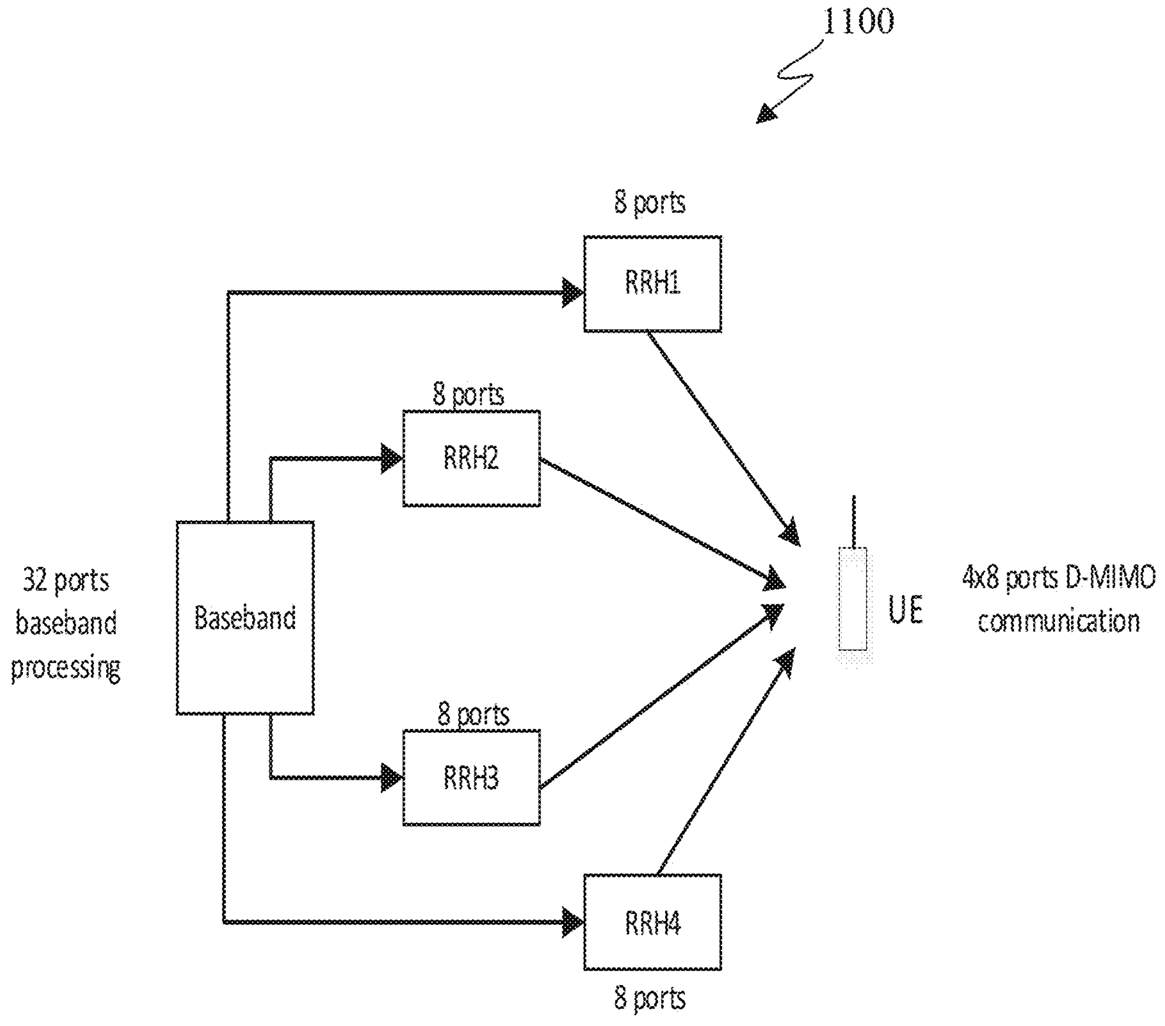
FIG. 11 illustrates a distributed multi-input multi-output (MIMO) system according to embodiments of the disclosure.

FIG. 11 illustrates a distributed MIMO system 1100 according to embodiments of the disclosure. The embodiment of the distributed MIMO system 1100 illustrated in FIG. 11 is for illustration only. FIG. 11 does not limit the scope of this disclosure to any particular implementation of the distributed MIMO system.

An example use case or scenario of interest for CJT/DMIMO is as follows. Although NR supports up to 32 CSI-RS antenna ports, for a cellular system operating in a sub-1 GHz frequency range (e.g., less than 1 GHz), supporting large number of CSI-RS antenna ports (e.g., 32) at one site or remote radio head (RRH) or TRP is challenging due to larger antenna form factors at these frequencies (when compared with a system operating at a higher frequency such as 2 GHz or 4 GHz. At such low frequencies, the maximum number of CSI-RS antenna ports that can be co-located at a site (or RRH or TRP) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with large number of CSI-RS antenna ports is based on distributing antenna ports at multiple sites (or TRPs). The multiple sites or TRPs can still be connected to a single (common) baseband unit, hence the signal transmitted/received via multiple distributed TRPs can still be processed at a centralized location. This is called distributed MIMO or multi-TRP coherent joint transmission (C-JT). For example, 32 CSI-RS ports can be distributed across 4 TRPs, each with 8 antenna ports. Such a MIMO system can be referred to as a distributed MIMO (D-MIMO) or a CJT system. An example is illustrated in FIG. 11.

Various embodiments of the present disclosure recognize that the multiple RRHs in a D-MIMO setup can be utilized for spatial multiplexing gain (based on CSI reporting). Since RRHs are geographically separated, they (RRHs) tend to contribute differently in CSI reporting. This motivates a dynamic RRH selection followed by CSI reporting condition on the RRH selection. Accordingly, various embodiments of the present disclosure provide examples on how the channel and interference signal can be measure under different RRH selection hypotheses. Additionally, the signaling details of such a CSI reporting and CSI-RS measurement are also provided.

Figure 12:
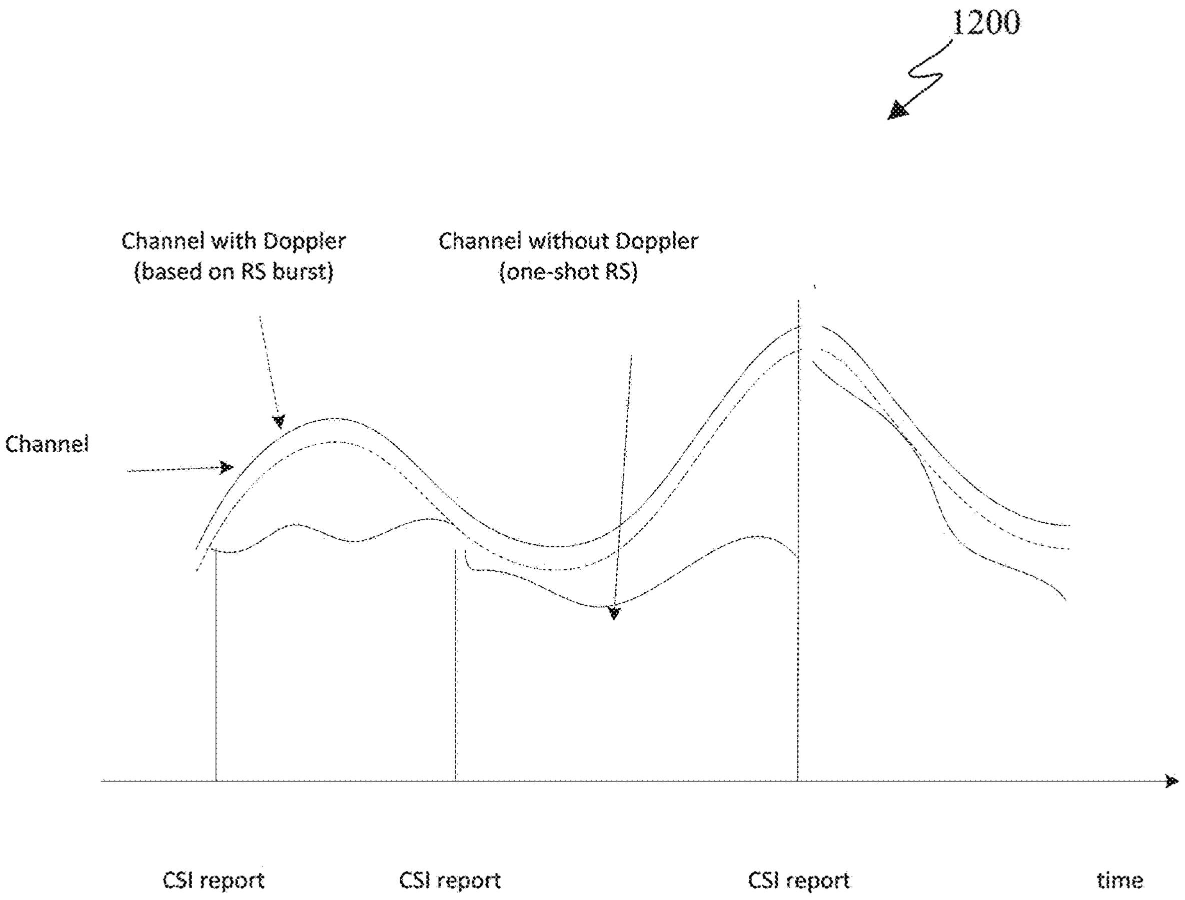
FIG. 12 illustrates channel measurement with and without Doppler components according to embodiments of the present disclosure.

FIG. 12 illustrates channel measurement with and without Doppler components 1200 according to embodiments of the present disclosure. The embodiment of the channel measurement with and without Doppler components 1200 illustrated in FIG. 12 is for illustration only. FIG. 12 does not limit the scope of this disclosure to any particular implementation of the channel measurement with and without Doppler components.

The main use case or scenario of interest for time-/Doppler-domain compression is moderate to high mobility scenarios. When the UE speed is in a moderate or high-speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is needed, which is based on the Doppler components of the channel. As described in [REF9], the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When the RS is CSI-RS, the UE measures a CSI-RS burst, and use it to obtain Doppler components of the DL channel, and when RS is SRS, the gNB measures an SRS burst, and use it to obtain Doppler components of the UL channel. The obtained Doppler components can be reported by the UE using a codebook (as part of a CS report). Alternatively, the gNB can use the obtained Doppler components of the UL channel to beamform CSI-RS for CSI reporting by the UE. An illustration of channel measurement with and without Doppler components is shown in FIG. 12. When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

In next generation MIMO systems, the number of antenna ports is expected to increase further (e.g., up to 256), for example, for carrier frequencies in upper mid-band (10-15 GHz); the NW deployments are likely to be denser/more distributed (when compared with 5G NR); and the system is expected to work seamlessly even in challenging scenarios such as medium-high (e.g., 120 kmph) speed UEs, 'higher-order) multi-user MIMO. The CSI in such systems may need to be high resolution (higher than Type II CSI in 5G NR) while keeping the UE complexity (associated with CSI calculation) and CSI overhead (number of bits to report the CSI) still manageable (e.g., similar to that for 5G NR Type II CSI). In the present disclosure, a high-resolution (Type II) Doppler codebook based on SD, FD< and DD compression is considered. In particular, the present disclosure considers two-part CSI or UCI framework for Type II Doppler codebook for medium/high speed scenarios and proposes methods and apparatuses for grouping for Part 1 and Part 2 CSI and UCI omission.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with Mn subbands when one CSI parameter for all the Mn subbands within the CSI reporting band. A CSI parameter is configured with "subband" for the CSI reporting band with Mn subbands when one CSI parameter is reported for each of the Mn subbands within the CSI reporting band.

Figure 13:
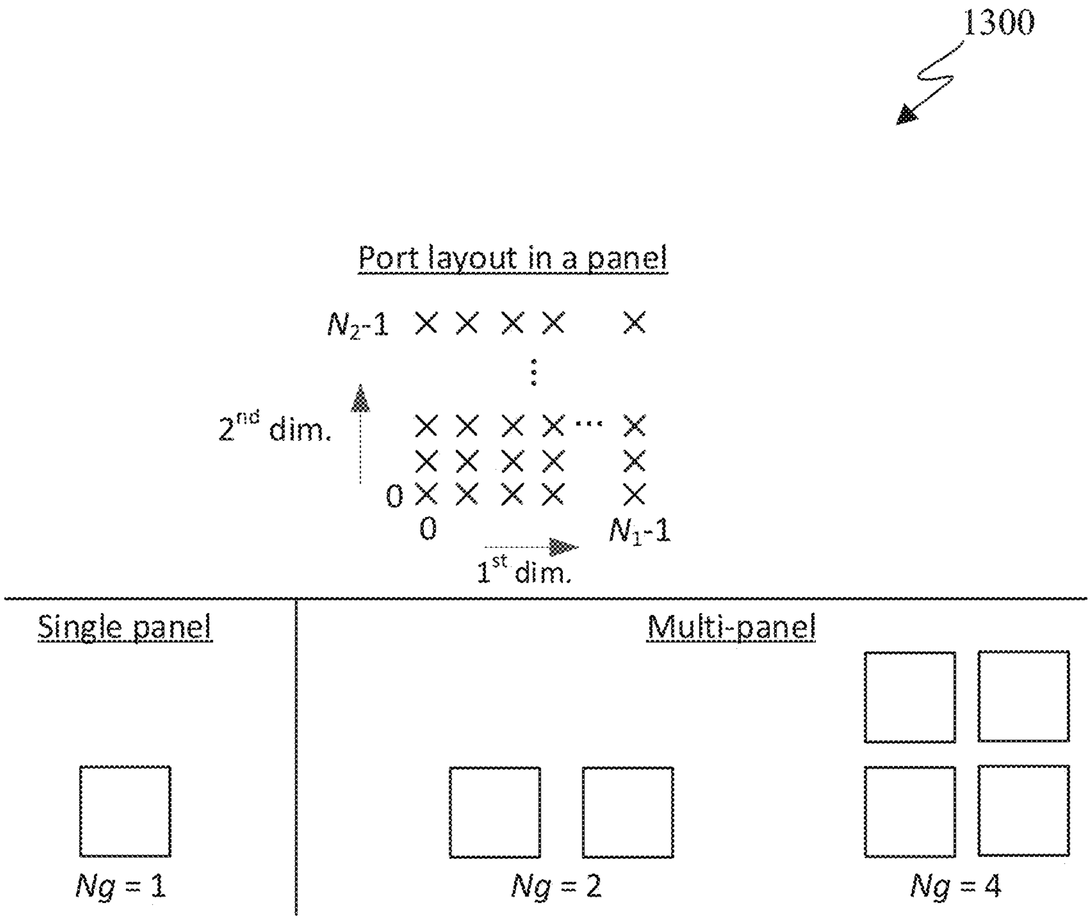
FIG. 13 illustrates an example antenna port layout and antenna group TRP according to embodiments of the present disclosure.

FIG. 13 illustrates an example antenna port layout and antenna group TRP 1300 according to embodiments of the present disclosure. The embodiment of the antenna port layout and antenna group TRP 1300 illustrated in FIG. 13 is for illustration only. FIG. 13 does not limit the scope of this disclosure to any particular implementation of the antenna port layout and antenna group TRP.

As illustrated in FIGS. 13, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$ when each antenna maps to an antenna port. An illustration is shown in FIG. 13 where "X" represents two antenna polarizations. In this disclosure, the term "polarization" refers to a group of antenna ports. For example, antenna ports $$j = X+0, X+1, \ldots, X+\frac{P_{CSIRS}}{2}-1$$

comprise a first antenna polarization, and antenna ports $$j = X+\frac{P_{CSIRS}}{2}, X+\frac{P_{CSIRS}}{2}+1, \ldots, X+P_{CSIRS}-1$$

comprise a second antenna polarization, where $P_{CSIRS}$ is a number of CSI-RS antenna ports and X is a starting antenna port number (e.g., X=3000, then antenna ports are 3000, 3001, 3002, . . . ). Let $N_g$ be a number of antenna groups (e.g., group=panel or TRP) at the gNB. When there are multiple antenna groups ($N_g>1$), we assume that each group is dual-polarized antenna ports with $N_1$ and $N_2$ ports in two dimensions. This is illustrated in FIG. 13. Note that the antenna port layouts may or may not be the same in different antenna groups.

In one example, an antenna group corresponds to an antenna panel. In one example, an antenna group corresponds to a TRP. In one example, an antenna group corresponds to an RRH. In one example, an antenna group corresponds to CSI-RS antenna ports of a NZP CSI-RS resource. In one example, an antenna group corresponds to a subset of CSI-RS antenna ports of a NZP CSI-RS resource (comprising multiple antenna groups). In one example, an antenna group corresponds to CSI-RS antenna ports of multiple NZP CSI-RS resources (e.g., comprising a CSI-RS resource set).

In one example, the antenna architecture of a D-MIMO or CJT system is structured. For example, the antenna structure at each RRH (or TRP) is dual-polarized (single or multi-panel as shown in FIG. 13. The antenna structure at each RRH/TRP can be the same. Alternatively, the antenna structure at an RRH/TRP can be different from another RRH/TRP. Likewise, the number of ports at each RRH/TRP can be the same. Alternatively, the number of ports at one RRH/TRP can be different from another RRH/TRP. In one example, $N_g=N_{RRH}=N_{TRP}$, a number of RRHs/TRPs in the D-MIMO/CJT transmission.

In another example, the antenna architecture of a D-MIMO or CJT system is unstructured. For example, the antenna structure at one RRH/TRP can be different from another RRH/TRP.

This disclosure considers a structured antenna architecture. For simplicity, this disclosure considers each RRH/TRP as being equivalent to a panel, although, an RRH/TRP can have multiple panels in practice. The disclosure however is not restrictive to a single panel assumption at each RRH/TRP, and can easily be extended (covers) the case when an RRH/TRP has multiple antenna panels.

In one embodiment, an RRH constitutes (or corresponds to) at least one of the following:

- In one example, an RRH corresponds to a TRP.
- In one example, an RRH or TRP corresponds to a CSI-RS resource. A UE is configured with $K=N_{RRH}>1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure.
- In one example, an RRH or TRP corresponds to a CSI-RS resource group, where a group comprises one or multiple NZP CSI-RS resources. A UE is configured with $K \geq N_{RRH}>1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure. In particular, the K CSI-RS resources can be partitioned into $N_{RRH}$ resource groups. The information about the resource grouping can be provided together with the CSI-RS resource setting/configuration, or with the CSI reporting setting/configuration, or with the CSI-RS resource configuration.
- In one example, an RRH or TRP corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.
- In one example, an RRH or TRP corresponds to one or more examples described above depending on a configuration. For example, this configuration can be explicit via a parameter (e.g., an RRC parameter). Alternatively, it can be implicit.
  - In one example, when implicit, it could be based on the value of K. For example, when K>1 CSI-RS resources, an RRH corresponds to one or more examples described above, and when K=1 CSI-RS resource, an RRH corresponds to one or more examples described above.
  - In another example, the configuration could be based on the configured codebook. For example, an RRH corresponds to a CSI-RS resource or resource group when the codebook corresponds to a decoupled codebook (modular or separate codebook for each RRH), and an RRH corresponds to a subset (or a group) of CSI-RS ports when codebook corresponds to a coupled (joint or coherent) codebook (one joint codebook across RRHs).

In one example, when the RRH or TRP maps (or corresponds to) a CSI-RS resource or resource group, and a UE can select a subset of TRPs (resources or resource groups) and report the CSI for the selected TRPs (resources or resource groups), the selected TRPs can be reported via an indicator. For example, the indicator can be a CRI or a PMI (component) or a new indicator.

In one example, when TRP maps (or corresponds to) a CSI-RS port group, and a UE can select a subset of TRPs (port groups) and report the CSI for the selected TRPs (port groups), the selected TRPs can be reported via an indicator. For example, the indicator can be a CRI or a PMI (component) or a new indicator.

In one example, when multiple (K>1) CSI-RS resources are configured for $N_{RRH}$ TRPs, a decoupled (modular) codebook is used/configured, and when a single (K=1) CSI-RS resource for $N_{RRH}$ TRPs, a joint codebook is used/configured.

In Rel. 16 enhanced Type II CSI reporting, a UE is configured with high-resolution (e.g., Type II) CSI reporting in which the linear combination-based Type II CSI reporting framework is extended to include a frequency dimension in addition to the first and second antenna port dimensions.

Figure 14:
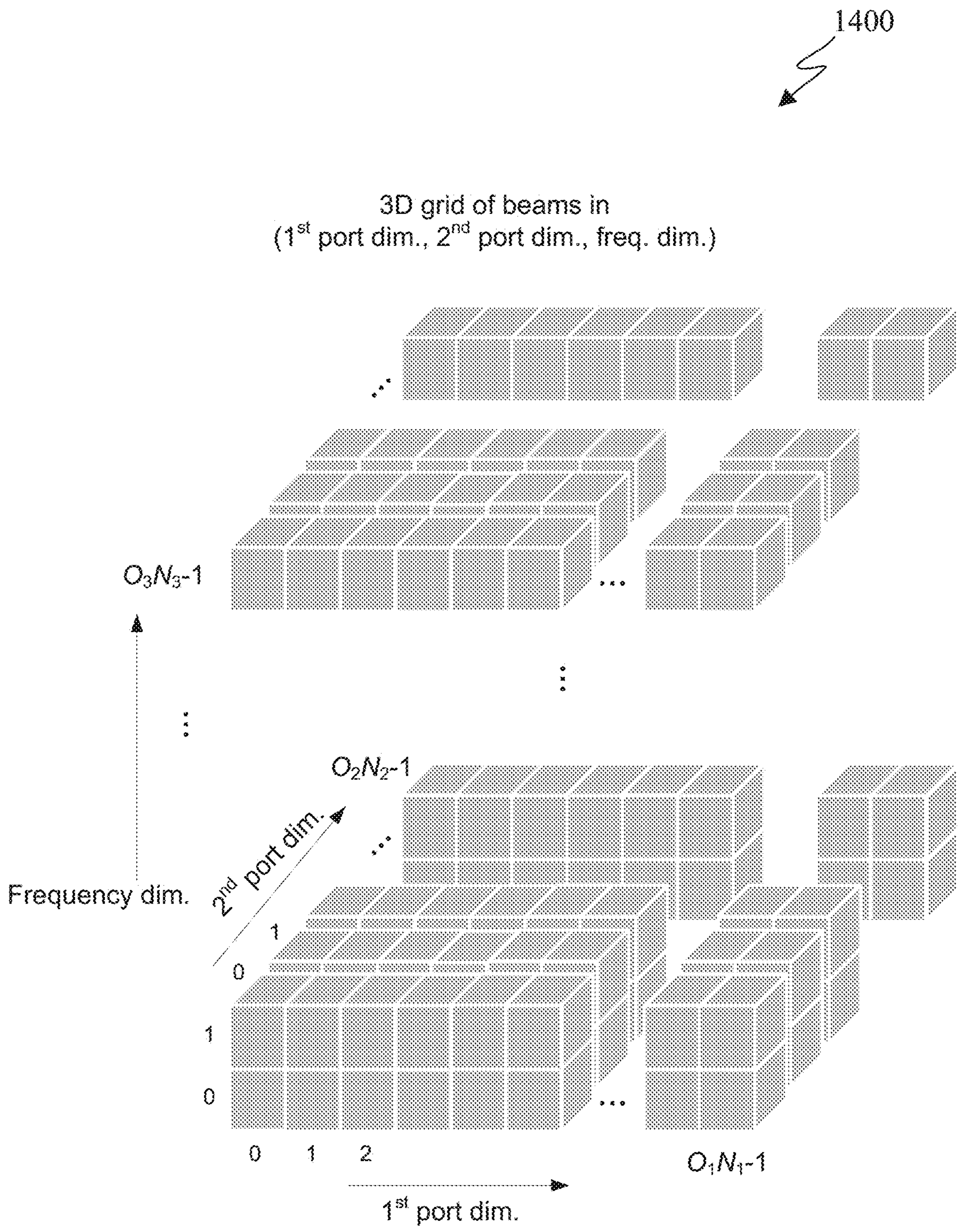
FIG. 14 illustrates a 3D grid of oversampled discrete Fourier transform (DFT) beams according to embodiments of the present disclosure.

FIG. 14 illustrates a 3D grid of oversampled DFT beams 1400 according to embodiments of the present disclosure. The embodiment of the 3D grid of oversampled DFT beams 1400 illustrated in FIG. 14 is for illustration only. FIG. 14 does not limit the scope of this disclosure to any particular implementation of the 3D grid of oversampled DFT beams.

As illustrated, FIG. 14 shows a 3D grid 1400 of the oversampled DFT beams (1st port dim., 2nd port dim., freq. dim.) in which

- a $1^{st}$ dimension is associated with the $1^{st}$ port dimension,
- a 2nd dimension is associated with the 2nd port dimension, and
- a 3rd dimension is associated with the frequency dimension.

As explained in Section 5.2.2.2.5 of REF8, a UE is configured with higher layer parameter codebookType set to 'typeII-r16' for an enhanced Type II CSI reporting in which the pre-coders for all SBs (or FD units) and for a given layer l=1, . . . , v, where v is the associated RI value, is given by either $$W^l = AC_lB^H = [a_0 a_1 \ldots a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H = \tag{Eq. 1}$$

$$\sum_{f=0}^{M-1} \sum_{i=0}^{L-1} c_{l,i,f}(a_i b_f^H) = \sum_{i=0}^{L-1} \sum_{f=0}^{M-1} c_{l,i,f}(a_i b_f^H),$$

-continued or $$W^l = \begin{bmatrix} A & 0 \\ 0 & A \end{bmatrix} C_l B^H = \tag{Eq. 2}$$

$$\begin{bmatrix} a_0 a_1 \ldots a_{L-1} & 0 \\ 0 & a_0 a_1 \ldots a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H =$$

$$\begin{bmatrix} \sum_{f=0}^{M-1} \sum_{i=0}^{L-l} c_{l,i,f}(a_i b_f^H) \\ \sum_{f=0}^{M-1} \sum_{i=0}^{L-l} c_{l,i+L,f}(a_i b_f^H) \end{bmatrix},$$

where:

$N_1$ is a number of antenna ports in a first antenna port dimension (having the same antenna polarization), $N_2$ is a number of antenna ports in a second antenna port dimension (having the same antenna polarization), $P_{CSI-RS}$ is a number of CSI-RS ports configured to the UE, $N_3$ is a number of SBs for PMI reporting or number of FD units or number of FD components (that comprise the CSI reporting band) or a total number of precoding matrices indicated by the PMI (one for each FD unit/component), $\alpha_i$ is a $2N_1N_2\times1$ (Eq. 1) or $N_1N_2\times1$ (Eq. 2) column vector, or $\alpha_i$ is a $P_{CSIRS}\times1$ (Eq. 1) or $$\frac{P_{CSIRS}}{2}\times 1$$

port selection column vector, where a port selection vector is a defined as a or vector which contains a value of 1 in one element and zeros elsewhere, $b_f$ is a $N_3\times1$ column vector, $c_{l,i,f}$ is a complex coefficient.

In a variation, when the UE reports a subset $K<2LM$ coefficients (where K is either fixed, configured by the gNB or reported by the UE), then the coefficient $c_{l,i,f}$ in precoder equations Eq. 1 or Eq. 2 is replaced with $x_{l,i,f}\times c_{l,i,f}$, where $x_{l,i,f}=1$ if the coefficient $c_{l,i,f}$ is reported by the UE according to some embodiments of this disclosure.

$x_{l,i,f}=0$ otherwise (i.e., $c_{l,i,f}$ is not reported by the UE).

The indication whether $x_{l,i,f}=1$ or 0 is according to some embodiments of this disclosure. For example, it can be via a bitmap.

In a variation, the precoder equations Eq. 1 or Eq. 2 are respectively generalized to $$W^l = \sum_{i=0}^{L-1} \sum_{f=0}^{M_i-1} c_{l,i,f}(a_i b_{i,f}^H) \tag{Eq. 3}$$

and $$W^l = \begin{bmatrix} \sum_{i=0}^{L-1} \sum_{f=0}^{M_i-1} c_{l,i,f}(a_i b_{i,f}^H) \\ \sum_{i=0}^{L-1} \sum_{=0}^{M_i-1} c_{l,i+L,f}(a_i b_{i,f}^H) \end{bmatrix}, \tag{Eq. 4}$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i\le M$ (where $\{M_i\}$ or $\Sigma M_i$ is either fixed, configured by the gNB or reported by the UE).

The columns of $W^l$ are normalized to norm one. For rank R or R layers ($v=R$), the pre-coding matrix is given by $$W^{(R)} = \frac{1}{\sqrt{R}}[\,W^1 \;\; W^2 \;\; \ldots \;\; W^R\,].$$

Eq. 2 is considered in the rest of the disclosure. The embodiments of the disclosure, however, are general and are also application to Eq. 1, Eq. 3 and Eq. 4.

Here $$L \le \frac{P_{CSI-RS}}{2} \text{ and } M \le N_3. \text{ If } L = \frac{P_{CSI-RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by $$w_f = \begin{bmatrix} 1 & e^{j\frac{2\pi n_{3,l}^{(f)}}{O_3N_3}} & e^{j\frac{2\pi.2n_{3,l}^{(f)}}{O_3N_3}} & \ldots & e^{j\frac{2\pi.(N_3-1)n_{3,l}^{(f)}}{O_3N_3}} \end{bmatrix}^T.$$

When $O_3=1$, the FD basis vector for layer $l\in\{1, \ldots, \upsilon\}$ (where v is the RI or rank value) is given by $$w_f = \left[\, y_{0,l}^{(f)} \;\; y_{1,l}^{(f)} \;\; \ldots \;\; y_{N_3-1,l}^{(f)} \,\right]^T, \text{ where } y_{t,l}^{(f)} = e^{j\frac{2\pi t n_{3,l}^{(f)}}{N_3}} \text{ and } n_{3,l} = \left[n_{3,l}^{(0)}, \ldots\, n_{3,l}^{(M-1)}\right] \text{ where } n_{3,l}^{(f)} \in \{0, 1, \ldots, N_3-1\}.$$

The use of DFT basis is for illustration purpose only. The disclosure is applicable to any other basis vectors to construct/report A and B.

On a high level, a precoder W' can be described as follows.

$$W = A_l C_l B_l^H = W_1 \tilde{W}_2 W_f^H, \tag{Eq. 5}$$

where $A=W_1$ corresponds to the Rel. 15 $W_1$ in Type II CSI codebook [REF8], and $B=W_f$.

The $C_l=\tilde{W}_2$ matrix comprises of all the required linear combination coefficients (e.g., amplitude and phase or real or imaginary). Each reported coefficient ($c_{l,i,f}=p_{l,i,f}\phi_{l,i,f}$) in $W_2$ is quantized as amplitude coefficient ($p_{l,i,f}$) and phase coefficient ($p_{l,i,f}$). In one example, the amplitude coefficient ($p_{l,i,f}$) is reported using a A-bit amplitude codebook where A belongs to {2, 3, 4}. If multiple values for A are supported, then one value is configured via higher layer signaling. In another example, the amplitude coefficient ($p_{l,i,f}$) is reported as $$p_{l,i,f} = p^{(1)}_{l,i,f} p^{(2)}_{l,i,f}$$

where $$p^{(1)}_{l,i,f}$$

is a reference or first amplitude which is reported using an A1-bit amplitude codebook where A1 belongs to {2, 3, 4}, and $$p^{(2)}_{l,i,f}$$

is a differential or second amplitude which is reported using an A2-bit amplitude codebook where A2≤A1 belongs to {2, 3, 4}.

For layer l, let us denote the linear combination (LC) coefficient associated with spatial domain (SD) basis vector (or beam) i∈{0, 1, . . . , 2L−1} and frequency domain (FD) basis vector (or beam) f∈{0, 1, . . . , M−1} as $c_{l,i,f}$, and the strongest coefficient as $c_{l,i*,f*}$+. The strongest coefficient is reported out of the $K_{NZ}$ non-zero (NZ) coefficients that is reported using a bitmap, where $K_{NZ} \leq K_0 = [\beta \times 2LM] < 2LM$ and β is higher layer configured. The remaining $2LM-K_{NZ}$ coefficients that are not reported by the UE are assumed to be zero. The following quantization scheme is used to quantize/report the $K_{NZ}$ NZ coefficients.

UE reports the following for the quantization of the NZ coefficients in $\tilde{W}_2$ A X-bit indicator for the strongest coefficient index (i*, f*), where $X=\lceil \log_2 K_{NZ} \rceil$ or $\lceil \log_2 2L \rceil$.

i. Strongest coefficient $c_{l,i*,f*}=1$ (hence its amplitude/phase are not reported)

Two antenna polarization-specific reference amplitudes is used.

i. For the polarization associated with the strongest coefficient $c_{l,i*,f*}*=1$, since the reference amplitude $$p^{(1)}_{l,i,f} = 1,$$

it is not reported ii. For the other polarization, reference amplitude $$p^{(1)}_{l,i,f}$$

is quantized to 4 bits

1. The 4-bit amplitude alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots , \left(\frac{1}{2^{14}}\right)^{\frac{1}{4}}\right\}.$$

For $\{c_{l,i,f}, (i,f) \neq (i^*, f^*)\}$:

i. For each polarization, differential amplitudes $$p^{(2)}_{l,i,f}$$

of the coefficients calculated relative to the associated polarization-specific reference amplitude and quantized to 3 bits 1. The 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

2. Note: The final quantized amplitude $p_{l,i,f}$ is given by $$p^{(1)}_{l,i,f} \times p^{(2)}_{l,i,f}$$

ii. Each phase is quantized to either 8PSK ($N_{ph}=8$) or 16PSK ($N_{ph}=16$) (which is configurable).

For the polarization r*∈{0, 1} associated with the strongest coefficient $c_{l,i*,f*}$, we have $$r^* = \left\lfloor \frac{i^*}{L} \right\rfloor$$

and the reference amplitude $$p^{(1)}_{l,i,f} = p^{(1)}_{l,r^*} = 1.$$

For the other polarization r∈{0, 1} and r≠r*, we have $$r = \left(\left\lfloor \frac{i^*}{L} \right\rfloor + 1\right)$$

mod 2 and the reference $$p^{(1)}_{l,i,f} = p^{(1)}_{l,r}$$

is quantized (reported) using the 4-bit amplitude codebook mentioned above.

In Rel. 16 enhanced Type II and Type II port selection codebooks, a UE can be configured to report M FD basis vectors. In one example, $$M = \left\lceil p \times \frac{N_3}{R} \right\rceil,$$

where R is higher-layer configured from {1, 2} and p is higher-layer configured from $$\left\{\frac{1}{4}, \frac{1}{2}\right\}.$$

In one example, the p value is higher-layer configured for rank 1-2 CSI reporting. For rank>2 (e.g., rank 3-4), the p value (denoted by $v_0$) can be different. In one example, for rank 1-4, (p, $v_0$) is jointly configured from {(½, ¼), (¼, ¼), (¼, ⅛)}, i.e., $$M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3 = N_{SB} \times R$ where $N_{SB}$ is the number of SBs for CQI reporting. In one example, M is replaced with $M_\upsilon$ to show its dependence on the rank value υ, hence p is replaced with $p_\upsilon$, υ∈{1, 2} and $v_0$ is replaced with $p_\upsilon$, υ∈{3, 4}.

A UE can be configured to report $M_\upsilon$ FD basis vectors in one-step from $N_3$ basis vectors freely (independently) for each layer l∈{1, . . . , υ} of a rank υ CSI reporting. Alternatively, a UE can be configured to report $M_\upsilon$ FD basis vectors in two-step as follows.

In step 1, an intermediate set (InS) comprising $$N_3' < N_3$$

basis vectors is selected/reported, wherein the InS is common for all layers.

In step 2, for each layer l∈{1, . . . , υ} of a rank υ CSI reporting, $M_\upsilon$ FD basis vectors are selected/reported freely (independently) from $$N_3'$$

basis vectors in the InS.

In one example, one-step method is used when $N_3 \le 19$ and two-step method is used when $N_3 > 19$. In one example, $$N_3' = 2M_\upsilon$$

The codebook parameters used in the DFT based frequency domain compression (Eq. 5) are (L, $p_\upsilon$ for υ∈{1, 2}, $p_\upsilon$ for υ∈{3, 4}, β, α, $N_{ph}$). The set of values for these codebook parameters are as follows.

L: the set of values is {2, 4} in general, except L∈{2, 4, 6} for rank 1-2, 32 CSI-RS antenna ports, and R=1.

($p_\upsilon$ for υ∈{1, 2}, $p_\upsilon$ for υ∈{3, 4})={(½, ¼), (¼, ¼), (¼, ⅛)}.

β∈{¼, ½, ¾}.

$N_{ph}$=16.

The set of values for these codebook parameters are as in Table 1.

TABLE 1

| | | $p_v$ | | |
|---|---|---|---|---|
| paramCombination | L | v ∈ {1, 2} | v ∈ {3, 4} | β |
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |
| 7 | 6 | ¼ | — | ½ |
| 8 | 6 | ¼ | — | ¾ |

In Rel. 17 (further enhanced Type II port selecting codebook), M∈{1, 2}, $$L = \frac{K_1}{2}$$

where $K_1 = \alpha \times P_{CSIRS}$, and codebook parameters (M, α, β) are configured from Table 2.

TABLE 2

| paramCombination-r17 | M | α | β |
|---|---|---|---|
| 1 | 1 | ¾ | ½ |
| 2 | 1 | 1 | ½ |
| 3 | 1 | 1 | ¾ |
| 4 | 1 | 1 | 1 |
| 5 | 2 | ½ | ½ |
| 6 | 2 | ¾ | ½ |
| 7 | 2 | 1 | ½ |
| 8 | 2 | 1 | ¾ |

The above-mentioned framework (Eq. 5) represents the precoding-matrices for multiple ($N_3$) FD units using a linear combination (double sum) over 2 L (or $K_1$) SD beams/ports and $M_\upsilon$ FD beams. This framework can also be used to represent the precoding-matrices in time domain (TD) by replacing the FD basis matrix $W_f$ with a TD basis matrix $W_t$, wherein the columns of $W_t$ comprises $M_\upsilon$ TD beams that represent some form of delays or channel tap locations. Hence, a precoder $W^l$ can be described as follows.

$$W = A_l C_l B_l^H = W_1 \tilde{W}_2 W_t^H, \quad \text{(Eq. 5A)}$$

In one example, the $M_\upsilon$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The remainder of the present disclosure is applicable to both space-frequency (Eq. 5) and space-time (Eq. 5A) frameworks.

Figure 15:
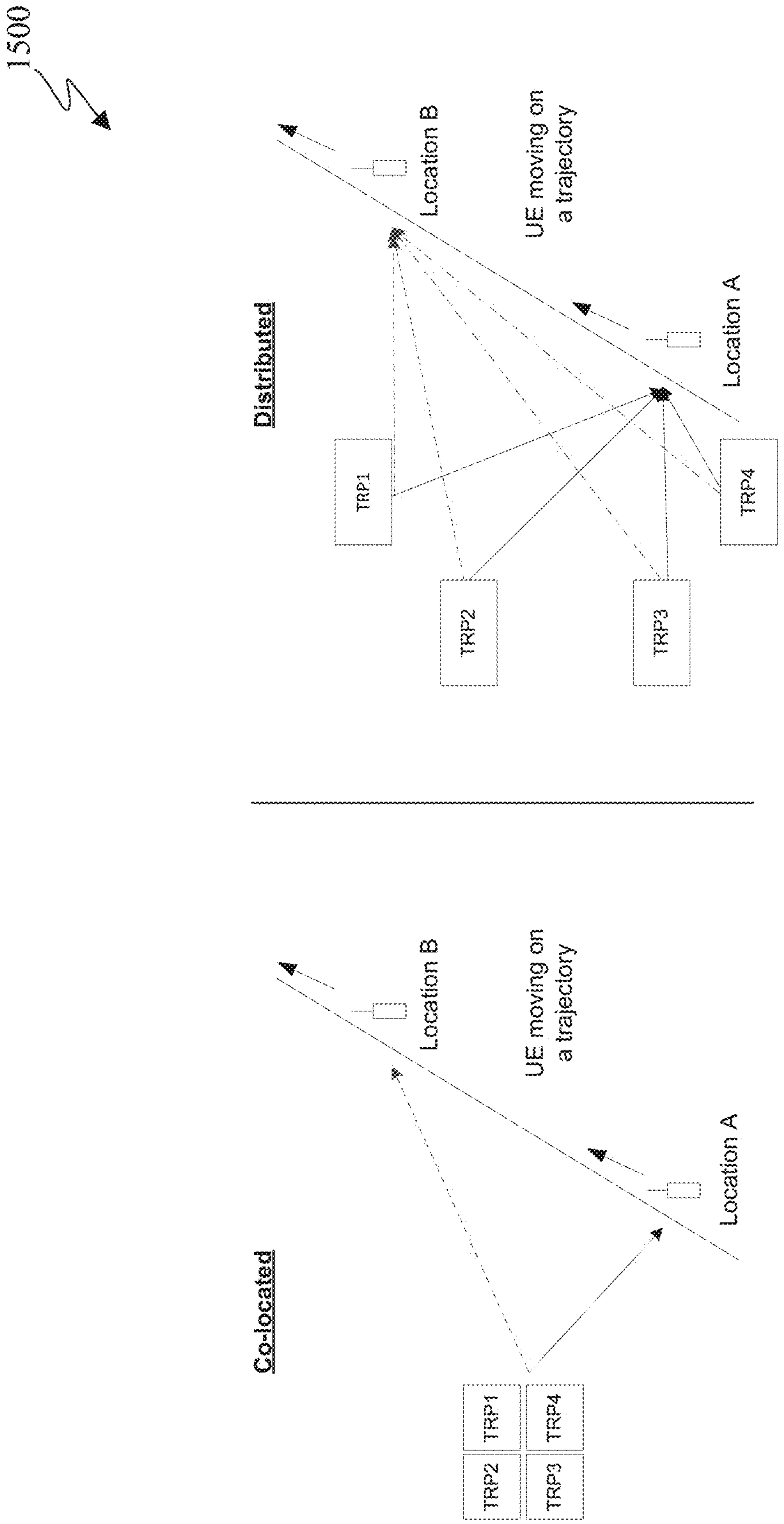
FIG. 15 illustrates co-located and distributed TRPs serving a moving UE according to embodiments of the present disclosure.

FIG. 15 illustrates co-located and distributed TRPs serving a moving UE 1500 according to embodiments of the present disclosure. The embodiment of the co-located and distributed TRPs serving a moving UE 1500 illustrated in FIG. 15 is for illustration only. FIG. 15 does not limit the scope of this disclosure to any particular implementation of the co-located and distributed TRPs serving a moving UE 1500.

In the present disclosure, the abovementioned framework for CSI reporting based on space-frequency compression (equation 5) or space-time compression (equation 5A) frameworks can be extended in two directions:

time or Doppler domain compression (e.g., for moderate to high mobility UEs) and joint transmission across multiple RRHs/TRP (e.g., for a DMIMO or multiple TRP systems).

In one example scenario, multiple TRPs can be co-located or distributed, and can serve static (non-mobile) or moving UEs. An illustration of TRPs serving a moving UE is shown in FIG. 10. While the UE moves from a location A to another location B, the UE measures the channel, e.g., via NZP CSI-RS resources, (may also measure the interference, e.g., via CSI-IM resources or CSI-RS resources for interference measurement), uses the measurement to determine/report CSI considering joint transmission from multiple TRPs. The reported CSI can be based on a codebook. The codebook can include components considering multiple TRPs, and frequency/delay-domain channel profile and time/Doppler-domain channel profile.

Figure 16:
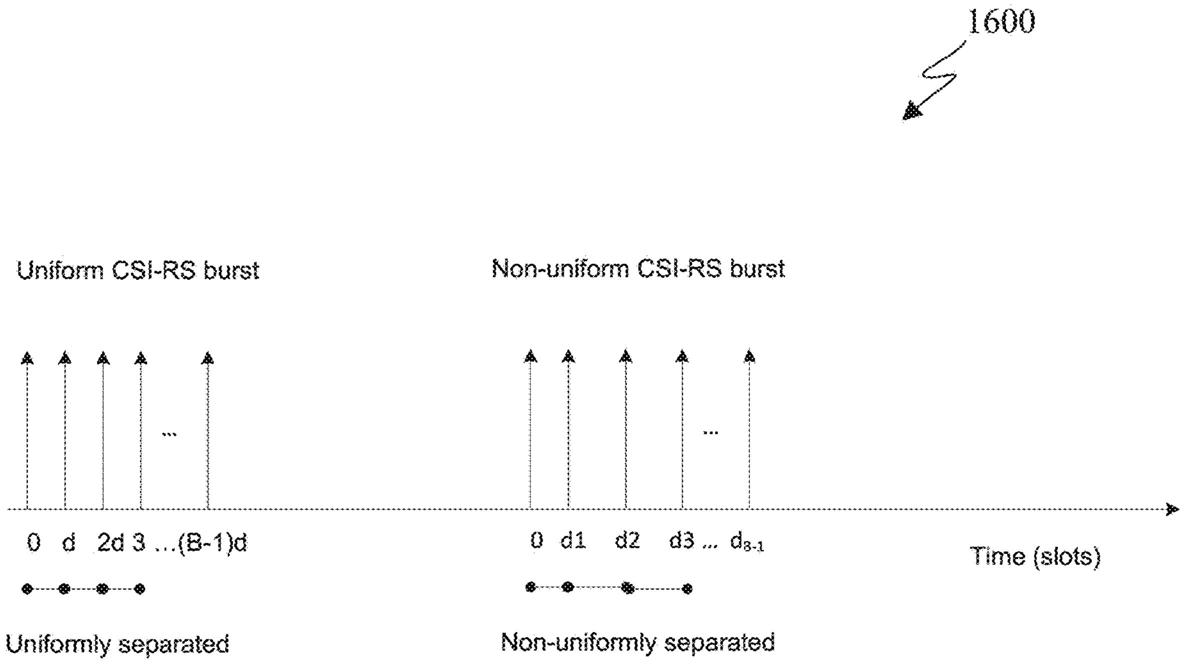
FIG. 16 illustrates an example of a UE configured to receive a burst of non-zero power (NZP) CSI reference signal (CSI-RS) resources according to embodiments of the present disclosure.

FIG. 16 illustrates an example of a UE configured to receive a burst of non-zero power (NZP) CSI reference signal (CSI-RS) resources 1600 according to embodiments of the present disclosure. The embodiment of the UE configured to receive a burst of non-zero power (NZP) CSI reference signal (CSI-RS) resources 1600 illustrated in FIG. 16 is for illustration only. FIG. 16 does not limit the scope of this disclosure to any particular implementation of the UE configured to receive a burst of non-zero power (NZP) CSI reference signal (CSI-RS) resources 1600.

In one embodiment, as shown in FIG. 16, a UE is configured to receive a burst of non-zero power (NZP) CSI-RS resource(s), referred to as CSI-RS burst for brevity, within B time slots comprising a measurement window, where B≥1. The B time slots can be accordingly to at least one of the following examples.

In one example, the B time slots are evenly/uniformly spaced with an inter-slot spacing d.

In one example, the B time slots can be non-uniformly spaced with inter-slot spacing $e_1=d_1$, $e_2=d_2-d_1$, $e_3=d_3-d_2$, . . . , so on, where $e_i \neq e_j$ for at least one pair (i,j) with i≠j.

The UE receives the CSI-RS burst, estimates the B instances of the DL channel measurements, and uses the channel estimates to obtain the Doppler component(s) of the DL channel. The CSI-RS burst can be linked to (or associated with) a single CSI reporting setting (e.g., via higher layer parameter CSI-ReportConfig), wherein the corresponding CSI report includes an information about the Doppler component(s) of the DL channel.

Let $h_t$ be the DL channel estimate based on the CSI-RS resource(s) received in time slot $t \in \{0, 1, \ldots, B-1\}$. When the DL channel estimate in slot t is a matrix $G_t$ of size $N_{Rx} \times N_{Tx} \times N_{Sc}$, then $h_t=\mathrm{vec}(G_t)$, where $N_{Rx}$, $N_{Tx}$, and $N_{Sc}$ are number of receive (Rx) antennae at the UE, number of CSI-RS ports measured by the UE, and number of subcarriers in frequency band of the CSI-RS burst, respectively. The notation vec(X) is used to denote the vectorization operation wherein the matrix X is transformed into a vector by concatenating the elements of the matrix in an order, for example, 1→2→3→ and so on, implying that the concatenation starts from the first dimension, then moves second dimension, and continues until the last dimension. Let $H_B=[h_0\ h_1\ \ldots\ h_{B-1}]$ be a concatenated DL channel. The Doppler component(s) of the DL channel can be obtained based on $H_B$. For example, $H_B$ can be represented as $$C\Phi^H = \sum_{s=0}^{N-1} c_s \phi_s^H$$

where $\Phi=[\phi_0\ \phi_1\ \ldots\ \phi_{N-1}]$ is a Doppler domain (DD) basis matrix whose columns comprise basis vectors, $C=[c_0\ c_1\ \ldots\ c_{N-1}]$ is a coefficient matrix whose columns comprise coefficient vectors, and N<B is the number of DD basis vectors. Since the columns of $H_B$ are likely to be correlated, a DD compression can be achieved when the value of N is small (compared to the value of B). In this example, the Doppler component(s) of the channel is represented by the DD basis matrix Φ and the coefficient matrix C.

When there are multiple TRPs/RRHs ($N_{RRH}>1$), the UE can be configured to measure the CSI-RS burst(s) according to at least one of the following examples.

In one example, the UE is configured to measure $N_{RRH}$ CSI-RS bursts, one from each TRP/RRH. The $N_{RRH}$ CSI-RS bursts can be overlapping in time (i.e., measured in same time slots). Or, they can be staggered in time (i.e., measured in different time slots). Whether overlapping or staggered can be determined based on configuration. It can also depend on the total number of CSI-RS ports across RRHs/TRPs. When the total number of ports is small (e.g., <=32), they can overlap, otherwise (>32), they are staggered. The number of time instances B can be the same for all of the $N_{RRH}$ bursts. Or, the number B can be the same or different across bursts (or TRPs/RRHs).

In one example, each CSI-RS burst corresponds to a semi-persistent (SP) CSI-RS resource. The SP CSI-RS resource can be activated and/or deactivated based on a MAC CE and/or DCI based signaling.

In one example, each CSI-RS burst corresponds to a group of B≥1 aperiodic (Ap) CSI-RS resources. The Ap-CSI-RS resources can be triggered via a DCI with slot offsets such that they can be measured in B different time slots.

In one example, each CSI-RS burst corresponds to a periodic (P) CSI-RS resource. The P-CSI-RS resource can be configured via higher layer. The first measurement instance (time slot) and the measurement window of the CSI-RS burst (from the P-CSI-RS resource) can be fixed, or configured.

In one example, a CSI-RS burst can either be a P-CSI-RS, or SP-CSI-RS or Ap-CSI-RS resource.

In one example, the time-domain behavior (P, SP, or Ap) of $N_{RRH}$ CSI-RS bursts is the same.

In one example, the time-domain behavior of $N_{RRH}$ CSI-RS bursts can be the same or different.

In one example, the UE is configured to measure $K \geq N_{RRH}$ CSI-RS bursts, where $$K = \sum_{r=1}^{N_{RRH}} K_r$$

and $K_r$ is a number of CSI-RS bursts associated with RRH/TRP r, where $r \in \{1, \ldots, N_{RRH}\}$. Each CSI-RS burst is according to at least one of the examples herein. When $K_r>1$, multiple CSI-RS bursts are linked to (or associated with) a CSI reporting setting, i.e., the UE receives the $N_r$ CSI-RS bursts, estimates the DL channels, and obtains the Doppler component(s) of the channel using all of the $N_r$ CSI-RS bursts.

In one example, the UE is configured to measure one CSI-RS burst across all of $N_{RRH}$ TRPs/RRHs. Let P be a number of CSI-RS ports associated with the NZP CSI-RS resource measured via the CSI-RS burst. The CSI-RS burst is according to at least one of the examples herein. The total of P ports can be divided into $N_{RRH}$ groups/subsets of ports and one group/subset of ports is associated with (or corresponds to) a TRP/RRH. Then, $$P = \sum_{r=1}^{N_{RRH}} P_r$$

and $P_r$ is a number of CSI-RS ports in the group/subset of ports associated with RRH/TRP r.

- In one example, in each of the B time instances, a UE is configured to measure all groups/subsets of ports, i.e., in each time instance within the burst, the UE measures all of P ports (or $N_{RRH}$ groups/subsets of ports).
- In one example, a UE is configured to measure subsets/groups of ports across multiple time instances, i.e., in each time instance within the burst, the UE measures a subset of P ports or a subset of groups of ports (RRHs/TRPs).
  - In one example, in each time instance, the UE measures only one group/subset of ports (1 TRP per time instance). In this case, $B=N_{RRH}\times C$ or $B\geq N_{RRH}\times C$, where C is a number of measurement instances for each TRP/RRH.
  - In one example, the UE is configured to measure one half of the port groups in a time instance, and the remaining half in another time instance.
    - In one example, the two time instances can be consecutive, for example, the UE measures one half of port groups in even-numbered time instances, and the remaining half in the odd-numbered time instances.
    - In one example, a first half of the time instances (e.g., 0, 1, . . . , B/2−1) is configured to measure one half of the port groups, and the second half of the time instances (e.g., B/2, . . . B−1) is configured to measure the remaining half of the port groups.
- In one example, the UE is configured to measure multiple CSI-RS bursts, where each burst is according to at least one of the examples herein. Multiple CSI-RS bursts are linked to (or associated with) a CSI reporting setting, i.e., the UE receives multiple CSI-RS bursts, estimates the DL channels, and obtains the Doppler component(s) of the channel using all of multiple CSI-RS bursts.

Figure 17:
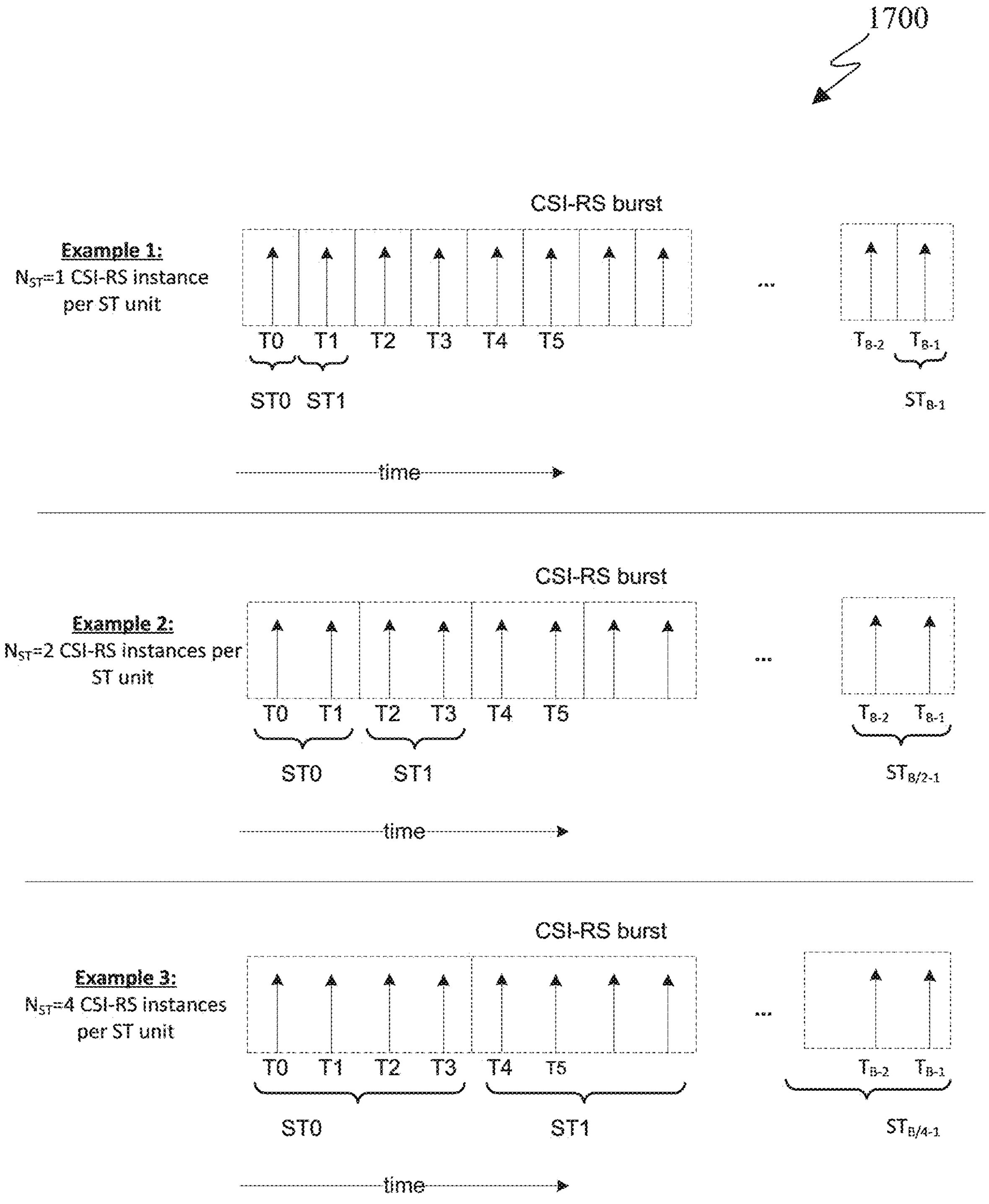
FIG. 17 illustrates an example of a UE configured to determine a value of $N_4$ based on the value B in a CSI-RS burst according to embodiments of the present disclosure.

FIG. 17 illustrates an example of a UE configured to determine a value of $N_4$ based on the value B in a CSI-RS burst 1700 according to embodiments of the present disclosure. The embodiment of the UE configured to determine a value of $N_4$ based on the value B in a CSI-RS burst 1700 illustrated in FIG. 17 is for illustration only. FIG. 17 does not limit the scope of this disclosure to any particular implementation of the UE configured to determine a value of $N_4$ based on the value B in a CSI-RS burst 1700.

Let $N_4$ be the length of the DD basis vectors $\{\phi_s\}$, e.g., each basis vector is a length $N_4\times1$ column vector.

In one embodiment, a UE is configured to determine a value of $N_4$ based on the value B (number of CSI-RS instances) in a CSI-RS burst and components across which the DD compression is performed, where each component corresponds to one or multiple time instances within the CSI-RS burst. In one example, $N_4$ is fixed (e.g., $N_4$=B) or configured (e.g., via RRC or MAC CE or DCI) or reported by the UE (as part of the CSI report). In one example, the B CSI-RS instances can be partitioned into sub-time (ST) units (instances), where each ST unit is defined as (up to) $N_{ST}$ contiguous time instances in the CSI-RS burst. In this example, a component for the DD compression corresponds to a ST unit. Three examples of the ST units are shown in FIG. 17. In the first example, each ST unit comprises $N_{ST}=1$ time instance in the CSI-RS burst. In the second example, each ST unit comprises $N_{ST}=2$ contiguous time instances in the CSI-RS burst. In the third example, each ST unit comprises $N_{ST}=4$ contiguous time instances in the CSI-RS burst.

The value of $N_{ST}$ can be fixed (e.g., $N_{ST}$=1 or 2 or 4) or indicated to the UE (e.g., via higher layer RRC or MAC CE or DCI based signaling) or reported by the UE (e.g., as part of the CSI report). The value of $N_{ST}$ (fixed or indicated or reported) can be subject to a UE capability reporting. The value of $N_{ST}$ can also be dependent on the value of B (e.g., one value for a range of values for B and another value for another range of values for B).

Figure 18:
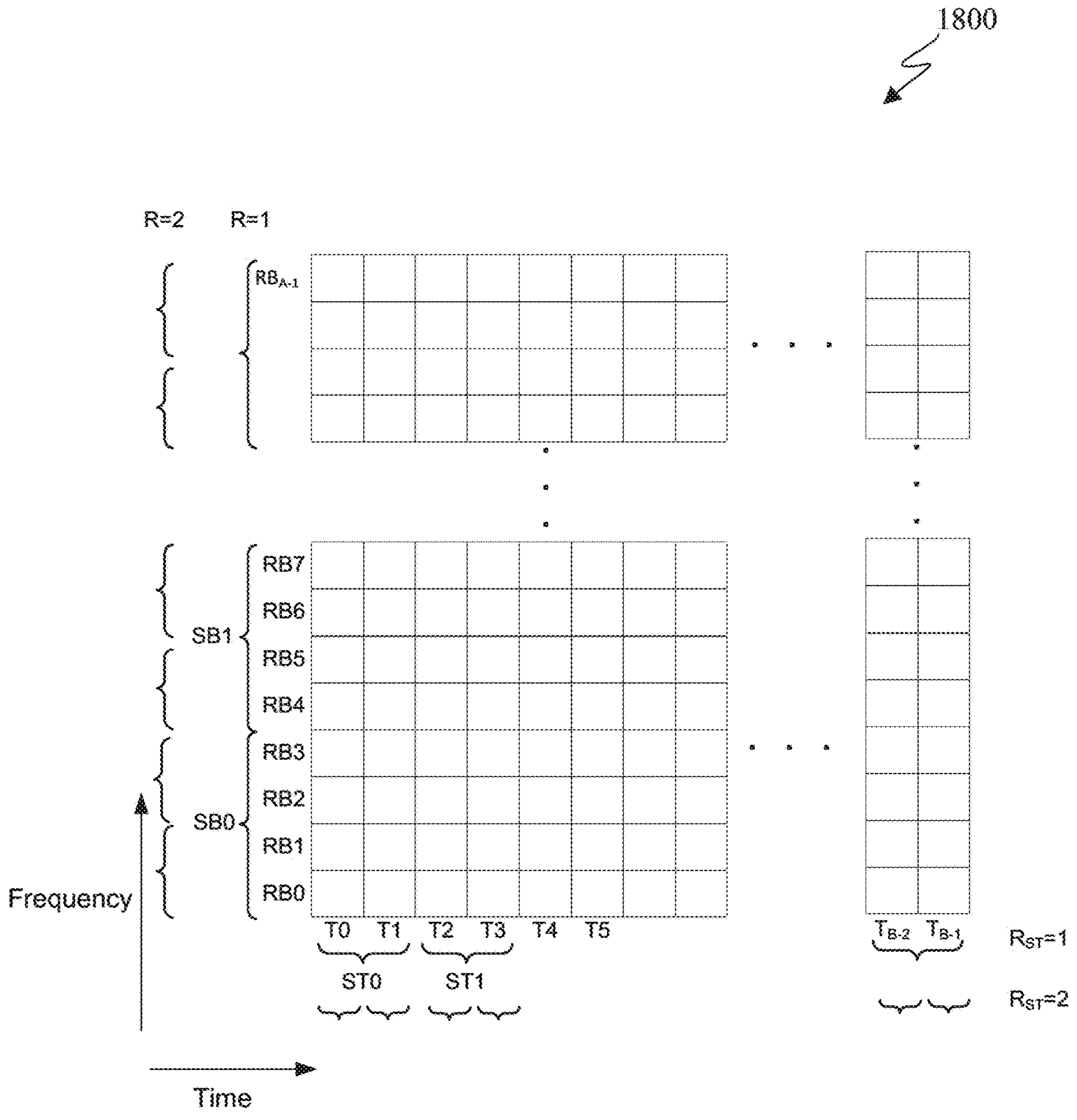
FIG. 18 illustrates an example of a UE configured to partition resource blocks (RBs) into subbands and time instances into sub-times according to embodiments of the present disclosure.

FIG. 18 illustrates an example of a UE configured to partition resource blocks (RBs) into subbands and time instances into sub-times 1800 according to embodiments of the present disclosure. The embodiment of the UE configured to partition resource blocks (RBs) into subbands and time instances into sub-times 1800 illustrated in FIG. 18 is for illustration only. FIG. 18 does not limit the scope of this disclosure to any particular implementation of the UE configured to partition resource blocks (RBs) into subbands and time instances into sub-times 1800.

When there are multiple TRPs/RRHs ($N_{RRH}>1$), the UE can be configured to determine a value of $N_4$ according to at least one of the following examples.

- In one example, a value of $N_4$ is the same for all TRPs/RRHs.
- In one example, a value of $N_4$ can be the same or different across TRPs/RRHs.

In one embodiment, a UE is configured with J≥1 CSI-RS bursts (as illustrated earlier in the disclosure) that occupy a frequency band and a time span (duration), wherein the frequency band comprises A RBs, and the time span comprises B time instances (of CSI-RS resource(s)). When J>1, the A RBs and/or B time instances can be aggregated across J CSI-RS bursts. In one example, the frequency band equals the CSI reporting band and the time span equals the number of CSI-RS resource instances (across/CSI-RS bursts), both can be configured to the UE for a CSI reporting, which can be based on the DD compression.

The UE is further configured to partition (divide) the A RBs into subbands (SBs) and/or the B time instances into sub-times (STs). The partition of A RBs can be based on a SB size value $N_{SB}$, which can be configured to the UE (cf. Table 5.2.1.4-2 of REF8). The partition of B time instances can be based either a ST size value $N_{ST}$ or an r value, as described in this disclosure). An example is illustrated in FIG. 18, where RB0, RB1, . . . , $RB_{A-1}$ comprise A RBs, $T_0$, $T_1$, . . . , $T_{B-1}$ comprise B time instances, the SB size $N_{SB}=4$, and the ST size $N_{ST}=2$.

When there are multiple TRPs/RRHs ($N_{RRH}>1$), the UE can be configured to determine subbands (SBs) and/or sub-times (STs) according to at least one of the following examples.

- In one example, both subbands (SBs) and/or sub-times (STs) are the same for all TRPs/RRHs.
- In one example, subbands (SBs) are the same for all TRPs/RRHs, but sub-times (STs) can be the same or different across RRHs/TRPs.
- In one example, subtimes (STs) are the same for all TRPs/RRHs, but subbands (SBs) can be the same or different across RRHs/TRPs.
- In one example, both subtimes (STs) and subbands (SBs) can be the same or different across RRHs/TRPs.

For illustration, the example where both subbands (SBs) and/or sub-times (STs) are the same for all TRPs/RRHs is assumed in the rest of this disclosure.

The CSI reporting is based on channel measurements (based on CSI-RS bursts) in three-dimensions (3D): the first dimension corresponds to SD comprising $P_{CSIRS}$ CSI-RS antenna ports (in total across all of $N_{RRH}$ RRHs/TRPs), the second dimension corresponds to FD comprising $N_3$ FD units (e.g., SB), and the third dimension corresponds to DD comprising $N_4$ DD units (e.g., ST). The 3D channel measurements can be compressed using basis vectors (or matrices) similar to the Rel. 16 enhanced Type II codebook. Let $W_1$, $W_f$, and $W_d$ respectively denote basis matrices whose columns comprise basis vectors for SD, FD, and DD.

In one embodiment, the DD compression (or DD component or $W_d$ basis) can be turned OFF/ON from the codebook. When turned OFF, $W_d$ can be fixed (hence not reported), e.g., $W_d=1$ (scalar 1) or $W_d=[1, \ldots, 1]$ (all-one vector) or $$W_d = \frac{1}{n}[1, \ldots, 1] \text{ (all-one vector)}$$

or $$W_d = I = \begin{bmatrix} 1 & 0 & 0 \\ 0 & \ddots & 0 \\ 0 & 0 & 1 \end{bmatrix}$$

(identity matrix), where n is a scaling factor (e.g., $n=N_4$) or $$W_d = h_{d^*} = \left[\phi_0^{(d^*)} \ \phi_1^{(d^*)} \ \ldots \ \phi_{N_4-1}^{(d^*)}\right],$$

where d* is an index of a fixed DD basis vector $h_{d^*}$. In one example, d*=0. In one example, when the DD basis vectors comprise an orthogonal DFT basis set, $h_{d^*}$ is a DD basis vector which corresponds to the DC component. When turned ON, $W_d$ (DD basis vectors) is reported.

- In one example, $W_d$ is turned OFF/ON via an explicit signaling, e.g., an explicit RRC parameter.
- In one example, $W_d$ is turned OFF/ON via a codebook parameter. For example, similar to M=1 in Rel. 17, when N=1 is configured, $W_d$ is turned OFF, and when a value N>1 is configured, $W_d$ is turned ON. Here, N denotes a number of DD basis vectors comprising columns of $W_d$.
- In one example, the UE reports whether the DD component is turned OFF (not reported) or ON (reported). This reporting can be via a dedicated parameter (e.g., new UCI/CSI parameter). Or, this reporting can be via an existing parameter (e.g., PMI component). A two-part UCI (cf. Rel. 15 NR) can be reused wherein the information whether $W_d$ is turned OFF/ON is included in UCI part 1.
- In one example, $W_d$ is turned OFF/ON depending on the codebookType. When the codebookType is regular Type II codebook (similar to Rel 16 Type II codebook), $W_d$ is turned ON, and when the codebookType is Type II port selection codebook (similar to Rel 17 Type II codebook), $W_d$ is turned ON/OFF.

In one embodiment, a UE is configured with a CSI reporting based on a codebook (UE configured with higher layer parameter codebookType set to ' typeII-Doppler-r18'), where the codebook comprises three bases (SD, FD, and DD/TD), and has a structure such that precoder for layer l is given by $$W_l = W_1 \tilde{W}_2 (W_{f,d})^H$$

Where

- $W_1$ includes SD basis vectors
- $W_{f,d}$ includes FD basis vectors and TD/DD basis vectors
- $\tilde{W}_2$ is a coefficient matrix Let the length of each TD/DD basis vector be $N_4$, and the number of TD/DD basis vectors be Q. In one example, $N_4$ is configured, e.g., via higher-layer (RRC) signalling. In one example, Q is configured via RRC, or reported by the UE (e.g., as part of CSI report). In one example, the legacy (Rel. 16 enhanced Type II or Rel. 17 further enhanced Type II codebook) is used for reporting $W_1$, $W_f$ (for each layer), and $\tilde{W}_2$ (for each layer).

In one example, at least one of the following examples is used/configured regarding $W_{f,d}$.

In one example, $W_{f,d}=W_f \otimes I$, hence $W_l=W_1\tilde{W}_2(W_f \otimes I)^H$, where the notation $\otimes$ is used for the Kronecker product. Note that when I is z×z identity matrix, then $W_f \otimes I$ implies that $W_f$ is repeated z times. Therefore, $=W_1 W_2 (W_f \otimes I)^H$ corresponds to one $W_1$, one $W_f$, and z number of $W_2$ reports. In one example, z corresponds to number of TD/DD units. In one example, z corresponds to value of $N_4$ (i.e., $z=N_4$). In one example, the legacy (Rel. 16 enhanced Type II or Rel. 17 further enhanced Type II codebook) is used for reporting one $W_1$, one $W_f$ (for each layer), and multiple $W_2$ (for each layer).

In one example, $W_{f,d}=W_f \otimes W_d$, hence $W_l=W_1\tilde{W}_2(W_f \otimes W_d)^H$. In one example, $W_d$ comprises orthogonal DFT vectors as columns. The columns of the $W_d$ correspond to the DD basis vectors In one example, $W_{f,d}$ is according to one or more examples herein based on a condition on the value of $N_4$. For example,

- For $N_4 \le x$, $W_{f,d}$ is according to one or more examples herein.
- For $N_4 > x$, $W_{f,d}$ is according to one or more examples herein. In one example, $W_d$ is an orthogonal DFT basis matrix commonly selected for all SD/FD bases reusing the legacy $W_1$ and $W_f$ (Rel. 16 enhanced Type II or Rel. 17 further enhanced Type II codebook). In one example, DFT vectors for DD basis has a oversampling or rotation factor ($O_4$). In one example, $O_4=4$ or 1 is fixed. In one example, $O_4$ is identical (the same) for different SD components. In one example, $O_4$ is different for different SD components.

In one example, x is fixed, e.g., x=1 or x=2.

In one example, x is configured, e.g., via higher layer (RRC) or MAC CE or DCI (e.g., CSI request field triggering a Aperiodic CSI report).

In one example, x is reported by the UE, e.g., the UE reports the value of x via UE capability reporting, or via CSI report.

When x=1, the condition is equivalent to the following.

For $N_4=1$, $W_{f,d}$ is according to one or more examples herein. In this case, since I=1, $W_1=W_1\tilde{W}_2(W_f)^H$, i.e., there is no DD/TD basis, or it is replaced with a scalar value 1. In this case, the PMI reporting can be according to legacy codebook (Rel. 16 enhanced Type II or Rel. 17 further enhanced Type II codebook).

For $N_4>1$, $W_{f,d}$ is according to one or more examples herein. In one example, $W_d$ is an orthogonal DFT basis matrix commonly selected for all SD/FD bases reusing the legacy $W_1$ and $W_f$ (Rel. 16 enhanced Type II or Rel. 17 further enhanced Type II codebook). In one example, DFT vectors for DD basis has a oversampling or rotation factor ($O_4$). In one example, $O_4$=4 or 1 is fixed. In one example, $O_4$ is identical (the same) for different SD components. In one example, $O_4$ is different for different SD components. In one example, only Q (denoting the number of selected DD basis vectors or columns of $W_d$)>1 is allowed, i.e., the UE is expected to be configured with Q>1 (e.g., Q=2 or 3 or . . . ), or the UE is not expected to be configured with Q=1.

In one example, at least one of the following examples is used/configured regarding the value of $N_4$.

In one example, the set of supported values for $N_4$ includes $N_4=1$. When $N_4=1$, the $W_{f,d}$ is according to one or more examples herein. In particular, since I=1, $W_1=W_1\tilde{W}_2(W_f)^H$, i.e., there is no DD/TD basis, or it is replaced with a scalar value 1. In this case, the PMI reporting can be according to legacy codebook (Rel. 16 enhanced Type II or Rel. 17 further enhanced Type II codebook).

In one example, the set of supported values for $N_4$ does not include $N_4=2$. Or, the UE is not expected to be configured with $N_4=2$. Or, the UE is expected to be configured with a value of $N_4\neq 2$.

In one example, the set of supported values for $N_4$ includes $N_4=2$.

In one example, when $N_4=2$, the $W_{f,d}$ is according to one or more examples herein, implying the DD basis is a 2×2 identity matrix 1. That is, two $\tilde{W}_2$ are reported (corresponding to 2 TD units) for each layer, in addition to one $W_1$ and one $W_f$ for each layer.

In one example, when $N_4=2$, the $W_{f,d}$ is according to one or more examples herein, implying the DD basis is a orthogonal DFT matrix $W_d$.

In one example, only Q=1 is supported (or can be configured) when $N_4=2$. Or, the UE is expected to be configured with Q=1 when $N_4=2$ is configured. Or, Or, the UE is not expected to be configured with Q=2 when $N_4=2$ is configured.

In one example, only Q=2 is supported (or can be configured) when $N_4=2$. Or, the UE is expected to be configured with Q=2 when $N_4=2$ is configured. Or, the UE is not expected to be configured with Q=1 when $N_4=2$ is configured.

In one example, only Q=1 or only Q=2 or both Q=1, 2 can be configured to a UE subject to the UE capability reporting about the value of Q and/or $N_4$ from the UE.

In one example, when $N_4=2$, then one or more examples herein can be used/configured regarding the value of Q and/or $W_{f,d}$. Or, when $N_4=2$, the UE is not expected to be configured with Q=1 and can be configured with Q=2 or the identity DD basis.

In one example, the set of supported values for $N_4$ includes $N_4=3$. In one example, when $N_4=3$, the $W_{f,d}$ is according to one or more examples herein, implying the DD basis is a orthogonal DFT matrix $W_d$. In one example, only Q=1, 2 is supported (or can be configured) when $N_4=3$. Or, the UE is expected to be configured with Q=1 or 2 when $N_4=3$ is configured. Or, the UE is not expected to be configured with Q=3 when $N_4=3$ is configured. In one example, only Q>1 (e.g., Q=2 or 3) is supported (or can be configured) when $N_4=3$. Or, the UE is expected to be configured with Q=2 or 3 when $N_4=3$ is configured. Or, the UE is not expected to be configured with Q=1 when $N_4=3$ is configured.

In one example, the set of supported values for $N_4$ includes $N_4=y$, where y≥3 (i.e, {3, 4, . . . }). In one example, when $N_4=y$, the $W_{f,d}$ is according to one or more examples herein, implying the DD basis is a orthogonal DFT matrix $W_d$. In one example, only Q=1, . . . , y−1 is supported (or can be configured) when $N_4=y$. Or, the UE is expected to be configured with Q=1, 2, . . . or y−1 when $N_4=y$ is configured. Or, the UE is not expected to be configured with Q=y when $N_4=y$ is configured. In one example, only Q>1 (e.g., Q=2 or 3 or . . . ) is supported (or can be configured) when $N_4=y$. Or, the UE is expected to be configured with Q=2 or 3 or . . . when $N_4=3$ is configured. Or, the UE is not expected to be configured with Q=1 when $N_4=y$ is configured.

In one example, the set of supported values for $N_4$ includes {1, 2}. When $N_4=1$, the $W_{f,d}$ is according to one or more examples herein. When $N_4=2$, the $W_{f,d}$ is according to one or more examples herein.

In one example, the set of supported values for $N_4$ includes {1, 3} and does not include 2. That is, $N_4=2$ is not supported. Or, the UE is not expected to be configured with $N_4=2$. When $N_4=1$, the $W_{f,d}$ is according to one or more examples herein. When $N_4=3$, the $W_{f,d}$ is according to one or more examples herein.

In one example, the set of supported values for $N_4$ includes S or is equal to S.

In one example, S={1, 2}.
In one example, S={1, 3}.
In one example, S={2, 3}.
In one example, S={1, 2, 3}.
In one example, S={1, 2, 4}.
In one example, S={1, 3, 4}.
In one example, S={2, 3, 4}.
In one example, S={1, 2, 3, 4}.
In one example, S={1, 2, 3, 4, 8}.
In one example, S={1, 2, 3, 4, 8, 16}.
In one example, S={1, 2, 3, 4, 8, 16, 32}.
In one example, S={1, 3, 4, 8}.
In one example, S={1, 3, 4, 8, 16}.
In one example, S={1, 3, 4, 8, 16, 32}.
In one example, S={1, 4, 8}.
In one example, S={1, 4, 8, 16}.
In one example, S={1, 4, 8, 16, 32}.

In one example, at least one of the following examples is used/configured regarding the value of Q.

In one example, the set of supported values for Q includes Q=1. When Q=1, the $W_{f,d}$ is according to one or more examples herein. In particular, since I=1, $W_1=W_1\tilde{W}_2(W_f)^H$, i.e., there is no DD/TD basis, or it is replaced with a scalar value 1 or an all-one vector or an identity matrix. In this case, the PMI reporting can be according to legacy codebook (Rel. 16 enhanced Type II or Rel. 17 further enhanced Type II codebook). In one example, the number of TD/DD unit is 1. In one example, Q=1 corresponds to a wide-time reporting, i.e., the PMI (precoding matrix) is the same for all TD/DD units, or the number of PMI or precoding matrix in TD is 1. In one example, such PMI reporting is regardless of the $N_4$ values (whether 1 or >1).

In one example, the set of supported values for Q does not include Q=1 (i.e., only Q>1 is supported or can be configured). Or, the UE is not expected to be configured with Q=1. Or, the UE is expected to be configured with a value of Q>1 (e.g., Q=2 or 3 or . . . ).

In one example, the set of supported values for Q includes Q=2. When Q=2, there is DD/TD compression and the $W_{f,d}$ is according to one or more examples herein. The value of $N_4$ is either ≥2 or ≥3. In one example, $N_4$=2 is not supported when Q=2, i.e., the UE is not expected to be configured with Q=2 and $N_4$=2. That is, $N_4$≥3 when Q=2.

In one example, the set of supported values for Q does not include Q=2. Or, the UE is not expected to be configured with Q=2. Or, the UE is expected to be configured with a value of Q≠2.

In one example, the set of supported values for Q includes Q=q where q≥3 (i.e, {3, 4, . . . }). When Q=q, there can be DD compression and the $W_{f,d}$ is according to one or more examples herein, implying the DD basis is a orthogonal DFT matrix $W_d$. In one example, only Q=q=1, . . . , y−1 is supported (or can be configured) when $N_4$=y. Or, the UE is expected to be configured with Q=q=1, 2, . . . or y−1 when $N_4$=y is configured. Or, the UE is not expected to be configured with Q=y when $N_4$=y is configured. In one example, only Q=q=2, . . . , y−1 is supported (or can be configured) when $N_4$=y. Or, the UE is expected to be configured with Q=q=2, . . . or y−1 when $N_4$=y is configured. Or, the UE is not expected to be configured with Q=1 or y when $N_4$=y is configured.

In one example, the set of supported values for Q includes {1, 2}. When Q=1, the $W_{f,d}$ is according to one or more examples herein. When Q=2, the $W_{f,d}$ is according to one or more examples herein.

In one example, the set of supported values for Q includes {1, 3} and does not include 2. That is, Q=2 is not supported. Or, the UE is not expected to be configured with Q=2. When Q=1, the $W_{f,d}$ is according to one or more examples herein. When Q=3, the $W_{f,d}$ is according to one or more examples herein.

In one example, the set of supported values for Q includes T or is equal to T or is included in (or is a subset of) T.

In one example, T={1, 2}.
In one example, T={1, 3}.
In one example, T={2, 3}.
In one example, T={1, 2, 3}.
In one example, T={1, 2, 4}.
In one example, T={1, 3, 4}.
In one example, T={2, 3, 4}.
In one example, T={1, 2, 3, 4}.
In one example, T={2, 3, . . . , $N_4$−1}.

In one example, at least one of the following examples is used/configured regarding the value of Q.

In one example, Q=[$qN_4$] where q is a fraction (e.g., ¼, ½, ¾ etc.)

In one example, Q=$qN_4$ where q is a fraction (e.g., ¼, ½, ¾ etc.)

In one example, Q=[$qN_4$] where q is a fraction (e.g., ¼, ½, ¾ etc.)

In one example, Q=max(2, $\lceil qN_4 \rceil$) where q is a fraction (e.g., ¼, ½, ¾ etc.)

In one example, Q=max(2, $qN_4$) where q is a fraction (e.g., ¼, ½, ¾ etc.)

In one example, Q=max(2, $\lfloor qN_4 \rceil$) where q is a fraction (e.g., ¼, ½, ¾ etc.)

In one example, $$Q = \left\lceil \frac{N_4}{s} \right\rceil$$

where s is an integer (e.g., 1, 2, 3 etc.)

In one example, $$Q = \frac{N_4}{s}$$

where s is an integer (e.g., 1, 2, 3 etc.)

In one example, $$Q = \left\lfloor \frac{N_4}{s} \right\rfloor$$

where s is an integer (e.g., 1, 2, 3 etc.)

In one example, the value q is fixed, e.g., q=½. In one example, the value q is reported by the UE (e.g., via UE capability information). In one example, the value q is configured (e.g., via higher layer RRC), e.g., from {⅛, ¼, ⅓, ½, ¾}.

In one example, the value s is fixed, e.g., s=2. In one example, the value s is reported by the UE (e.g., via UE capability information). In one example, the value s is configured (e.g., via higher layer RRC), e.g., from {2, 3, 4, 8}.

In one example, the maximum value of Q is limited to a value v. In one example, the value v is fixed, e.g., v=4. In one example, the value v is reported by the UE (e.g., via UE capability information). In this case, the value of Q min(v, w) where w is according to one of the following examples.

In one example, w=$\lceil qN_4 \rceil$ where q is a fraction (e.g., ¼, ½, ¾ etc.)

In one example, w=$qN_4$ where q is a fraction (e.g., ¼, ½, ¾ etc.)

In one example, w=$\lfloor qN_4 \rfloor$ where q is a fraction (e.g., ¼, ½, ¾ etc.)

In one example, w=max(2, $\lceil qN_4 \rceil$) where q is a fraction (e.g., ¼, ½, ¾ etc.)

In one example, w=max(2, $qN_4$) where q is a fraction (e.g., ¼, ½, ¾ etc.)

In one example, w=max(2, $\lfloor qN_4 \rfloor$) where q is a fraction (e.g., ¼, ½, ¾ etc.)

In one example, $$w = \left\lceil \frac{N_4}{s} \right\rceil$$

where sis an integer (e.g., 1, 2, 3 etc.)

In one example, $$w = \frac{N_4}{s}$$

where s is an integer (e.g., 1, 2, 3 etc.)

In one example, $$w = \left\lfloor \frac{N_4}{s} \right\rfloor$$

where s is an integer (e.g., 1, 2, 3 etc.)

In one embodiment, the precoders for v layers are then given by $$W^{l}_{\ldots,t,u} = \frac{1}{\sqrt{N_1 N_2 \gamma_{t,u,l}}} \begin{bmatrix} \sum_{i=0}^{L-1} v_{m_1^{(i)},m_2^{(i)}} \sum_{f=0}^{M_\upsilon-1} \sum_{d=0}^{Q-1} y_{t,l}^{(f)} \phi_{u,l}^{(d)} x_{l,i,f,d} \\ \sum_{i=0}^{L-1} v_{m_1^{(i)},m_2^{(i)}} \sum_{f=0}^{M_\upsilon-1} \sum_{d=0}^{Q-1} y_{t,l}^{(f)} \phi_{u,l}^{(d)} x_{l,i+L,f,d} \end{bmatrix},$$

$$l = 1, \ldots, \upsilon, \gamma_{t,u,l} = \sum_{i=0}^{2L-1} \left| \sum_{f=0}^{M_\upsilon-1} \sum_{f=0}^{Q-1} y_{t,l}^{(f)} \phi_{u,l}^{(d)} x_{l,i,f,d} \right|^2,$$

Where $x_{l,i,f,d}$ is the coefficient (an element of $\tilde{W}_2$) associated with codebook indices (l, i, f, d), where i is a row index of $\tilde{W}_2$ and (f, d) determine the column index k of $\tilde{W}_2$. In one example, $$x_{l,i,f,d} = p^{(1)}_{l,\left\lfloor \frac{i}{L} \right\rfloor} p^{(2)}_{l,i,f,d} \varphi_{l,i,f,d}$$

similar to Rel. 16 enhanced Type II codebook (cf. example, Section 5.2.2.2.5, REF 8).

$$v_{m_1^{(i)},m_2^{(i)}}$$

is a SD basis vector with index $$m_1^{(i)}, m_2^{(i)}$$

$$y_{t,l}^{(f)}$$

is t-th entry of the FD basis vector with index f $$\phi_{u,l}^{(d)}$$

is u-th entry of the DD/TD basis vector with index d

The rest of the details are the same as or are similar to Rel. 16 enhanced Type II codebook (cf. Section 5.2.2.2.5, REF 8).

In one example, when $$W_l = W_1 \tilde{W}_2 (W_f \otimes I)^H, \phi_{u,l}^{(d)} = 1$$

if u=d, and $$\phi_{u,l}^{(d)} = 0$$

if u≠d. The DD/TD basis vector $h_{d,l}$=[0 . . . 1 . . . 0] comprises a '1' at index u=d, and '0' at remaining index u≠d. The precoders at FD unit t and DD/TD unit u are given by $$W^{l}_{\ldots,t,u} = \frac{1}{\sqrt{N_1 N_2 \gamma_{t,u,l}}} \begin{bmatrix} \sum_{i=0}^{L-1} v_{m_1^{(i)},m_2^{(i)}} \sum_{f=0}^{M_\upsilon-1} y_{t,l}^{(f)} x_{l,i,f,u} \\ \sum_{i=0}^{L-1} v_{m_1^{(i)},m_2^{(i)}} \sum_{f=0}^{M_\upsilon-1} y_{t,l}^{(f)} x_{l,i+L,f,u} \end{bmatrix},$$

$$l = 1, \ldots, \upsilon, \gamma_{t,u,l} = \sum_{i=0}^{2L-1} \left| \sum_{f=0}^{M_\upsilon-1} y_{t,l}^{(f)} x_{l,i,f,d} \right|^2.$$

In one example, when $W_l = W_1 \tilde{W}_2 (W_f \otimes W_d)^H$, $W_d$ comprises the DD/TD basis vectors given by $$h_{d,l} = \left[ \phi_{0,l}^{(d)} \; \phi_{1,l}^{(d)} \; \ldots \; \phi_{N_4-1,l}^{(d)} \right], d = 0, 1, \ldots, Q-1.\}.$$

In one example, the DD/TD basis vectors are oversampled (or rotated) orthogonal DFT vectors with the oversampling (rotation) factor $O_4$, and $$\phi_{u,l}^{(d)} = e^{j\frac{2\pi u n_{4,l}^{(d)}}{O_4 N_4}}$$

and the Q DD/TD basis vectors are also identified by the rotation index $q_{4,l} \in \{0, 1, \ldots, O_4-1\}$. In one example, the DD/TD basis vectors are orthogonal DFT vectors with the oversampling (rotation) factor $O_4$=1, and $$\phi_{u,l}^{(d)} = e^{j\frac{2\pi u n_{4,l}^{(d)}}{N_4}}.$$

In one example, the same as one or more examples herein except that the SD basis is replaced with a port selection (PS) basis, i.e., the 2 L antenna ports vectors are selected from the $P_{CSIRS}$ CSIRS ports. The rest of the details are the same as in one or more examples herein.

In one example, whether there is any selection in SD or not depends on the value of L. If $$L = \frac{P_{CSI-RS}}{2},$$

there is no need for any selection in SD (since all ports are selected), and when $$L < \frac{P_{CSI-RS}}{2},$$

the SD ports are selected (hence reported), where this selection is according to one or more examples herein.

In one example, the SD basis is analogous to the $W_1$ component in Rel. 15/16 Type II port selection codebook (cf. 5.2.2.2.3/5.2.2.2.5, REF 8), wherein the Ly antenna ports or column vectors of $A_l$ are selected by the index $q_1 \in$ $$\left\{0, 1, \ldots, \left\lceil \frac{P_{CSI-RS}}{2d} \right\rceil - 1\right\}$$

(this requires $$\left\lceil \log_2 \left\lceil \frac{P_{CSI-RS}}{2d} \right\rceil \right\rceil$$

bits), where $$d \le \min\left(\frac{P_{CSI-RS}}{2}, L_l\right).$$

In one example, $d \in \{1, 2, 3, 4\}$. To select columns of $A_l$, the port selection vectors are used, For instance, $\alpha_i = v_m$, where the quantity $v_m$ is a $P_{CSI-RS}/2$-element column vector containing a value of 1 in element m mod $P_{CSI-RS}/2$ and zeros elsewhere (where the first element is element 0). The port selection matrix is then given by $$W_1 = A_l = \begin{bmatrix} X & 0 \\ 0 & X \end{bmatrix} \text{ where } X = [\, v_{q_1 d} \;\; v_{q_1 d+1} \;\; \cdots \;\; v_{q_1 d+L_l-1} \,].$$

The SD basis is selected either common (the same) for the two antenna polarizations or independently for each of the two antenna polarizations.

In one example, the SD basis selects $L_l$ antenna ports freely, i.e., the $L_l$ antenna ports per polarization or column vectors of $A_l$ are selected freely by the index $q_1 \in$ $$\left\{0, 1, \ldots, \binom{\frac{P_{CSI-RS}}{2}}{L_l} - 1\right\}$$

(this requires $$\left\lceil \log_2 \binom{\frac{P_{CSI-RS}}{2}}{L_l} \right\rceil$$

bits). To select columns of $A_l$, the port selection vectors are used, For instance, $\alpha_i = v_m$, where the quantity $v_m$ is a $P_{CSI-RS}/2$-element column vector containing a value of 1 in element (m mod $P_{CSI-RS}/2$) and zeros elsewhere (where the first element is element 0). Let $\{x_0, x_1, \ldots, x_{L_l-1}\}$ be indices of selection vectors selected by the index $q_1$. The port selection matrix is then given by $$W_1 = A_l = \begin{bmatrix} X & 0 \\ 0 & X \end{bmatrix} \text{ where } X = [\, v_{x_0} \;\; v_{x_1} \;\; \cdots \;\; v_{x_{L_l-1}} \,].$$

The SD basis is selected either common (the same) for the two antenna polarizations or independently for each of the two antenna polarizations.

In one example, the SD basis selects $L_l$ antenna ports freely from $P_{CSI-RS}$ ports, i.e., the $L_l$ antenna ports or column vectors of $A_l$ are selected freely by the index $q_1 \in$ $$\left\{0, 1, \ldots, \binom{P_{CSI-RS}}{L_l} - 1\right\}$$

(this requires $$\left\lceil \log_2 \binom{P_{CSI-RS}}{L_l} \right\rceil$$

bits). To select columns of $A_l$, the port selection vectors are used, For instance, $\alpha_i = v_m$, where the quantity $v_m$ is a $P_{CSI-RS}$-element column vector containing a value of 1 in element (m mod $P_{CSI-RS}$) and zeros elsewhere (where the first element is element 0). Let $\{x_0, x_1, \ldots, x_{L_l-1}\}$ be indices of selection vectors selected by the index $q_1$. The port selection matrix is then given by $$W_1 = A_l = \begin{bmatrix} X & 0 \\ 0 & X \end{bmatrix} \text{ where } X = [\, v_{x_0} \;\; v_{x_1} \;\; \cdots \;\; v_{x_{L_l-1}} \,].$$

In one example, the SD basis selects $2L_l$ antenna ports freely from $P_{CSI-RS}$ ports, i.e., the $2L_l$ antenna ports or column vectors of $A_l$ are selected freely by the index $q_1 \in$ $$\left\{0, 1, \ldots, \binom{P_{CSI-RS}}{2L_l} - 1\right\}$$

(this requires $$\left\lceil \log_2 \binom{P_{CSI-RS}}{2L_l} \right\rceil$$

bits). To select columns of $A_l$, the port selection vectors are used, For instance, $\alpha_i = v_m$, where the quantity $v_m$ is a $P_{CSI-RS}$-element column vector containing a value of 1 in element (m mod $P_{CSI-RS}$) and zeros elsewhere (where the first element is element 0). Let $\{x_0, x_1, \ldots, x_{2L_l-1}\}$ be indices of selection vectors selected by the index $q_1$. The port selection matrix is then given by $$W_1 = A_l = \begin{bmatrix} X & 0 \\ 0 & X \end{bmatrix}$$

where $$X = [\, v_{x_0} \;\; v_{x_1} \;\; \cdots \;\; v_{x_{L_l-1}} \,].$$

In this disclosure, the Type II Doppler codebook is also referred to as the Enhanced Type II codebook for predicted PMI. Likewise, the Type II Doppler port selection codebook is also referred to as the Enhanced Type II port selection codebook for predicted.

In one embodiment, the parameter R is configured with the higher-layer parameter numberOfPMI-SubbandsPer-CQI-Subband-Doppler-r18. This parameter controls the value of $N_3$. The total number of precoding matrices $N_3N_4$ indicated by the PMI as a function of the number of configured subbands in csi-ReportingBand the subband size configured by the higher-level parameter subbandSize and of the total number of PRBs in the bandwidth part according to Table 5.2.1.4-2 and the number of slots ($W_{CSI}$=$dN_4$) in the CSI reporting window.

The PMI value corresponds to the (legacy) codebook indices of $i_1$ and $i_2$ where $$i_1 = \begin{cases} [i_{1,1}\ \ i_{1,2}\ \ i_{1,5}\ \ i_{1,6,1}\ \ i_{1,7,1}\ \ i_{1,8,1}] & v=1 \\ [i_{1,1}\ \ i_{1,2}\ \ i_{1,5}\ \ i_{1,6,1}\ \ i_{1,7,1}\ \ i_{1,8,1}\ \ i_{1,6,2}\ \ i_{1,7,2}\ \ i_{1,8,2}] & v=2 \\ [i_{1,1}\ \ i_{1,2}\ \ i_{1,5}\ \ i_{1,6,1}\ \ i_{1,7,1}\ \ i_{1,8,1}\ \ i_{1,6,2}\ \ i_{1,7,2}\ \ i_{1,8,2}\ \ i_{1,6,3}\ \ i_{1,7,3}\ \ i_{1,8,3}] & v=3 \\ [i_{1,1}\ \ i_{1,2}\ \ i_{1,5}\ \ i_{1,6,1}\ \ i_{1,7,1}\ \ i_{1,8,1}\ \ i_{1,6,2}\ \ i_{1,7,2}\ \ i_{1,8,2}\ \ i_{1,6,3}\ \ i_{1,7,3}\ \ i_{1,8,3}\ \ i_{1,6,4}\ \ i_{1,7,4}\ \ i_{1,8,4}] & v=4 \end{cases}$$

$$i_2 = \begin{cases} [i_{2,3,1}\ \ i_{2,4,1}\ \ i_{2,5,1}] & v=1 \\ [i_{2,3,1}\ \ i_{2,4,1}\ \ i_{2,5,1}\ \ i_{2,3,2}\ \ i_{2,4,2}\ \ i_{2,5,2}] & v=2 \\ [i_{2,3,1}\ \ i_{2,4,1}\ \ i_{2,5,1}\ \ i_{2,3,2}\ \ i_{2,4,2}\ \ i_{2,5,2}\ \ i_{2,3,3}\ \ i_{2,4,3}\ \ i_{2,5,3}] & v=3 \\ [i_{2,3,1}\ \ i_{2,4,1}\ \ i_{2,5,1}\ \ i_{2,3,2}\ \ i_{2,4,2}\ \ i_{2,5,2}\ \ i_{2,3,3}\ \ i_{2,4,3}\ \ i_{2,5,3}\ \ i_{2,3,4}\ \ i_{2,4,4}\ \ i_{2,5,4}] & v=4 \end{cases}$$

The codebook indices of $i_1$ may also include new indicators ($i_{1,9,l}$, $i_{1,10,l}$) as explained below.

The precoding matrices indicated by the PMI are determined from L+$M_\upsilon$+Q vectors.

L vectors, $$v_{m_1^{(i)},m_2^{(i)}},\ i = 0, 1, \ldots , L-1,$$

are indentified by the indices $q_1$, $q_2$, $n_1$, $n_2$, indicated by $i_{1,1}$, $i_{1,2}$, obtained as in 5.2.2.2.3, where the values of C(x, y) are given in Table 5.2.2.2.5-4 of TS 38.214.

$$M_v = \left\lceil p_v \frac{N_3}{R} \right\rceil \text{ vectors, } \left[y_{0,l}^{(f)}, y_{1,l}^{(f)}, \ldots , y_{N_3-1,l}^{(f)}\right]^T,$$

f=0, 1, . . . , $M_\upsilon$−1, are identified by $M_{initial}$ (for $N_3$>19) and $n_{3,l}$ (l=1, . . . , υ) where $$M_{initial} \in \{-2M_v+1,\ -2M_v+2, \ldots , 0\}$$

$$n_{3,l} = \left[n_{3,l}^{(0)}, \ldots , n_{3,l}^{(M_v-1)}\right]$$

$$n_{3,l}^{(f)} \in \{0, 1, \ldots , N_3-1\}$$

which are indicated by means of the indices $i_{1,5}$ (for $N_3$>19) and $i_{1,6,l}$ (for $M_\upsilon$>1 and l=1, . . . , v), where $$i_{1,5} \in \{0, 1, \ldots , 2M_v-1\}$$

-continued $$i_{1,6,l} \in \begin{cases} \left\{0, 1, \ldots , \binom{N_3-1}{M_v-1}-1\right\} & N_3 \le 19 \\ \left\{0, 1, \ldots , \binom{2M_v-1}{M_v-1}-1\right\} & N_3 > 19 \end{cases}$$

In one example, DD basis vectors are layer-common, i.e., the same for all layer. Q vectors, $$\left[\phi_0^{(d)}\ \ \phi_1^{(d)}\ \ \ldots\ \ \phi_{N_4-1}^{(d)}\right]^T,\ d \in \{0, \ldots , Q-1\},$$

are identified by $n_4$, where $$n_4 = \left[n_4^{(0)} \ldots n_4^{(Q-1)}\right]$$

$$n_4^{(d)} \in \begin{cases} \{0\} & Q=1 \text{ or } N_4=1 \\ \{0, 1, \ldots , Y-1\} & Q>1 \text{ or } N_4>1 \end{cases}.$$

with the indices d∈{0, . . . , Q−1} assigned such that $$n_4^{(d)}$$

increases with d. $n_4$ is indicated by the index $i_{1,9}$, when Q>1 and Y>Q, where $$i_{1,9} \in \left\{0, \ldots , \binom{Y-1}{Q-1}-1\right\}.$$

If Q=1, or Q=Y, $i_{1,9}$ is not reported.

If Q>1 and Y>Q, the nonzero offset(s) between $$n_4^{(0)} \ldots n_4^{(Q-1)}$$

is reported with $i_{1,9}$ assuming that $$n_4^{(0)}$$

(reference for the offset) is 0. The nonzero offset values are mapped to the index values of $i_{1,9}$ in increasing order with offset value 1 mapped to index value ‘0’.

In one example, Y=min(W, $N_4$), where W is DD basis window size. In one example, Y=W. The value of W can be fixed (e.g., 2 or 3 or 4) or can be configured via higher layer (RRC) or MACE CE or DCI (e.g., from 2, 3, 4). In one example, Y=$N_4$. In one example, Q>1 corresponds only one value (e.g., Q=2). In one example, Q>1 corresponds only two values (e.g., Q=2 and 3).

When Q>1, the selection of Q out of Y DD basis vectors is indicated by a $$\left\lceil \log_2 \binom{Y-1}{Q-1} \right\rceil$$

bit indicator ($i_{1,9}$) in CSI part 2. Analogous to FD basis selection, DD basis index 0 (representing DC) is selected. When Q=2, $\lceil \log_2(Y-1) \rceil$-bits is used for the indicator.

In one example, DD basis vectors are layer-specific, i.e., reported for each layer. Q vectors, $$\left[\phi_{0,l}^{(d)} \ \phi_{1,l}^{(d)} \ \ldots \ \phi_{N_4-1,l}^{(d)}\right]^T, d \in \{0, \ldots, Q-1\},$$

are identified by $n_{4,l}$(l=1, . . . , υ), where $$n_{4,l} = \left[n_{4,l}^{(0)} \ldots n_{4,l}^{(Q-1)}\right]$$

$$n_{4,l}^{(d)} \in \begin{cases} \{0\} & Q = 1 \text{ or } N_4 = 1 \\ \{0, 1, \ldots, Y-1\} & Q > 1 \text{ or } N_4 > 1 \end{cases}.$$

with the indices d∈{0, . . . , Q−1} assigned such that $$n_{4,l}^{(d)}$$

increases with d. $n_{4,l}$ is indicated by the index $i_{1,9,l}$, when Q>1 and Y>Q, where $$i_{1,9,l} \in \left\{0, \ldots, \binom{Y-1}{Q-1} - 1\right\}.$$

If Q=1, or Q=Y, $i_{1,9,l}$ is not reported.

If Q>1 and Y>Q, the nonzero offset(s) between $$n_{4,l}^{(0)} \ldots n_{4,l}^{(Q-1)}$$

is reported with $i_{1,9,l}$ assuming that $$n_{4,l}^{(0)}$$

(reference for the offset) is 0. The nonzero offset values are mapped to the index values of $i_{1,9,l}$ in increasing order with offset value 1 mapped to index value '0'.

In one example, Y=min(W, $N_4$), where W is DD basis window size. In one example, Y=W. The value of W can be fixed (e.g., 2 or 3 or 4) or can be configured via higher layer (RRC) or MACE CE or DCI (e.g., from 2, 3, 4). In one example, Y=$N_4$. In one example, Q>1 corresponds to only one value (e.g., Q=2). In one example, Q>1 corresponds to only two values (e.g., Q=2 and 3).

When Q>1, the selection of Q out of Y DD basis vectors is indicated by a $$\left\lceil \log_2 \binom{Y-1}{Q-1} \right\rceil$$

bit indicator ($i_{1,9,l}$) in CSI part 2. Analogous to FD basis selection, DD basis index 0 (representing DC) is selected. When Q=2, $\lceil \log 2(Y-1) \rceil$-bits is used for the indicator.

In one example, the notation d is replaced with notation τ.

In one example, the notation ϕ is replaced with notation z.

When Q=2, and Y=$N_4$, the Q=2 vectors, $$\left[\phi_{0,l}^{(d)} \ \phi_{1,l}^{(d)} \ \ldots \ \phi_{N_4-1,l}^{(d)}\right]^T = \left[z_{0,l}^{(\tau)}, z_{1,l}^{(\tau)}, \ldots, z_{N_4-1,l}^{(\tau)}\right]^T, d = \tau \in \{0, 1\},$$

are identified by $n_{4,l}$ (l=1, . . . , v), where $$n_{4,l} = \left[n_{4,l}^{(0)} n_{4,l}^{(1)}\right]$$

$$n_{4,l}^{(d)} = n_{4,l}^{(\tau)} \in \begin{cases} \{0\} & Q = 1 \text{ or } N_4 = 1 \\ \{0, 1, \ldots, N_4-1\} & Q = 2 \text{ or } N_4 > 1 \end{cases}.$$

with the indices d=τ∈{0, 1} assigned such that $$n_{4,l}^{(d)} = n_{4,l}^{(\tau)}$$

increases with d=τ. $n_{4,l}$ is indicated by the index $i_{1,9,l}$, when Q=2 and $N_4$>2, where $$i_{1,9,l} \in \left\{0, \ldots, \binom{N_4-1}{1} - 1\right\} = \{0, 1, \ldots, N_4-2\}.$$

If Q=$i_{1,9,l}$ is not reported.

If Q=$N_4$=2, $i_{1,9,l}$ is not reported.

If Q=2 and $N_4$>2 (or $N_4$ ∈{4, 8}), the nonzero offset between $$n_{4,l}^{(0)} \ldots n_{4,l}^{(1)}$$

is reported with $i_{1,9,l}$ assuming that $$n_{4,l}^{(0)}$$

(reference for the offset) is 0. The nonzero offset values are mapped to the index values of $i_{1,9,l}$ in increasing order with offset value 1 mapped to index value '0'.

The amplitude coefficient indicators $i_{2,3,l}$ and $i_{2,4,l}$ are $$k_{l,p}^{(1)} = \left[k_{l,p,1}^{(1)} \ldots k_{l,p,Q-1}^{(1)}\right]$$

$$i_{2,4,l} = \left[k_{l,0}^{(2)} \ldots k_{l,M_v-1}^{(2)}\right]$$

$$k_{l,f}^{(2)} = \left[k_{l,0,f}^{(2)} \ldots k_{l,2L-1,f}^{(2)}\right]$$

-continued $$k^{(2)}_{l,i,f} = \left[k^{(2)}_{l,i,f,0} \ldots\ k^{(2)}_{l,i,f,Q-1}\right]$$

$$k^{(1)}_{l,p,d} \in \{1, \ldots, 15\}$$

$$k^{(2)}_{l,i,f,d} \in \{0, \ldots, 7\}.$$

$$\text{for } l = 1, \ldots, v.$$

In one example, when Q=2, the (reference) amplitude coefficient indicator $i_{2,3,l}$ is $$i_{2,3,l} = \left[k^{(1)}_{l,0}\ \ k^{(1)}_{l,1}\right]$$

$$k^{(1)}_{l,p} = \left[k^{(1)}_{l,p,0}\ \ k^{(1)}_{l,p,1}\right]$$

$$k^{(1)}_{l,p,d} \in \{1, \ldots, 15\}$$

In one example, when Q=2, the (reference) amplitude coefficient indicator $i_{2,3,l}$ is $$i_{2,3,l} = \left[k^{(1)}_{l,0}\ \ k^{(1)}_{l,1}\right]$$

$$k^{(1)}_{l,p} \in \{1, \ldots, 15\}$$

In one example, when Q=2, the (reference) amplitude coefficient indicator $i_{2,3,l}$ is $$i_{2,3,l} = [i_{2,3,l,0}\ \ i_{2,3,l,1}]$$

$$i_{2,3,l,d} = \left[k^{(1)}_{l,0,d}\ \ k^{(1)}_{l,1,d}\right]$$

$$k^{(1)}_{l,p,d} \in \{1, \ldots, 15\}$$

In one example, when Q=2, the amplitude coefficient indicator $i_{2,4,l}$ is $$i_{2,4,l} = [i_{2,4,l,0}\ \ i_{2,4,l,1}]$$

$$i_{2,4,l,d} = \left[k^{(2)}_{l,0,d} \ldots\ k^{(2)}_{l,M_\upsilon-1,d}\right]$$

$$k^{(2)}_{l,f,d} = \left[k^{(2)}_{l,0,f,d} \ldots\ k^{(2)}_{l,2L-1,f,d}\right]$$

$$k^{(2)}_{l,i,f,d} \in \{0, \ldots, 7\}.$$

In one example, when Q=2, the amplitude coefficient indicator $i_{2,4,l}$ is $$i_{2,4,l} = \left[k^{(2)}_{l,0} \ldots\ k^{(2)}_{l,M_\upsilon-1}\right]$$

$$k^{(2)}_{l,f} = \left[k^{(2)}_{l,0,f} \ldots\ k^{(2)}_{l,2L-1,f}\right]$$

$$k^{(2)}_{l,i,f} = \left[k^{(2)}_{l,i,f,0}\ \ k^{(2)}_{l,i,f,1}\right]$$

$$k^{(2)}_{l,i,f,d} \in \{0, \ldots, 7\}.$$

The phase coefficient indicator $i_{2,5,l}$ is $$i_{2,5,l} = \left[c_{l,0} \ldots\ c_{l,M_\upsilon-1}\right]$$

$$c_{l,f} = [c_{l,0,f} \ldots\ c_{l,2L-1,f}]$$

-continued $$c_{l,i,f} = [c_{l,i,f,0} \ldots\ c_{l,i,f,Q-1}]$$

$$c_{l,i,f,d} \in \{0, \ldots, 15\}.$$

$$\text{for } l = 1, \ldots, \upsilon.$$

In one example, when Q=2, the phase coefficient indicator $i_{2,5,l}$ is $$i_{2,5,l} = \left[c_{l,0} \ldots\ c_{l,M_\upsilon-1}\right]$$

$$c_{l,f} = [c_{l,0,f} \ldots\ c_{l,2L-1,f}]$$

$$c_{l,i,f} = [c_{l,i,f,0}\ \ c_{l,i,f,1}]$$

$$c_{l,i,f,d} = c_{l,i,f,\tau} \in \{0, \ldots, 15\}.$$

In one example, when Q=2, the phase coefficient indicator $i_{2,5,l}$ is $$i_{2,5,l} = [i_{2,5,l,0}\ \ i_{2,5,l,1}]$$

$$i_{2,5,l,\tau} = \left[c_{l,0,\tau} \ldots\ c_{l,M_\upsilon-1,\tau}\right]$$

$$c_{l,f,\tau} = [c_{l,0,f,\tau} \ldots\ c_{l,2L-1,f,\tau}]$$

$$c_{l,i,f,d} = c_{l,i,f,\tau} \in \{0, \ldots, 15\}$$

The phase coefficients for layer l=1, . . . , υ are represented by $$\varphi_l = [\varphi_{l,0}\ \ \varphi_{l,1}]$$

$$\varphi_{l,\tau} = \left[\varphi_{l,0,\tau} \ldots\ \varphi_{l,M_\upsilon-1,\tau}\right]$$

$$\varphi_{l,f,\tau} = [\varphi_{l,0,f,\tau} \ldots\ \varphi_{l,2L-1,f,\tau}]$$

and the mapping from $c_{l,i,f,\tau}$ to $\phi_{l,i,f,\tau}$ is given by $$\varphi_{l,i,f,\tau} = e^{j2\pi\frac{c_{l,i,f,\tau}}{16}}$$

Let $K_0 = \lceil \beta 2LM_1 \rceil$. The bitmap whose nonzero bits identify which coefficients in $i_{2,4,l}$ and $i_{2,5,l}$ are reported, is indicated by $i_{1,7,l}$ $$i_{1,7,l} = \left[k^{(3)}_{l,0} \ldots\ k^{(3)}_{l,M_\upsilon-1}\right]$$

$$k^{(3)}_{l,f} = \left[k^{(3)}_{l,0,f} \ldots\ k^{(3)}_{l,2L-1,f}\right]$$

$$k^{(3)}_{l,i,f} = \left[k^{(3)}_{l,i,f,0} \ldots\ k^{(3)}_{l,i,f,Q-1}\right]$$

$$k^{(3)}_{l,i,f,d} \in \{0, 1\}$$

$$\text{for } l = 1, \ldots, \upsilon.$$

In one example, when Q=2, the index $i_{1,7,l}$ is $$i_{1,7,l} = \left[k^{(3)}_{l,0} \ldots\ k^{(3)}_{l,M_\upsilon-1}\right]$$

$$k^{(3)}_{l,f} = \left[k^{(3)}_{l,0,f} \ldots\ k^{(3)}_{l,2L-1,f}\right]$$

-continued $$k_{l,i,f}^{(3)} = \left[k_{l,i,f,0}^{(3)} \quad k_{l,i,f,1}^{(3)}\right]$$

$$k_{l,i,f,d}^{(3)} = k_{l,i,f,\tau}^{(3)} \in \{0, 1\}$$

In one example, when Q=2, the index $i_{1,7,l}$ is $$i_{1,7,l} = \left[i_{1,7,l,0} \quad i_{1,7,l,1}\right]$$

$$i_{1,7,l,\tau} = \left[k_{l,0,\tau}^{(3)} \cdots k_{l,M_\upsilon-1,\tau}^{(3)}\right]$$

$$k_{l,f,\tau}^{(3)} = \left[k_{l,0,f,\tau}^{(3)} \cdots k_{l,2L-1,f,\tau}^{(3)}\right]$$

$$k_{l,i,f,d}^{(3)} = k_{l,i,f,\tau}^{(3)} \in \{0, 1\}$$

In one example, $$K_l^{NZ} = \sum_{d=0}^{Q-1} \sum_{i=0}^{2L-1} \sum_{f=0}^{M_\upsilon-1} k_{l,i,f,d}^{(3)} \le K_0$$

is the number of nonzero coefficients for layer l=1, . . . , υ and $$K^{NZ} = \sum_{l=1}^{\upsilon} K_l^{NZ} \le 2K_0$$

is the total number of nonzero coefficients. In one example, $K_0=\lceil \beta 2LM_1 \rceil$. In one example, $K_0=\lceil \beta 2LM_1Q \rceil$. In one example, $K_0=\lceil \mu\beta 2LM_1 \rceil$. In one example, $K_0=\lceil \beta 2LM_1Q \rceil$. Here, μ<1. In one example, μ is fixed (e.g., 2).

The indices of $i_{2,4,l}$, $i_{2,5,l}$ and $i_{1,7,l}$ are associated to the $M_\upsilon$ codebook indices in $n_{3,l}$ and the Q codebook indices in $n_4$ or $n_{4,l}$.

The mapping from $$k_{l,p,d}^{(1)}$$

to the amplitude coefficient $$p_{l,p,d}^{(1)} \left(\text{or } k_{l,p}^{(1)} \text{ to } p_{l,p}^{(1)}\right)$$

is given in Table 5.2.2.2.5-2 and the mapping from $$k_{l,i,f,d}^{(2)}$$

to the amplitude coefficient $$p_{l,i,f,d}^{(2)} \left(\text{or } k_{l,i,f,\tau}^{(2)} \text{ to } p_{l,i,f,\tau}^{(2)}\right)$$

is given in Table 5.2.2.2.5-3. The amplitude coefficients are represented by $$p_l^{(1)} = \left[p_{l,0}^{(1)} \quad p_{l,1}^{(1)}\right]$$

-continued $$p_{l,p}^{(1)} = \left[p_{l,p,0}^{(1)} \cdots p_{l,p,Q-1}^{(1)}\right]$$

$$p_l^{(2)} = \left[p_{l,0}^{(2)} \cdots p_{l,M_\upsilon-1}^{(2)}\right]$$

$$p_{l,f}^{(2)} = \left[p_{l,0,f}^{(2)} \cdots p_{l,2L-1,f}^{(2)}\right]$$

$$p_{l,i,f}^{(2)} = \left[p_{l,i,f,0}^{(2)} \cdots p_{l,i,f,Q-1}^{(2)}\right]$$

for $l = 1, \ldots, \upsilon$.

TABLE 5.2.2.2.5-2

Mapping of elements of $i_{2,3,l}$: $k_{l,p,d}^{(1)}$ to $p_{l,p,d}^{(1)}$

| $k_{l,p,d}^{(1)}$ | $p_{l,p,d}^{(1)}$ |
|---|---|
| 0 | Reserved |
| 1 | $\frac{1}{\sqrt{128}}$ |
| 2 | $\left(\frac{1}{8192}\right)^{1/4}$ |
| 3 | $\frac{1}{8}$ |
| 4 | $\left(\frac{1}{2048}\right)^{1/4}$ |
| 5 | $\frac{1}{2\sqrt{8}}$ |
| 6 | $\left(\frac{1}{512}\right)^{1/4}$ |
| 7 | $\frac{1}{4}$ |
| 8 | $\left(\frac{1}{128}\right)^{1/4}$ |
| 9 | $\frac{1}{\sqrt{8}}$ |
| 10 | $\left(\frac{1}{32}\right)^{1/4}$ |
| 11 | $\frac{1}{2}$ |
| 12 | $\left(\frac{1}{8}\right)^{1/4}$ |
| 13 | $\frac{1}{\sqrt{2}}$ |
| 14 | $\left(\frac{1}{2}\right)^{1/4}$ |
| 15 | 1 |

TABLE 5.2.2.2.5-3

| Mapping of elements of $i_{2,4,l}$: $k_{l,i,f,d}^{(2)}$ to $p_{l,f,id}^{(2)}$ | |
|---|---|
| $k_{l,i,f,d}^{(2)}$ | $p_{l,i,f,d}^{(2)}$ |
| 0 | $\frac{1}{8\sqrt{2}}$ |
| 1 | $\frac{1}{8}$ |
| 2 | $\frac{1}{4\sqrt{2}}$ |
| 3 | $\frac{1}{4}$ |
| 4 | $\frac{1}{2\sqrt{2}}$ |
| 5 | $\frac{1}{2}$ |
| 6 | $\frac{1}{\sqrt{2}}$ |
| 7 | 1 |

In one embodiment, there is one strongest coefficient across all Q DD basis vectors and there can be remapping of FD indices performed with respect to the FD index of the strongest coefficient. Let $$f_l^* \in \{0, 1, \ldots, M_\upsilon - 1\}$$

be the index of $i_{2,4,l}$ and $i^*_l \in \{0, 1, \ldots, 2L-1\}$ be the index of $$k_{l,f_l^*}^{(2)}$$

and $$d_l^* \in \{0, 1, \ldots, Q-1\}$$

be the index of $$k_{l,i_l^*,f_l^*}^{(2)},$$

which identify the strongest coefficient of layer l, i.e., the element $$k_{l,i_l^*,f_l^*,d_l^*}^{(2)}$$

of $i_{2,4,l}$, for l=1, . . . , υ. The codebook indices of $n_{3,l}$ are remapped with respect to $$n_{3,l}^{(f_l^*)}$$

as $$n_{3,l}^{(f)} = \left(n_{3,l}^{(f)} - n_{3,l}^{(f_l^*)}\right) \bmod N_3,$$

such that $$n_{3,l}^{(f_l^*)} = 0,$$

after remapping. The index f is remapped with respect to $$f_l^* \text{ as } f = (f - f_l^*) \bmod M_\upsilon,$$

such that the index of the strongest coefficient is $$f_l^* = 0 \ (l = 1, \ldots, \upsilon),$$

after remapping. The indices of $i_{2,4,l}$, $i_{2,5,l}$ and $i_{1,7,l}$ indicate amplitude coefficients, phase coefficients and bitmap after remapping.

In one example, when $$Q = 2, d_l^* = \tau_l^* \in \{0, 1\}.$$

In one example, $$d_l^* = 0.$$

The strongest coefficient of layer l is identified by $i_{1,8,l} \in \{0, 1, \ldots, 2L-1\}$, which is obtained as follows $$i_{1,8,l} = \begin{cases} \sum_{i=0}^{i_1^*} k_{1,i,0,0}^{(3)} - 1 & \upsilon = 1 \\ i_l^* & 1 < \upsilon \le 4 \end{cases}$$

for l=1, . . . , υ. The payload for reporting $i_{1,8,l}$ therefore is $\lceil \log_2 (2L) \rceil$ bits.

In one example, a joint indicator is used to indicate $$(i_l^*, d_l^*) = (i_l^*, \tau_l^*).$$

The strongest coefficient of layer l is identified by the joint indicator $i_{1,8,l} \in \{0, 1, \ldots, 2LQ-1\} = \{0, 1, \ldots, 4L-1\}$, which is obtained as follows $$i_{1,8,l} = 2Ld_l^* + i_l^* = 2L\tau_l^* + i_l^*$$

or $$i_{1,8,l} = Qi_l^* + r_l^* = 2i_l^* + r_l^*$$

for l=1, . . . , υ. The payload for reporting $i_{1,8,l}$ therefore is $\lceil \log_2(2LQ) \rceil$ or $\lceil \log_2(4L) \rceil$ bits. Similar to Rel.16 enhanced Type II codebook (5.2.2.2.5, 38.214), $$k^{(1)}_{l,\lfloor \frac{i_l^*}{L} \rfloor, d_l^*} = 15,\ k^{(2)}_{l,i_l^*,0,d_l^*} = 7,\ k^{(3)}_{l,i_l^*,0,d_l^*} = 1$$

and $$c_{l,i_l^*,0,d_l^*} = 0\ (l = 1, \ldots, \upsilon).$$

The indicators $$k^{(1)}_{l,\lfloor \frac{i_l^*}{L} \rfloor, d_l^*},\ k^{(2)}_{l,i_l^*,0,d_l^*}$$

and $$c_{l,i_l^*,0,d_l^*}$$

are not reported for l=1, . . . , υ. Note that $$f_l^* = 0$$

due to the remapping.

In one example, for rank>1 (i.e., υ>1, e.g., 1<υ≤4), the SCI is obtained and reported as described herein, and for rank=1 (v=1), the SCI is obtained (from the bitmap) as $$i_{1,8,l} = \left(\sum_{i=0}^{i_1^*} \sum_{d=0}^{d_1^*} k^{(3)}_{1,i,0,d}\right) - 1$$

or $$i_{1,8,l} = \left(\sum_{d=0}^{d_1^*} \sum_{i=0}^{i_1^*} k^{(3)}_{1,i,0,d}\right) - 1$$

or $$i_{1,8,l} = \left(\sum_{i=0}^{i_1^*} \sum_{d=0}^{Q-1} k^{(3)}_{1,i,0,d}\right) - 1 \text{ or } i_{1,8,l} = \left(\sum_{d=0}^{d} \sum_{i=0}^{2L-1} k^{(3)}_{1,i,0,d}\right) - 1,$$

and reported using $\lceil \log_2 K^{NZ} \rceil$ or $\lceil \log_2(2LQ) \rceil$ or $\lceil \log_2(4L) \rceil$ bits.)

In one example, two separate indicators are used to indicate $$(i_l^*, d_l^*).$$

The DD index $$d_l^*$$

is identified by a first indicator $i_{1,10,l} \in \{0, 1, \ldots, Q-1\}$ or $\{0, 1, \ldots, Y-1\}$, and the corresponding strongest coefficient of layer l is identified by the second indicator $i_{1,8,l} \in \{0, 1, \ldots, 2L-1\}$, which are obtained as follows $$i_{1,8,l} = i_l^* \text{ and } i_{1,10,l} = d_l^*$$

for l=1, . . . , υ. The payload for reporting $i_{1,8,l}$ and $i_{1,10,l}$ therefore are $\lceil \log 2(2L) \rceil$ bits and $\lceil \log_2(Q) \rceil$ or $\lceil \log_2(Y) \rceil$ bits, respectively. Similar to Rel.16 enhanced Type II codebook (5.2.2.2.5, 38.214), $$k^{(1)}_{l,\lfloor \frac{i_l^*}{L} \rfloor, d_l^*} = 15,\ k^{(2)}_{l,i_l^*,0,d_l^*} = 7,\ k^{(3)}_{l,i_l^*,0,d_l^*} = 1$$

and $$c_{l,i_l^*,0,d_l^*} = 0\ (l = 1, \ldots, \upsilon).$$

The indicators $$k^{(1)}_{l,\lfloor \frac{i_l^*}{L} \rfloor, d_l^*},\ k^{(2)}_{l,i_l^*,0,d_l^*}$$

and $$c_{l,i_l^*,0,d_l^*}$$

are not reported for l=1, . . . , υ. Note that $$f_l^* = 0$$

due to the remapping.

In one example, for rank>1 (i.e., υ>1, e.g., 1<υ≤4), the SCI is obtained and reported as above, and for rank=1 (υ=1), the SCI is obtained (from the bitmap) as $$i_{1,8,l} = \sum_{i=0}^{i_1^*} k^{(3)}_{1,i,0,d_1^*} - 1,$$

and reported using $$\left\lceil \log_2 K^{NZ}_{1,d_1^*} \right\rceil$$

or $\lceil \log_2(2LM_\upsilon) \rceil$ bits, where $$K^{NZ}_{1,d_1^*} = \sum\nolimits_{i=0}^{2L-1} \sum\nolimits_{f=0}^{M_\upsilon-1} k^{(3)}_{l,i,f,d_1^*}$$

is the number of nonzero coefficients for DD index $$d_l^*.$$

The codebooks for 1-4 layers are given in Table 3, where $t=0, 1, \ldots, N_3-1$, $\iota=0, 1, \ldots, N_4-1$ are the indices associated with the precoding matrix. $l=1, \ldots, \upsilon$ is the layer index, and where, for coefficients with $$k^{(3)}_{l,i,f,\tau} = 0,$$

amplitude and phase are set to zero, i.e., $$p^{(2)}_{l,i,f,\tau} = 0$$

and $\varphi_{l,i,f,\tau}=0$.

The bitmap parameter typeII-Doppler-RI-Restriction-r18 forms the bit sequence $r_3, r_2, r_1, r_0$ where $r_0$ is the LSB and $r_3$ is the MSB. When $r_i$ is zero, $i \in \{0, 1, \ldots, 3\}$, PMI and RI reporting are not allowed to correspond to any precoder associated with $\upsilon=i+1$ layers. The bitmap parameter n1-n2-codebookSubsetRestriction-Doppler-r18 forms the bit sequence $B=B_1B_2$ and configures the vector group indices $g^{(k)}$ as in clause 5.2.2.2.3 of TS 38.214. Bits $$b_2^{(k,2(N_1x_2+x_1)+1)} b_2^{(k,2(N_1x_2+x_1))}$$

indicate the maximum allowed average amplitude, $\gamma_{i+pL}$ (p=0, 1), with $i \in \{0, 1, \ldots, L-1\}$, of the coefficients associated with the vector in group $g^{(k)}$ indexed by $x_1, x_2$, where the maximum amplitudes are given in Table 5.2.2.2.5-6 of TS 38.214 and the average coefficient amplitude is restricted as follows $$\sqrt{\frac{1}{\sum\nolimits_{f=0}^{M_\upsilon-1} \sum\nolimits_{d=0}^{Q-1} k^{(3)}_{l,i+pL,f,d}} \sum\nolimits_{f=0}^{M_\upsilon-1} \sum\nolimits_{d=0}^{Q-1} k^{(3)}_{l,i+pL,f,d} \left(p^{(1)}_{l,p,d} p^{(2)}_{l,i+pL,f,d}\right)^2} \le \gamma_{i+pL}$$

for $l=1, \ldots, \upsilon$, and p=0, 1. A UE that does not report the parameter softAmpRestriction-Doppler-r18='supported' in its capability signaling is not expected to be configured with

TABLE 3

| Layers | |
|---|---|
| v = 1 | $W_{q_1,q_2,n_1,n_2,n_{3,1},n_{4,1},p_1^{(1)},p_1^{(2)},\varphi_1,t,l}^{(1)} = W_{q_1,q_2,n_1,n_2,n_{3,1},n_{4,1},p_1^{(1)},p_1^{(2)},\varphi_1,t,l}^{1}$ |
| v = 2 | $W^{(2)}_{q_1,q_2,n_1,n_2,n_{3,1},n_{4,1},p_1^{(1)},p_1^{(2)},\varphi_1,n_{3,2},n_{4,2},p_2^{(1)},p_2^{(2)},\varphi_2,t,\iota} = \frac{1}{\sqrt{2}}\left[W^1_{q_1,q_2,n_1,n_2,n_{3,1},n_{4,1},p_1^{(1)},p_1^{(2)},\varphi_1,t,\iota}\; W^2_{q_1,q_2,n_1,n_2,n_{3,2},n_{4,2},p_2^{(1)},p_2^{(2)},\varphi_2,t,\iota}\right]$ |
| v = 3 | $W^{(3)}_{q_1,q_2,n_1,n_2,n_{3,1},n_{4,1},p_1^{(1)},p_1^{(2)},\varphi_1,n_{3,2},n_{4,2},p_2^{(1)},p_2^{(2)},\varphi_2,n_{3,3},n_{4,3},p_3^{(1)},p_3^{(2)},\varphi_3,t,\iota} = \frac{1}{\sqrt{3}}\left[\begin{matrix} W^1_{q_1,q_2,n_1,n_2,n_{3,1},n_{4,1},p_1^{(1)},p_1^{(2)},\varphi_1,t,\iota} \\ W^2_{q_1,q_2,n_1,n_2,n_{3,2},n_{4,2},p_2^{(1)},p_2^{(2)},\varphi_2,t,\iota}\; W^3_{q_1,q_2,n_1,n_2,n_{3,3},n_{4,3},p_3^{(1)}} \end{matrix}\right]$ |
| v = 4 | $W^{(4)}_{q_1,q_2,n_1,n_2,n_{3,1},n_{4,1},p_1^{(1)},p_1^{(2)},\varphi_1,n_{3,2},n_{4,2},p_2^{(1)},p_2^{(2)},\varphi_2,n_{3,3},n_{4,3},p_3^{(1)},p_3^{(2)},\varphi_3,n_{3,4},n_{4,4},p_4^{(1)},p_4^{(2)},\varphi_4,t,\iota} = \frac{1}{2}\left[\begin{matrix} W^1_{q_1,q_2,n_1,n_2,n_{3,1},n_{4,1},p_1^{(1)},p_1^{(2)},\varphi_1,t,\iota} & W^2_{q_1,q_2,n_1,n_2,n_{3,2},n_{4,2},p_2^{(1)},p_2^{(2)},\varphi_2,t,\iota} \\ W^3_{q_1,q_2,n_1,n_2,n_{3,3},n_{4,3},p_3^{(1)},} & W^4_{q_1,q_2,n_1,n_2,n_{3,4},n_{4,4},p_4^{(1)},p_4^{(2)},\varphi_4,t,\iota} \end{matrix}\right]$ |

Where $$W^l_{q_1,q_2,n_1 n_2,n_{3,l},n_{4,l},p_l^{(1)},p_l^{(2)},\varphi_l,t,\iota} = \frac{1}{\sqrt{N_1 N_2 \gamma_{t,\iota,l}}} \left[\begin{matrix} \sum\nolimits_{i=0}^{L-1} v_{m_1^{(i)},m_2^{(i)}} p^{(1)}_{l,0} \sum\nolimits_{f=0}^{M_\upsilon-1} y^{(f)}_{t,l} \sum\nolimits_{\tau=0}^{Q-1} z^{(\tau)}_{\iota,l} p^{(2)}_{l,i,f,\tau} \varphi_{l,i,f,\tau} \\ \sum\nolimits_{i=0}^{L-1} v_{m_1^{(i)},m_2^{(i)}} p^{(1)}_{l,1} \sum\nolimits_{f=0}^{M_\upsilon-1} y^{(f)}_{t,l} \sum\nolimits_{\tau=0}^{Q-1} z^{(\tau)}_{\iota,l} p^{(2)}_{l,i+L,f,\tau} \varphi_{l,i+L,f,\tau} \end{matrix}\right],$$

$$\gamma_{t,\iota,l} = \sum_{i=0}^{2L-1} \left(p^{(1)}_{l,\lfloor \frac{i}{L} \rfloor}\right)^2 \left| \sum_{f=0}^{M_\upsilon-1} y^{(f)}_{t,l} \sum_{\tau=0}^{Q-1} z^{(\tau)}_{\iota,l} p^{(2)}_{l,i,f,\tau} \varphi_{l,i,f,\tau} \right|^2, \; l = 1, 2, 3, 4$$

and the mappings from $i_1$ to $q_1, q_2, n_1, n_2, n_{3,1}, n_{3,2}, n_{3,3}, n_{3,4}, n_{4,1}, n_{4,2}, n_{4,3}, n_{4,4}$ and from $i_2$ to $p_1^{(1)}, p_2^{(1)}, p_3^{(1)}, p_4^{(1)}, p_1^{(2)}, p_2^{(2)}, p_3^{(2)}, p_4^{(2)}, \varphi_1, \varphi_2, \varphi_3, \varphi_4$ are as described above, including the ranges of the constituent indices of $i_1$ and $i_2$.

$$b_2^{(k,2(N_1x_2+x_1)+1)}b_2^{(k,2(N_1x_2+x_1))} = 01$$

or 10. In one example, only the bit values '00' or '11' of Table 5.2.2.2.5-6 of TS 38.214 are configurable.

TABLE 5.2.2.2.5-6

| Maximum allowed average coefficient amplitudes for restricted vectors | |
|---|---|
| Bit $b_2^{(k,\ 2(N_1x_2+x_1)+1)}b_2^{(k,\ 2(N_1x_2+x_1))}$ | Maximum Average Coefficient Amplitude $\gamma_{i+pL}$ |
| 00 | 0 |
| 01 | $\sqrt{1/4}$ |
| 10 | $\sqrt{1/2}$ |
| 11 | 1 |

In one example the bitmap parameter n1-n2-codebook-SubsetRestriction-Doppler-r18 forms the bit sequence $B=B_1B_2$ and configures the vector group indices $g^{(k)}$ as in clause 5.2.2.2.3 of TS 38.214. Bit $$b_2^{(k,(N_1x_2+x_1))}$$

(of bit sequence B2) indicates whether the coefficients associated with the vector in group $g^{(k)}$ indexed by $x_1$, $x_2$ are restricted (not allowed for PMI reporting) or not restricted (allowed for PMI reporting), where the restriction is given in Table 1.

TABLE 4

| Hard restriction on vectors | |
|---|---|
| Bit $b_2^{(k,\ (N_1x_2+x_1))}$ | Value $\gamma_{i+pL}$ |
| 0 | 0 |
| 1 | 1 |

In one example, the list of UCI parameters for the Type II Doppler codebook as described in this disclosure is summarized in Table 3.

TABLE 5

| Parameter | UCI | Details/description |
|---|---|---|
| Rank indicator (RI) | Part 1 | min(2, $n_{RI}$) bits, where $n_{RI}$ is the number of allowed rank indicator values (e.g., based in RI-restriction via RRC) |
| Number of NZ coefs. $K^{NZ}$ | Part 1 | the total number of non-zero coefficients summed across all the layers, are reported in UCI part 1 |
| Wideband CQI | Part 1 | X = 1, or When X = 2, this is the 1st CQI ($CQI_1$) in time domain |
| Subband CQI | Part 1 | X = 1, or When X = 2, this is the 1st CQI ($CQI_1$) in time domain |
| Wideband CQI, if X = 2 | Part 2 | the 2nd CQI ($CQI_2$) in time domain |
| Subband CQI, if X = 2 | Part 2 | the 2nd CQI ($CQI_2$) in time domain |
| bitmap(s) per layer | Part 2 | Indicating the indices of NZ coefficients; $2LM_vQ$ bits per layer or $2LS + M_vQ$ bits per layer or $M_vS + 2LQ$ bits per layer<br>or $QS + 2LM_v$, bits per layer |
| Strongest coefficient indicator (SCI) | Part 2 | $N_4 = 1$: same as legacy (Rel16) $[\log_2(2L)]$ bits per layer (indicating SD index $i_l$*)<br>Rank = 1:a $[\log_2 K_{NZ}]$-bit indicator for the strongest coefficient index (l*, 0)<br>Rank > 1: $[\log_2(2L)]$ bits per layer (indicating SD index $i_l$*)<br>$N_4 > 1$:<br>Rank = 1:a $[\log_2 K_{NZ}]$-bit indicator for the strongest coefficient index (l*, f*, d*)<br>Rank > 1: $[\log_2(2L)]$ bits per layer (indicating SD index $i_l$*) or $[\log_2(2LQ)]$ bits per layer (indicating SD index $i_l$* and DD index d*) |
| SD basis subset selection indicator | Part 2 | *SD* basis subset selection indicator is a $\left\lceil \log_2\binom{N_1N_2}{L} \right\rceil$-bit indicator. |
| FD basis subset selection indicator | Part 2 | Details follow Rel.16 as described above |
| DD basis subset selection indicator (per layer), if $N_4 > 1$ | Part 2 | As described above |
| LC coefficients: phase | Part 2 | Legacy (Rel16) |
| LC coefficients: amplitude | Part 2 | Legacy (Rel16) |
| SD rotation factor $q_1$, $q_2$ | Part 2 | Values of $q_1$, $q_2$ follow Rel.15 |

In one embodiment, regarding the time instance and/or PMI(s) in which a CQI is associated with, given the CSI reporting window $W_{CSI}$ (in slots), as well as the number of CQIs (=X) in one sub-band and one CSI reporting instance, at least one of the following examples is used/configured.

In one example, X=1 and the CQI is associated with:

the first/earliest slot of the CSI reporting window (slot l) and the first/earliest of the $N_4$ $W_2$ matrices, and the last slot of the CSI reporting window (slot $l+W_{CSI}-1$) and the $N_4$-th$W_2$ matrix.

The CQI (i.e., one WB CQI when the CQI format=WB, or one WB CQI and SB differential CQI for each SB when the CQI format=SB) is included in CSI part 1 of a two-part CSI and hence multiplexed with UCI part 1. Here, each SB CQI is differential w.r.t. to the WB CQI. In one example, for each sub-band index s, a 2-bit sub-band differential CQI is defined as:

Sub-band Offset level (s)=sub-band CQI index (s)−wide-band CQI index.

The mapping from the 2-bit sub-band differential CQI values to the offset level is shown in Table 5.2.2.1-1

TABLE 5.2.2.1-1

Mapping sub-band differential CQI value to offset level

| Sub-band differential CQI value | Offset level |
|---|---|
| 0 | 0 |
| 1 | 1 |
| 2 | ≥2 |
| 3 | ≤−1 |

In one example, X=2 and the 1st CQI is associated with the first/earliest slot of the CSI reporting window (slot l) and the first/earliest of the $N_4$ $W_2$ matrices, and the 2nd CQI is associated with either one of both of (A) and (B).

(A) middle slot of the CSI reporting window (slot $l+W_{CSI}/2$) and the $(N_4/2)$-th $W_2$ matrix (B) last slot of the CSI reporting window (slot $l+W_{CSI}-1$) and the $N_4$-th$W_2$ matrix In one example, the value of X can be determined/reported by the UE, e.g., via UCI part 1 (e.g., a 1-bit parameter or field can be used if X can take two values, e.g., 1 and 2). This can be subject to a configuration (e.g., RRC) from the NW. Also, this configuration can be further subject to UE reporting the support of X=2 via its capability reporting.

In one example,

X=1: if the higher layer parameter TDCQI is set to '1-1' or '1-2', where 1-1 implies one CQI based on one slot (1st slot of the CSI reporting window), and 1-2 implies one CQI based on two slots (1st and last slots of the CSI reporting window)

X=2: if the higher layer parameter TDCQI is set to '2'

Let $CQI_1$ and $CQI_2$ denote the 1st and the 2nd CQIs of the two CQIs across time. When the CQI format=WB, one WB $CQI_1$ and one WB $CQI_2$ are reported for the configured CSI reporting band. When the CQI format=SB, one WB $CQI_1$, one WB $CQI_2$ and for each SB in the CSI reporting band, one SB $CQI_{1,SB}$ and one SB $CQI_{2,SB}$ are reported. That is, if $N_{SB}$ is the number of SBs in the CSI reporting band, one WB $CQI_1$ and $N_{SB}$ $CQI_{1,SB}$ are reported for the 1st CQI. Likewise, one WB $CQI_2$ and $N_{SB}$ $CQI_{2,SB}$ are reported for the 2nd CQI. In one example, WB $CQI_1$=WB $CQI_2$, i.e., the WB CQI is common across two CQIs across time. In this case, only one WB CQI is reported for the CSI reporting and for the whole CSI reporting window. In one example, the UE is configured with the number of WB CQIs (in case of SB CQI reporting format), where the number can be 1 or 2. In one example, the CQI format for both CQIs across time domain is the same. In one example, the CQI format for both CQIs across time domain can be different (independently configured). In one example, the CQI format for $CQI_1$ can be WB or SB (based on CQI format configuration), but the CQI format for $CQI_2$ is fixed (e.g., WB only). In one example, the CQI format for $CQI_2$ can be WB or SB (based on CQI format configuration), but the CQI format for $CQI_1$ is fixed (e.g., WB only or SB only). In one example, the CQI format for $CQI_1$ is configured, and the CQI format for $CQI_2$ is determined/reported by the UE, e.g., via UCI part 1 (e.g., a 1-bit parameter or field can be used). In one example, the CQI format for $CQI_2$ is configured, and the CQI format for $CQI_1$ is determined/reported by the UE, e.g., via UCI part 1 (e.g., a 1-bit parameter or field can be used). In one example, the CQI format both $CQI_1$ and $CQI_2$ are determined/reported by the UE, e.g., via UCI part 1 (e.g., a 1-bit parameter or field can be used if the CQI format can be the same for the two CQIs, or a 2-bit parameter or field, e.g., 1-bit per CQI, can be used if the CQI format can be the same or different for the two CQIs).

In one example, both of the two CQIs across time, denoted as $CQI_1$ and $CQI_2$ (i.e., one WB $CQI_1$ and one $CQI_2$ when the CQI format=WB, or one WB $CQI_1$ and one WB $CQI_2$ and SB $CQI_1$ and SB $CQI_2$ for each SB when the CQI format=SB) are included in CSI part 1 of a two-part CSI and hence multiplexed with UCI part 1.

In one example, both of the two CQIs across time, denoted as $CQI_1$ and $CQI_2$ (i.e., one WB $CQI_1$ and one $CQI_2$ when the CQI format=WB, or one WB $CQI_1$ and one WB $CQI_2$ and SB $CQI_1$ and SB $CQI_2$ for each SB when the CQI format=SB) are included in CSI part 2 of a two-part CSI and hence multiplexed with UCI part 2.

In one example, the first CQI of the two CQIs across time, denoted as $CQI_1$ (i.e., one WB $CQI_1$ when the CQI format=WB, or one WB $CQI_1$ and SB $CQI_1$ for each SB when the CQI format=SB) is included in CSI part 1 of a two-part CSI and hence multiplexed with UCI part 1. The second CQI of the two CQIs across time, denoted as $CQI_2$ (i.e., one WB $CQI_2$ when the CQI format=WB, or one WB $CQI_2$ and SB $CQI_2$ for each SB when the CQI format=SB) is included in CSI part 2 of a two-part CSI and hence multiplexed with UCI part 2.

In one example, the first CQI of the two CQIs across time, denoted as $CQI_1$ (i.e., one WB $CQI_1$ when the CQI format=WB, or one WB $CQI_1$ and SB $CQI_1$ for each SB when the CQI format=SB) and the WB $CQI_2$ are included in CSI part 1 of a two-part CSI and hence multiplexed with UCI part 1. When the CQI format of the second CQI of the two CQIs across time, denoted as $CQI_2$ is SB, SB $CQI_2$ for each SB is included in CSI part 2 of a two-part CSI and hence multiplexed with UCI part 2.

In one example, the WB $CQI_1$ and WB $CQI_2$ are included in CSI part 1 of a two-part CSI and hence multiplexed with UCI part 1. When the CQI format either of $CQI_1$ and $CQI_2$ is SB, SB $CQI_1$ and/or SB $CQI_2$ for each SB is included in CSI part 2 of a two-part CSI and hence multiplexed with UCI part 2.

In one example, when X=2, the information related to the two CQIs (e.g., one of the examples above) is included in CSI part 1 as well as CSI part 2, and the CSI part 2 (or UCI part 2) comprises three groups, (G0, G1, G2), at least one of the following examples is used/configured regarding including the CQI in CSI part 2. For instance, the information related to $CQI_1$ can be included in CSI part 1 and the information related to $CQI_2$ can be included in CSI part 2.

In one example, the information (e.g., $CQI_2$) included in CSI part 2 is placed (multiplexed) in G0.

In one example, the information (e.g., $CQI_2$) included in CSI part 2 is placed (multiplexed) in G1.

In one example, the information (e.g., $CQI_2$) included in CSI part 2 is placed (multiplexed) in G2.

In one example, the information (e.g., $CQI_2$) included in CSI part 2 is placed (multiplexed) in only one of G0, G1, or G2, and which one is either configured (e.g., RRC), or reported by the UE (e.g., via CSI or UCI part 1).

In one example, the WB information (e.g., WB $CQI_2$) is included in G0, and the SB information, if reported, (e.g., SB $CQI_{2,SB}$) is included in G1.

In one example, the WB information (e.g., WB $CQI_2$) is included in G0, and the SB information, if reported, (e.g., SB $CQI_{2,SB}$) is included in G2.

In one example, the WB information (e.g., WB $CQI_2$) is included in G1, and the SB information, if reported, (e.g., SB $CQI_{2,SB}$) is included in G2.

In one example, the WB information (e.g., WB $CQI_2$) is included in G0, the SB information for all even SBs with increasing order of SB number, if reported, (e.g., even-numbered SB $CQI_{2,SB}$) is included in G1, and the SB information for all odd SBs with increasing order of SB number, if reported, (e.g., odd-numbered SB $CQI_{2,SB}$) is included in G2.

In one example, when X=2, the information related to the two CQIs (e.g., one of the examples above) is included in CSI part 1 as well as CSI part 2, and the CSI part 2 (or UCI part 2) comprises four groups, (G0, G1, G2, G3), the information (e.g., $CQI_2$) included in CSI part 2 is placed (multiplexed) in G3. In this case, if UCI omission happens, G4 is omitted first (i.e., G3 has the least priority).

In one example, subbands for given CSI report n indicated by the higher layer parameter csi-ReportingBand are numbered continuously in the increasing order with the lowest subband of csi-ReportingBand as subband 0.

In one embodiment, for Type II Doppler CSI feedback on PUSCH, a CSI report comprises of two parts. Part 1 has a fixed payload size and is used to identify the number of information bits in Part 2. Part 1 may be transmitted in its entirety before Part 2. When CSI reporting on PUSCH comprises two parts, the UE may omit a portion of the Part 2 CSI. Omission of Part 2 CSI is according to the priority order shown in Table 5.2.3-1 of [9], where $N_{Rep}$ is the number of CSI reports configured to be carried on the PUSCH. Priority 0 is the highest priority and priority $2N_{Rep}$ is the lowest priority and the CSI report n corresponds to the CSI report with the nth smallest $Pri_{i,CSI}(y, k, c, s)$ value among the $N_{Rep}$ CSI reports as defined in Clause 5.2.5 of [9]. The subbands for a given CSI report n indicated by the higher layer parameter csi-ReportingBand are numbered continuously in increasing order with the lowest subband of csi-ReportingBand as subband 0. When omitting Part 2 CSI information for a particular priority level, the UE may omit all of the information at that priority level.

In one example, when X=1, for Type II Doppler CSI feedback, Part 1 contains RI (if reported), CQI, and an indication of the overall number of non-zero amplitude coefficients across layers. The fields of Part 1-RI (if reported), CQI, and the indication of the overall number of non-zero amplitude coefficients across layers—are separately encoded. Part 2 contains the PMI of the Type II Doppler, as described above. Part 1 and 2 are separately encoded.

In one example, when X=2, for Type II Doppler CSI feedback, Part 1 contains RI (if reported), $CQI_1$, and an indication of the overall number of non-zero amplitude coefficients across layers. The fields of Part 1-RI (if reported), $CQI_1$, and the indication of the overall number of non-zero amplitude coefficients across layers—are separately encoded. Part 2 contains the PMI of the Type II Doppler and contains the $CQI_2$ (if reported) when X=2, as described above. Part 1 and 2 are separately encoded.

In one example, when X=2, for Type II Doppler CSI feedback, Part 1 contains RI (if reported), ($CQI_1$, $CQI_2$), and an indication of the overall number of non-zero amplitude coefficients across layers. The fields of Part 1-RI (if reported), ($CQI_1$, $CQI_2$), and the indication of the overall number of non-zero amplitude coefficients across layers—are separately encoded. Part 2 contains the PMI of the Type II Doppler, as described above. Part 1 and 2 are separately encoded.

In one example, for Enhanced Type II for predicted PMI (see Clause 5.2.2.2.10) and Further Enhanced Type II Port Selection for predicted PMI (see Clause 5.2.2.2.11), Part 1 contains RI (if reported), the CQI (if the higher layer parameter TDCQI is set to '1-1' or '1-2') or the first CQI (if the higher layer parameter TDCQI is set to '2') and the total number of reported non-zero amplitude coefficients across layers. The fields of Part 1-RI (if reported), CQI, and the total number of reported non-zero amplitude coefficients across layers—are separately encoded. Part 2 contains the second CQI (if the higher layer parameter TDCQI is set to '2') and the PMI of the Enhanced Type II for predicted PMI or Further Enhanced Type II Port Selection for predicted PMI. Part 1 and 2 are separately encoded.

For Type II Doppler reports, for a given CSI report n, each reported element of indices $i_{2,4,l}$, $i_{2,5,l}$ and $i_{1,7,l}$, indexed by l, i f and d, is associated with a priority value Pri(l, i, f, d) with $l=1, 2, \ldots, \upsilon$, $i=0, 1, \ldots, 2L-1$, $f=0, 1, \ldots, M_\upsilon-1$ and $d=0, 1, \ldots, Q-1$. The element with the highest priority has the lowest associated value Pri(l, i, f). Omission of Part 2 CSI is according to the priority order shown in Table 5.2.3-1, where Group 0 includes indices $i_{1,1}$ (if reported), $i_{1,2}$ (if reported) and $i_{1,8,l}$ ($l=1, \ldots, v$) and the second wideband CQI (if reported).

Group 1 includes indices $i_{1,5}$ (if reported), $i_{1,6,l}$ (if reported), the $\upsilon 2LM_\upsilon - \lfloor K^{NZ}/2 \rfloor$ highest priority elements of $i_{1,7,l}$, $i_{2,3,l}$, the $$\max\left(0, \left\lceil \frac{K^{NZ}}{2} \right\rceil - v\right)$$

highest priority elements of $i_{2,5,l}$ and the $$\max\left(0, \left\lceil \frac{K^{NZ}}{2} \right\rceil - v\right)$$

highest priority elements of $i_{2,4,l}$ ($L=1, \ldots, v$).

Group 2 includes the $\lfloor K^{NZ}/2 \rfloor$ lowest priority elements of $i_{1,7,l}$, the $$\min\left(K^{NZ}-v, \left\lfloor\frac{K^{NZ}}{2}\right\rfloor\right)$$

lowest priority elements of $i_{2,4,l}$ and the $$\min\left(K^{NZ}-v, \left\lfloor\frac{K^{NZ}}{2}\right\rfloor\right)$$

lowest priority elements of $i_{2,5,l}$ (l=1, . . . , v).

The indicator $i_{1,9}$ or $i_{1,9,l}$ (if reported) indicating the DD basis vectors is included in one of the three groups.

In one example, Group 0 further includes $i_{1,9}$ or $i_{1,9,l}$ (if reported) indicating the DD basis vectors.

In one example, Group 1 further includes $i_{1,9}$ or $i_{1,9,l}$ (if reported) indicating the DD basis vectors.

Likewise, the SCI indicates $$(i_l^*, 0, d_l^*)$$

via two separate indicators $i_{1,8,l}$ and $i_{1,10,l}$ (as described above, and if reported), the indicator $i_{1,10,l}$ (if reported) indicating the DD basis vector is associated with is included in one of the three groups.

In one example, Group 0 includes both $i_{1,8,l}$ and $i_{1,10,l}$ (if reported).

In one example, Group 1 includes both $i_{1,8,l}$ and $i_{1,10,l}$ (if reported).

In one example, Group 0 includes $i_{1,8,l}$ and Group 1 includes $i_{1,10,l}$ (if reported).

In one example, Group 1 includes $i_{1,8,l}$ and Group 2 includes $i_{1,10,l}$ (if reported).

In one example, Group 0 includes $i_{1,8,l}$ and Group 2 includes $i_{1,10,l}$ (if reported).

For Type II Doppler reports (when $N_4>1$) or Enhanced Type II for predicted PMI configured with $N_4>1$, for a given CSI report n, each reported element of indices $i_{2,4,l}$, $i_{2,5,l}$ and $i_{1,7,l}$, indexed by l, i f and d, is associated with a priority value Pri(l, i, f, d) with l=1, 2, . . . , υ, i=0, 1, . . . , 2L−1, f=0, 1, . . . , $M_υ$−1 and d=0, 1, . . . , Q−1. The element with the highest priority has the lowest associated value Pri(l, i, f). Omission of Part 2 CSI is according to the priority order shown in Table 5.2.3-1, where Group 0 includes indices $i_{1,1}$ (if reported), $i_{1,2}$ (if reported) and $i_{1,8,l}$ (l=1, . . . , v) and the second wideband CQI (if reported).

Group 1 includes indices $i_{1,5}$ (if reported), $i_{1,6,l}$ (if reported), the $υ2LM_υ-\lfloor K^{NZ}/2\rfloor$ highest priority elements of $i_{1,7,l}$, $i_{2,3,l}$, the $$\max\left(0, \left\lceil\frac{K^{NZ}}{2}\right\rceil - v\right)$$

highest priority elements of $i_{2,4,l}$ and the $$\max\left(0, \left\lceil\frac{K^{NZ}}{2}\right\rceil - v\right)$$

highest priority elements of $i_{2,5,l}$ (l=1, . . . , v) $i_{1,9,l}$ (if reported) and the second subband CQI of even subbands (if reported).

Group 2 includes the $\lfloor K^{NZ}/2\rfloor$ lowest priority elements of $i_{1,7,l}$, the $$\min\left(K^{NZ}-v, \left\lfloor\frac{K^{NZ}}{2}\right\rfloor\right)$$

lowest priority elements of $i_{2,4,l}$ and the $$\min\left(K^{NZ}-v, \left\lfloor\frac{K^{NZ}}{2}\right\rfloor\right)$$

lowest priority elements of $i_{2,5,l}$ (l=1, . . . , v) and the second subband CQI of odd subbands (if reported).

For Enhanced Type II for predicted PMI configured with $N_4=1$, for a given CSI report n, each reported element of $i_{2,4,l}$ $i_{2,5,l}$ and $i_{1,7,l}$, indexed by l, i and f, is associated with a priority value Pri(l, i, f)=2·L·υ·π(f)+υ·i+l, with $$\pi(f) = \min\left(2\cdot n_{3,l}^{(f)}, 2\cdot\left(N_3 - n_{3,l}^{(f)}\right)-1\right)$$

with (=1, 2, . . . , υ, i=0, 1, . . . , 2L−1, and f=0, 1, . . . , $M_υ$−1, and where $$n_{3,l}^{(f)}$$

is defined in Clause 5.2.2.2.5. The element with the highest priority has the lowest associated value Pri(l, i, f). Omission of Part 2 CSI is according to the priority order shown in Table 5.2.3-1, where Group 0 includes indices $i_{1,1}$ (if reported), $i_{1,2}$ (if reported) and $i_{1,8,l}$ (l=1, . . . , v).

Group 1 includes indices $i_{1,5}$ (if reported), $i_{1,6,l}$ (if reported), the $υ2LM_υ-\lfloor K^{NZ}/2\rfloor$ highest priority elements of $i_{1,7,l}$, $i_{2,3,l}$, the $$\max\left(0, \left\lceil\frac{K^{NZ}}{2}\right\rceil - v\right)$$

highest priority elements of $i_{2,4,l}$ and the $$\max\left(0, \left\lceil\frac{K^{NZ}}{2}\right\rceil - v\right)$$

highest priority elements of $i_{2,5,l}$ (l=1, . . . , v).

Group 2 includes the $\lfloor K^{NZ}/2\rfloor$ lowest priority elements of $i_{1,7,l}$, the $$\min\left(K^{NZ}-v, \left\lfloor\frac{K^{NZ}}{2}\right\rfloor\right)$$

lowest priority elements of $i_{2,4,l}$ and the $$\min\left(K^{NZ}-v, \left\lfloor\frac{K^{NZ}}{2}\right\rfloor\right)$$

lowest priority elements of $i_{2,4,l}$ and the $i_{2,5,l}$ (l=1, . . . , v).

For Further Enhanced Type II Port Selection for predicted PMI, for a given CSI report n, each reported element of $i_{2,4,l}$ $i_{2,5,l}$ and $i_{1,7,l}$, indexed by l, i and f, is associated with a priority value Pri(l, i, f)=$K_1$·υ·f+υ·i+l, with l=1, 2, . . . , υ, i=0, 1, . . . , $K_1$−1 and f=0, . . . , M−1. The element with the highest priority has the lowest associated value Pri(l, i, f). Omission of Part 2 CSI is according to the priority order shown in Table 5.2.3-1, where:

Group 0 includes $i_{1,2}$ (if reported), $i_{1,8,l}$ (l=1, . . . , v) and $i_{1,6}$ (if reported).

Group 1 includes the $\upsilon K_1 M-\lfloor K^{NZ}/2\rfloor$ highest priority elements of $i_{1,7,l}$ (if reported), $i_{2,3,l}$, the $$\max\left(0, \left\lceil\frac{K^{NZ}}{2}\right\rceil-v\right)$$

highest priority elements of $i_{2,4,l}$ and the $$\max\left(0, \left\lceil\frac{K^{NZ}}{2}\right\rceil-v\right)$$

highest priority elements of $i_{2,5,l}$ (l=1, . . . , v).

TABLE 5.2.3-1

| Priority reporting levels for Part 2 CSI |
| --- |
| Priority 0:<br>For CSI reports 1 to $N_{Rep}$, Group 0 CSI for CSI reports configured as 'typeII-r16', 'typeII-PortSelection-r16' or 'typeII-PortSelection-r17' or 'typeII-Doppler-r18' or 'typeII-Doppler-PortSelection-r18'; Part 2 wideband CSI for CSI reports configured otherwise |
| Priority 1:<br>Group 1 CSI for CSI report 1, if configured as 'typell-r16', 'typeII-PortSelection-r16' or 'typeII-PortSelection-r17' or 'typeII-Doppler-r18' or 'typeII-Doppler-PortSelection-r18'; Part 2 subband CSI of even subbands for CSI report 1, if configured otherwise |
| Priority 2:<br>Group 2 CSI for CSI report 1, if configured as 'typeII-r16', 'typeII-PortSelection-r16' or 'typeII-PortSelection-r17' or 'typeII-Doppler-r18' or 'typeII-Doppler-PortSelection-r18'; Part 2 subband CSI of odd subbands for CSI report 1, if configured otherwise |
| Priority 3:<br>Group 1 CSI for CSI report 2, if configured as 'typeII-r16', 'typeII-PortSelection-r16' or 'typeII-PortSelection-r17' or 'typeII-Doppler-r18' or 'typeII-Doppler-PortSelection-r18'; Part 2 subband CSI of even subbands for CSI report 2, if configured otherwise |
| Priority 4:<br>Group 2 CSI for CSI report 2, if configured as 'typeII-r16', 'typeII-PortSelection-r16' or 'typeII-PortSelection-r17' or 'typeII-Doppler-r18' or 'typeII-Doppler-PortSelection-r18'. Part 2 subband CSI of odd subbands for CSI report 2, if configured otherwise |
| .<br>.<br>. |
| Priority $2N_{Rep}-1$:<br>Group 1 CSI for CSI report $N_{Rep}$, if configured as 'typeII-r16', 'typeII-PortSelection-r16' or 'typeII-PortSelection-r17' or 'typeII-Doppler-r18' or 'typeII-Doppler-PortSelection-r18'; Part 2 subband CSI of even subbands for CSI report $N_{Rep}$, if configured otherwise |
| Priority $2N_{Rep}$:<br>Group 2 CSI for CSI report $N_{Rep}$, if configured as 'typeII-r16', 'typeII-PortSelection-r16' or 'typeII-PortSelection-r17' or 'typeII-Doppler-r18' or 'typeII-Doppler-PortSelection-r18'; Part 2 subband CSI of odd subbands for CSI report $N_{Rep}$, if configured otherwise |

In one example, the priority rule can be as follows: (Layer→SD→γ (FD, DD)) Each reported element of indices for component X indexed by l, i and γ(f, d), is associated with a priority value Pri(l, i, f, d)=2·L·υ·γ(f, d)+υ·i+l, with γ(.,.) is a function of f and d. In one example, γ(.,.)=Qf+d. In one example, γ(.,.)=$M_\upsilon$d+f. Here, l=1, 2, . . . , υ, i=0, 1, . . . , 2L−1, and γ(f, d)=0, 1, . . . , $QM_\upsilon$−1.

In one example, the priority rule can be as follows: (Layer→SD→γ(FD, DD)) Each reported element of indices for component X indexed by l, i and γ(f, d), is associated with a priority value Pri(l, i, f, d)=2·L·υ·γ(π(f), d)+υ·i+l, with γ(.,.) is a function of π(f) and d, and π(·) is a permutation function. In one example, γ(.,.)=Qπ(f)+d. In one example, γ(.,.)=$M_\upsilon$d+π(f). Here, l=1, 2, . . . , υ, i=0, 1, . . . , 2L−1, and γ(x(f), d)=0, 1, . . . , $QM_\upsilon$−1.

In one example, $$\pi(f)=\min\left(2\cdot n_{3,l}^{(f)}, 2\cdot\left(N_3-n_{3,l}^{(f)}\right)-1\right), \text{ where } n_{3,l}^{(f)}$$

is FD beam index defined in Clause 5.2.2.2.5 of [9].

In one example, the priority rule can be as follows: (Layer→SD→FD→DD) Each reported element of indices for component X indexed by l, i, f, and d, is associated with a priority value Pri(l, i, f, d)=2·L·υ$M_\upsilon$·d+2·L·υ·π(f)+υ·i+l, with π(·) is a permutation function, where l=1, 2, . . . , υ, i=0, 1, . . . , 2L−1, f=0, 1, . . . , $M_\upsilon$−1, and d=0, . . . , Q−1.

In one example, π(f)=f (e.g., no permutation).

In one example, $$\pi(f)=\min\left(2\cdot n_{3,l}^{(f)}, 2\cdot\left(N_3-n_{3,l}^{(f)}\right)-1\right), \text{ where } n_{3,l}^{(f)}$$

is defined in Clause 5.2.2.2.5 of [9].

In one example, the priority rule can be as follows: (Layer→SD→DD→FD) Each reported element of indices for component X indexed by l, i, f, and d, is associated with a priority value $\mathrm{Pri}(l, i, f, d)=2\cdot L\cdot \upsilon\cdot Q\cdot \pi(f)+2\cdot L\cdot \upsilon\cdot d+\upsilon\cdot i+l$, with $\pi(\cdot)$ is a permutation function, where $l=1, 2, \ldots, \upsilon$, $i=0, 1, \ldots, 2L-1$, $f=0, 1, \ldots, M_\upsilon-1$ and $d=0, \ldots, Q-1$.

In one example, $\pi(f)=f$ (e.g., no permutation).

In one example, $$\pi(f)=\min\left(2\cdot n_{3,l}^{(f)}, 2\cdot\left(N_3-n_{3,l}^{(f)}\right)-1\right), \text{ where } n_{3,l}^{(f)}$$

is defined in Clause 5.2.2.2.5 of [9].

In one example, the priority rule can be as follows: (Layer→DD→SD→FD) Each reported element of indices for component X indexed by l, i, f, and d, is associated with a priority value $\mathrm{Pri}(l, i, f, d)=2\cdot L\cdot \upsilon\cdot Q\cdot \pi(f)+\upsilon\cdot Q\cdot i+\upsilon\cdot d+l$, with $\pi(\cdot)$ is a permutation function, where $l=1, 2, \ldots, \upsilon$, $i=0, 1, \ldots, 2L-1$, $f=0, 1, \ldots, M_\upsilon-1$ and $d=0, \ldots, Q-1$.

In one example, $\pi(f)=f$ (e.g., no permutation).

In one example, $$\pi(f)=\min\left(2\cdot n_{3,l}^{(f)}, 2\cdot\left(N_3-n_{3,l}^{(f)}\right)-1\right), \text{ where } n_{3,l}^{(f)}$$

is defined in Clause 5.2.2.2.5 of [9].

In one example, the priority rule can be as follows: (DD→Layer→SD→FD) Each reported element of indices for component X indexed by l, i, f, and d, is associated with a priority value $\mathrm{Pri}(l, i, f, d)=2\cdot L\cdot \upsilon\cdot Q\cdot \pi(f)+\upsilon\cdot Q\cdot i+Q\cdot l+d$, with $\pi(\cdot)$ is a permutation function, where $l=1, 2, \ldots, \upsilon$, $i=0, 1, \ldots, 2L-1$, $f=0, 1, \ldots, M_\upsilon-1$, and $r=0, \ldots, Q-1$.

In one example, $\pi(f)=f$ (e.g., no permutation).

In one example, $$\pi(f)=\min\left(2\cdot n_{3,l}^{(f)}, 2\cdot\left(N_3-n_{3,l}^{(f)}\right)-1\right), \text{ where } n_{3,l}^{(f)}$$

is defined in Clause 5.2.2.2.5 of [9].

In one example, $M_\upsilon$ described in any example of this disclosure can be replaced by M, i.e., which is not dependent of rank v.

Figure 19:
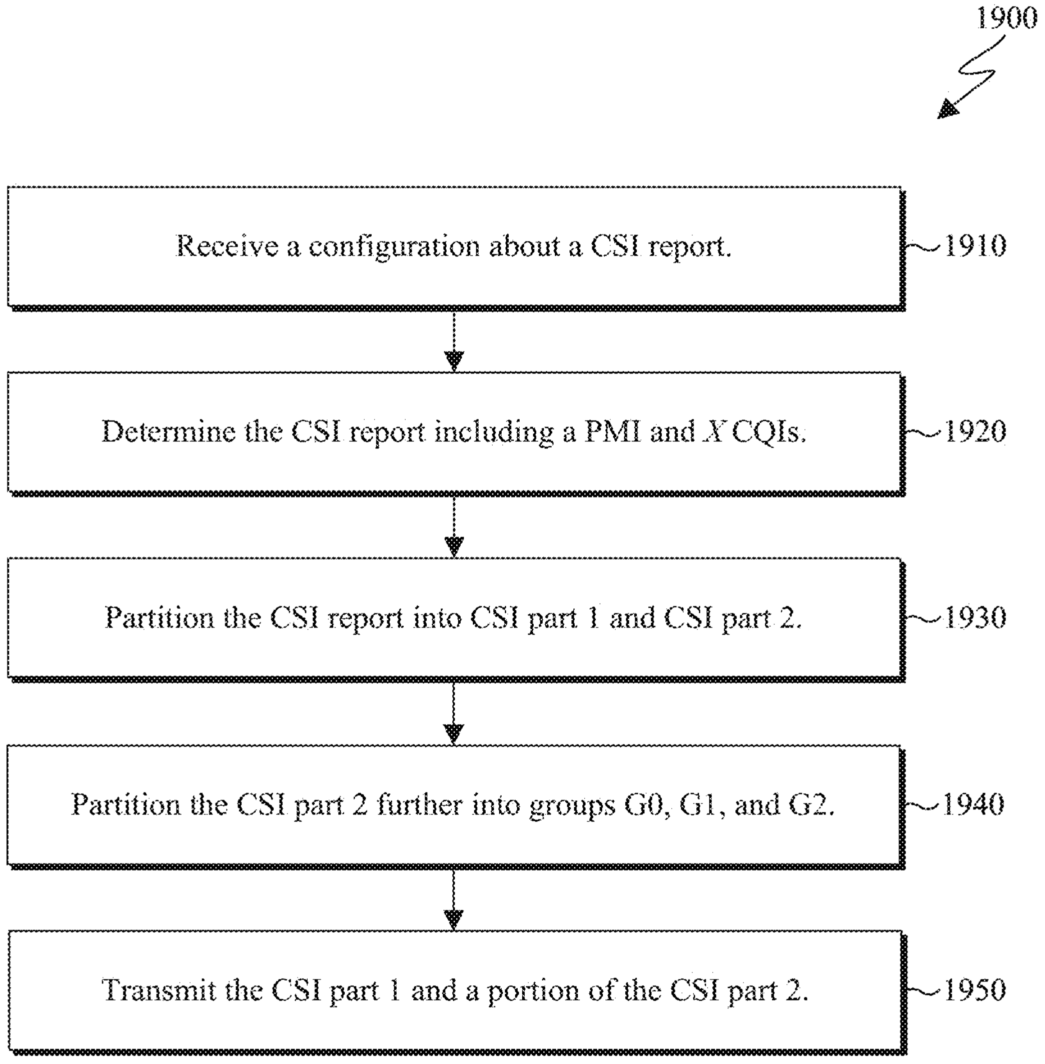
FIG. 19 illustrates an example method performed by a UE in a wireless communication system according to embodiments of the present disclosure.

FIG. 19 illustrates an example method 1900 performed by a UE in a wireless communication system according to embodiments of the present disclosure. The method 1900 of FIG. 19 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1900 is for illustration only and other embodiments can be used without departing from the scope of the present disclosure.

The method 1900 begins with the UE receiving a configuration about a CSI report (1910). For example, in 1910, the configuration may include a value of $N_4$ and a codebookType set to typeII-Doppler-r18. In various embodiments, the value of $N_4$ belongs to a set including {2, 4, 8} and the value of Q=2.

The UE then determines the CSI report including a PMI and X CQIs (1920). For example, in 1920 the CSI report may be determined based on the configuration and the PMI may include a first indicator indicating Q DD vectors, each of length $N_4$, where $X\in\{1, 2\}$, The UE then partitions the CSI report into CSI part 1 and CSI part 2 (1930). In various embodiments, when X=1, the CQI included in the CSI part 1. In various embodiments, when X=2: the two CQIs are $CQI_1$ and $CQI_2$, $CQI_1$ is included in the CSI part 1, and $CQI_2$ is included in the CSI part 2.

The UE then partitions the CSI part 2 further into groups G0, G1, and G2 (1940). In various embodiments, the first indicator is included in G1. In various embodiments, $CQI_2$ includes components: $CQI_{2,WB}$ and $\{CQI_{2,SB,i}\}$, $i=0, 1, \ldots, N_{SB}-1$, where $CQI_{2,WB}$ is a WB component and $CQI_{2,SB,i}$ is a SB component associated with a SB index i, $CQI_{2,WB}$ is included in G0, all even-numbered $CQI_{2,SB,i}$ are included in G1, and all odd-numbered $CQI_{2,SB,i}$ are included in G2.

The UE then transmits the CSI part 1 and a portion of the CSI part 2 (1950). For example, in 1950, the portion of the CSI part 2 is determined based on a priority value. In various embodiments, the priority value is given by $\mathrm{Pri}(l, i, f, d)=2\cdot L\cdot \upsilon\cdot M_\upsilon\cdot d+2\cdot L\cdot \upsilon\cdot f+\upsilon\cdot i+l$, where each reported element of indices of second, third, and fourth indicators, $i_{2,4,l}$, $i_{2,5,l}$, and $i_{1,7,l}$, respectively, indexed by (l, i, f, d), is associated with the priority value Pri(l, i, f, d) with: $l=1, 2, \ldots, \upsilon$, $i=0, 1, \ldots, 2L-1$, $f=0, 1, \ldots, M_\upsilon-1$, and $d=0, 1, \ldots, Q-1$.

In various embodiments, the UE further determines L vectors, each of length $$\frac{P_{CSIRS}}{2},$$

$M_\upsilon$ vectors, each of length $N_3$, $2LM_\upsilon Q$ coefficients, $LM_\upsilon Q$ coefficients associated with each of two halves of $P_{CSIRS}$ ports. The UE may then transmit the CSI report including a fifth indicator indicating the L vectors, a sixth indicator indicating the $M_\upsilon$ vectors, the fourth indicator $i_{1,7,l}$ indicating indices of $K^{NZ}$ non-zero (NZ) coefficients, and elements of the second and third indicators, $i_{2,4,l}$ and $i_{2,5,l}$ indicating amplitudes and phases of the $K^{NZ}$ NZ coefficients, respectively. Here, where $N_{3>1}$, $K^{NZ}\leq 2LM_\upsilon Q$, and $P_{CSIRS}$ is a number of CSI-RS ports configured for the CSI report.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:

a transceiver configured to receive, from a base station, configuration information for a channel state information (CSI) report including codebook type information indicating typeII-Doppler-r18; and a processor operably coupled to the transceiver, the processor configured to generate, based on the configuration information, the CSI report including a precoding matrix indicator (PMI), the PMI including an indicator indicating Q vectors, wherein the transceiver is further configured to transmit, to the base station, the CSI report including a CSI part 1 and a CSI part 2, and wherein a portion of the CSI part 2 is omitted and the omitted portion of the CSI part 2 is determined based on a priority value, and wherein the priority value is given by:

$$Pri(l, i, f, d) = 2 \cdot L \cdot \upsilon \cdot M_{\upsilon} \cdot d + 2 \cdot L \cdot \upsilon \cdot f + \upsilon \cdot i + l$$

where each reported element of indices of second, third, and fourth indicators, $i_{2,4,l}$, $i_{2,5,l}$, and $i_{1,7,l}$, respectively, indexed by (l, i, f, d), is associated with the priority value Pri(l, i, f, d) with:

l=1, 2, . . . , υ, where l is a layer index and v is a rank value, i=0, 1, . . . , 2L−1, where i is a spatial-domain (SD) index and L is a number of SD vectors, f=0, 1, . . . , $M_{\upsilon}$−1, where f is a frequency-domain (FD) index and $M_{\upsilon}$ is a number of FD vectors, and d=0, 1, . . . , Q−1, where d is a Doppler-domain (DD) index and Q is a number of DD vectors.

2. The UE of claim 1, wherein:

the configuration information for the CSI report includes a value of $N_4$ representing Doppler-/time-domain (DD/TD) basis vector length, and $N_4$>1 the indicator is included in G1 and indicates indices $$n_{4,l} = \left[n_{4,l}^{0} \ \dots \ n_{4,l}^{(Q-1)}\right]$$

of the Q vectors, where $$n_{4,l}^{(d)} \in \{0, 1, \dots, N_4 - 1\}$$

with indices d∈{0, . . . , Q−1} assigned such that $$n_{4,l}^{(d)}$$

increases with d, where $$n_{4,l}^{(0)} \ \dots \ n_{4,l}^{(Q-1)}$$

are respective indices of the Q vectors, when $N_4$=Q, the first indicator is not reported, and when $N_4$>Q, one or more nonzero offsets between $$n_{4,l}^{(0)} \ \dots \ n_{4,l}^{(Q-1)}$$

are reported with the indicator assuming that a reference for the one or more nonzero offsets $$\left(n_{4,l}^{(0)}\right)$$

is 0, and values for the one or more nonzero offsets are mapped to values for the indices of the first indicator in an increasing order with an offset value of 1 mapped to an index value of ‘0’.

3. The UE of claim 1, wherein;

the CSI report includes X channel quality indicators (CQIs), where X∈{1, 2}, and when X=1, a CQI is included in the CSI part 1.

4. The UE of claim 3, wherein, when X=2:

two CQIs are $CQI_1$ and $CQI_2$, the $CQI_1$ is included in the CSI part 1, and the $CQI_2$ is included in the CSI part 2.

5. A base station (BS) comprising:

a processor; and a transceiver operably coupled to the processor, the transceiver configured to:

transmit, to a user equipment (UE), configuration information for a channel state information (CSI) report including codebook type information indicating typeII-Doppler-r18; and receive, based on the configuration information, the CSI report including a precoding matrix indicator (PMI), the PMI including an indicator indicating Q vectors, wherein the CSI report includes a CSI part 1 and a CSI part 2, wherein a portion of the CSI part 2 is omitted and the omitted portion of the CSI part 2 is determined based on a priority value, and wherein the priority value is given by:

$$Pri(l, i, f, d) = 2 \cdot L \cdot \upsilon \cdot M_{\upsilon} \cdot d + 2 \cdot L \cdot \upsilon \cdot f + \upsilon \cdot i + l$$

where each reported element of indices of second, third, and fourth indicators, $i_{2,4,l}$, $i_{2,5,l}$, and $i_{1,7,l}$, respectively, indexed by (l, i, f, d), is associated with the priority value Pri(l, i, f, d) with:

l=1, 2, . . . , υ, where l is a layer index and υ is a rank value, i=0, 1, . . . , 2L−1, where i is a spatial-domain (SD) index and L is a number of SD vectors, f=0, 1, . . . , $M_{\upsilon}$−1, where f is a frequency-domain (FD) index and My is a number of FD vectors, and d=0, 1, . . . , Q−1, where d is a Doppler-domain (DD) index and Q is a number of DD vectors.

6. The BS of claim 5, wherein:

the configuration information for the CSI report includes a value of $N_4$ representing Doppler-/time-domain (DD/TD) basis vector length, and $N_4$>1, the indicator is included in G1 and indicates indices $$n_{4,l} = \left[n_{4,l}^{(0)} \ \dots \ n_{4,l}^{(Q-1)}\right]$$

of the Q vectors, where $$n_{4,l}^{(d)} \in \{0, 1, \ldots, N_4 - 1\}$$

with indices d∈{0, . . . , Q−1} assigned such that $$n_{4,l}^{(d)}$$

increases with d, where $$n_{4,l}^{(0)} \ldots n_{4,l}^{(Q-1)}$$

are respective indices of the Q vectors, when $N_4$=Q, the indicator is not reported, and when $N_4$>Q, one or more nonzero offsets between $$n_{4,l}^{(0)} \ldots n_{4,l}^{(Q-1)}$$

are reported with the indicator assuming that a reference for the one or more nonzero offsets $$(n_{4,l}^{(0)})$$

is 0, and values for the one or more nonzero offsets are mapped to values for the indices of the first indicator in an increasing order with an offset value of 1 mapped to an index value of ‘0’.

7. The BS of claim 5, wherein:

the CSI report includes X channel quality indicators (CQIs), where X∈{1, 2}, and when X=1, a CQI is included in the CSI part 1.

8. The BS of claim 7, wherein, when X=2:

two CQIs are $CQI_1$ and $CQI_2$, the $CQI_1$ is included in the CSI part 1, and the $CQI_2$ is included in the CSI part 2.

9. A method performed by a user equipment (UE), the method comprising:

receiving, from a base station, configuration information for a channel state information (CSI) report including codebook type information indicating typeII-Doppler-r18;

generating, based on the configuration information, the CSI report including a precoding matrix indicator (PMI), the PMI including an indicator indicating Q vectors; and transmitting, to the base station, the CSI report including a CSI part 1 and a CSI part 2, wherein a portion of the CSI part 2 is omitted and the omitted portion of the CSI part 2 is determined based on a priority value, and wherein the priority value is given by:

$$Pri(l, i, f, d) = 2 \cdot L \cdot \upsilon \cdot M_{\upsilon} \cdot d + 2 \cdot L \cdot \upsilon \cdot f + \upsilon \cdot i + l$$

where each reported element of indices of second, third, and fourth indicators, $i_{2,4,l}$, $i_{2,5,l}$ and $i_{1,7,l}$, respectively, indexed by (l, i, f, d), is associated with the priority value Pri(l, i, f, d) with:

l=1, 2, . . . , υ, where l is a layer index and υ is a rank value, i=0, 1, . . . , 2L−1, where i is a spatial-domain (SD) index and L is a number of SD vectors, f=0, 1, . . . , $M_{\upsilon}$−1, where f is a frequency-domain (FD) index and $M_{\upsilon}$, is a number of FD vectors, and d=0, 1, . . . , Q−1, where d is a Doppler-domain (DD) index and Q is a number of DD vectors.

10. The method of claim 9, wherein:

the configuration information for the CSI report includes a value of $N_4$ representing Doppler-/time-domain (DD/TD) basis vector length, and $N_4$>1 the indicator is included in G1 and indicates indices $$n_{4,l} = [n_{4,l}^{(0)} \ldots n_{4,l}^{(Q-1)}]$$

of the Q vectors, where $$n_{4,l}^{(d)} \in \{0, 1, \ldots, N_4 - 1\}$$

with indices d∈{0, . . . , Q−1} assigned such that $$n_{4,l}^{(d)}$$

increases with d, where $$n_{4,l}^{(0)} \ldots n_{4,l}^{(Q-1)}$$

are respective indices of the Q vectors, when $N_4$=Q, the first indicator is not reported, and when $N_4$>Q, one or more nonzero offsets between $$n_{4,l}^{(0)} \ldots n_{4,l}^{(Q-1)}$$

are reported with the indicator assuming that a reference for the one or more nonzero offsets $$(n_{4,l}^{(0)})$$

is 0, and values for the one or more nonzero offsets are mapped to values for the indices of the first indicator in an increasing order with an offset value of 1 mapped to an index value of ‘0’.

11. The method of claim 9, wherein:

the CSI report includes X channel quality indicators (CQIs), where X∈{1, 2}, and when X=1, a CQI is included in the CSI part 1.

12. The method of claim 11, wherein, when X=2:
two CQIs are $CQI_1$ and $CQI_2$,
the $CQI_1$ is included in the CSI part 1, and
the $CQI_2$ is included in the CSI part 2.

* * * * *